(12) United States Patent
Walker et al.

(10) Patent No.: US 8,740,623 B2
(45) Date of Patent: Jun. 3, 2014

(54) METHOD AND APPARATUS FOR DEVELOPING A PERSON'S BEHAVIOR

(75) Inventors: Michele A. Walker, Southborough, MA (US); Jeffrey M. Walker, Southborough, MA (US); Daniel J. Reilly, Jamaica Plain, MA (US)

(73) Assignee: Bee Visual, LLC, Southborough, MA (US)

( * ) Notice: Subject to any disclaimer, the term of this patent is extended or adjusted under 35 U.S.C. 154(b) by 1518 days.

(21) Appl. No.: 11/584,246

(22) Filed: Oct. 20, 2006

(65) Prior Publication Data

US 2007/0117073 A1     May 24, 2007

Related U.S. Application Data

(60) Provisional application No. 60/728,842, filed on Oct. 21, 2005.

(51) Int. Cl.
     *G09B 19/00*             (2006.01)

(52) U.S. Cl.
     USPC .......................................... 434/236; 434/238

(58) Field of Classification Search
     USPC ................. 434/236, 317, 409, 238, 237, 308; 116/316, 318
     See application file for complete search history.

(56) References Cited

U.S. PATENT DOCUMENTS

| | | | | |
|---|---|---|---|---|
| 2,748,498 | A * | 6/1956 | Stuart et al. ..................... | 434/98 |
| 4,041,893 | A * | 8/1977 | Mulloy .......................... | 116/308 |
| 5,573,404 | A * | 11/1996 | Stawski, II ..................... | 434/238 |
| 5,640,774 | A * | 6/1997 | Goldman ....................... | 33/1 SD |
| 5,791,905 | A * | 8/1998 | Larson, Jr. ..................... | 434/247 |
| 5,833,466 | A * | 11/1998 | Borg .............................. | 434/236 |
| 5,908,301 | A * | 6/1999 | Lutz .............................. | 434/236 |
| 6,345,821 | B1 * | 2/2002 | Labrot ........................... | 273/236 |
| 6,585,516 | B1 * | 7/2003 | Alabaster ....................... | 434/127 |
| 7,063,535 | B2 * | 6/2006 | Stamm et al. .................. | 434/236 |
| 7,491,063 | B1 * | 2/2009 | Santarsiero .................... | 434/236 |
| 2005/0042586 | A1 * | 2/2005 | Carpenter et al. ............. | 434/238 |
| 2007/0072156 | A1 * | 3/2007 | Kaufman et al. .............. | 434/236 |

OTHER PUBLICATIONS

Hodgdon, Linda A., "Solving Behavior Problems in Autism," QuirkRoberts Publishing, pp. 204, 207-208, 112 (1999).
Baker, K., Chaparro, C., "Schedule It! Sequence It!," Mayer-Johnson LLC, pp. 33-34, 41-43, 51, 63, 69-70 (2003).
"Courchesne Autism Lab/fMRI Research", obtained from the web at http://www.courchesneautismlab.org/fmri.html, pp. 103, Oct. 6, 2006.

(Continued)

*Primary Examiner* — Peter Egloff
(74) *Attorney, Agent, or Firm* — Hamilton, Brook, Smith & Reynolds, P.C.

(57) ABSTRACT

An embodiment of an apparatus, or corresponding method, for developing a person's behavior according to the principles of the present invention comprises at least one visual behavior indicator that represents a behavior desired of a person viewing the at least one visual behavior indicator. The apparatus, or corresponding method, further includes at least two visual choice indicators viewable with the at least one visual behavior indicator that represent choices available to the person, the choices assisting in developing the behavior in the person by assisting the person in choosing an appropriately adaptive response supporting the desired behavior or as an alternative to behavior contrary to the desired behavior.

38 Claims, 45 Drawing Sheets

(56) References Cited

OTHER PUBLICATIONS

"Autistic Brain Recalls Letters of the Alphabet in Brain Areas Dealing with Shapes", Autism News; obtained from the web at http://www.medicalnewstoday.com/medicalnews.php?newsid=17022, pp. 1-4, Oct. 6, 2006.

Bashe, Patricia R. and Kirby, Barbara L., "The Oasis Guide to Asperger Syndrome: Advice, Support, Insight, and Inspiration", (NY: *Crown Publishers*) p. 307 (2001).

International Preliminary Report on Patentability in International Application No. PCT/US2006/041106, 8 pages, date of issuance Apr. 23, 2008.

* cited by examiner

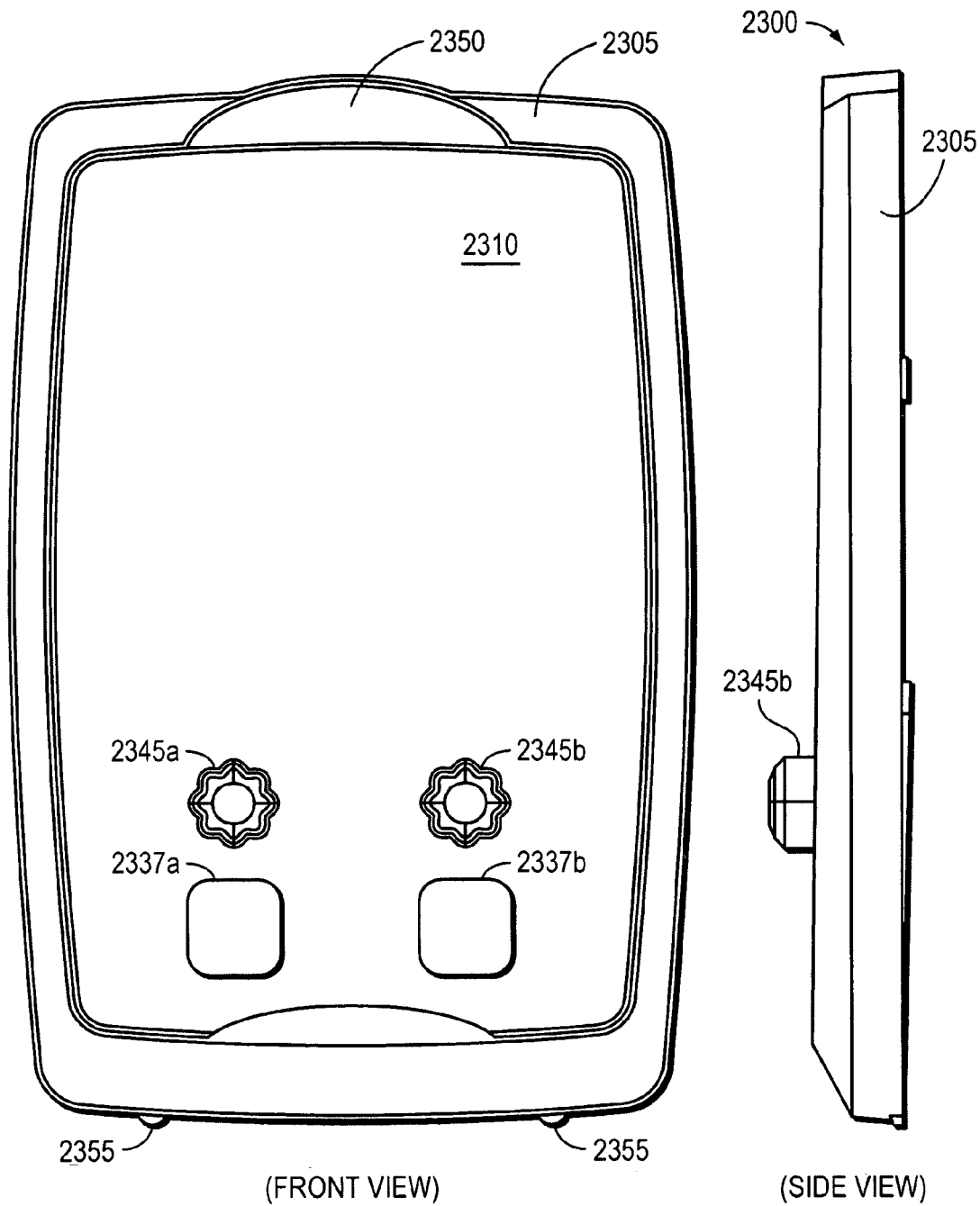
FIG. 23A (FRONT VIEW)　　FIG. 23B (SIDE VIEW)

(FRONT VIEW)

(FRONT VIEW)

(REAR VIEW)

(FRONT VIEW)

(REAR VIEW)

(ISOMETRIC VIEW)

ATTACHING GRAPHIC TILES TO CREATE SCHEDULES

METHOD AND APPARATUS FOR DEVELOPING A PERSON'S BEHAVIOR

RELATED APPLICATION

This application claims the benefit of U.S. Provisional Application No. 60/728,842, filed on Oct. 21, 2005, the entire teachings of which are incorporated herein by reference.

BACKGROUND OF THE INVENTION

Parents, educators, and caregivers often need help in communicating desirable behaviors and reasonable guidelines to children. One such way of providing help is through the use of visual supports. Research has shown children prefer and benefit from the use of images in addition to the spoken word.

It has been proven that there is a direct relationship between increased self-esteem, reduced anxiety, and reduced negative behaviors when children understand their environment, know what is expected of them, and are provided consistent consequences. Research has also shown that a majority of adults fail to be consistent or clear with regard to discipline.

Visual learners are estimated at more than 60% of the population, which includes those with aneuro-typical profile, as well as those with autism, Asperger's syndrome, communication disorder, fragile X, attention deficit disorder, behavior disorder, learning disability, hearing impairment, language delay, developmental delay, brain injury, dyslexia, and countless others. Behavior is parents' and caregivers' most common challenge with children, based on multiple published surveys. Many legislators are currently involved with the issue of expulsion at the pre-school level due to behavioral issues. According to the Centers for Disease Control (CDC), one in six children is diagnosed with developmental, behavioral, or mental disorders.

Due to the nature of autism spectrum disorders and some attention deficit disorders, much of what is referred to as "executive functioning" in an individual impaired with such disorders is believed to be compromised. "Executive function refers to a person's ability to plan, sequence, initiate, and sustain behavior towards some goal. Executive functions allow an individual to incorporate feedback and to make adjustments to responses along the way to the goal." as defined in www.tourettesyndrome.net/ef.htm. For children or adults impaired with autism or the like, teachers and caregivers usually take charge of executive function by providing structured, sequenced events for the impaired individual.

Due to the nature of people with compromised executive functioning, "sameness" (i.e., consistency of activities, sequences of events, and other routines) is preferably adhered to as much as possible. Fluctuating from a planned sequence of events is not generally tolerated well from those with executive function deficits. Once a schedule is made for an individual, major effort is demonstrated by the individual and caregiver to keep it as close to the original schedule as possible. Choices are introduced only after substantial trust and success has been accomplished between the individual and caregiver. These choices often include pre-selected items on a board, such as pertaining to a snack choice or leisure choice (e.g., apple, cracker, pretzel, video, nap, and so forth). It is assumed that, by allowing an individual to select the type of video or snack he wants, he will comply to the more undesirable elements (e.g., cutting paper) set before him in the adult directed sequence.

SUMMARY OF THE INVENTION

An embodiment of an apparatus, or corresponding method, for developing a person's behavior according to the principles of the present invention comprises at least one visual behavior indicator that represents a behavior desired of a person viewing the at least one visual behavior indicator. The apparatus, or corresponding method, further includes at least two visual choice indicators viewable with the at least one visual behavior indicator that represent choices available to the person. The choices assist in developing the behavior in the person by assisting the person in choosing an appropriately adaptive response supporting the desired behavior or as an alternative to behavior contrary to the desired behavior.

BRIEF DESCRIPTION OF THE DRAWINGS

The foregoing and other objects, features and advantages of the invention will be apparent from the following more particular description of example embodiments of the invention, as illustrated in the accompanying drawings in which like reference characters refer to the same parts throughout the different views. The drawings are not necessarily to scale, emphasis instead being placed upon illustrating the principles of the invention.

FIGS. 23A-C are mechanical diagrams of an embodiment of an apparatus that can support the pages of FIGS. 3-6;

DETAILED DESCRIPTION OF THE INVENTION

Figure 1:
FIG. 1 is an illustration of a caregiver assisting a child impaired with special needs, such as Asperger's syndrome, through use of an embodiment of the present invention.

A description of example embodiments of the invention follows.

It is generally believed that individuals impaired with autism spectrum disorders lack "theory of mind." "Theory of mind refers to an ability to understand that other people have thoughts, feelings, and desires that are different from one's own." *The OASIS Guide to Asperger Syndrome Advice, Support, Insight, and Inspiration*, p. 307, Patricia Romanowski Bashe and Barbara L. Kirby. 2001 Crown Publishers, New York, N.Y.

Due to a lack of speech output from autistic individuals or children, adults, caregivers, or parents usually try to guess and then tell these individuals what they are feeling, whether the prescribed feeling is accurate or not. This usually results in more frustration for the impaired individual because, if the adult has inaccurately labeled an individual's feeling, not much can progress from there. Quite simply, management techniques are employed by adults without going to the core of understanding the autistic individuals' thoughts, feelings, or desires. The terms parent, adult, caregiver, and teacher are interchangeably used herein.

While traditional schedules or routines may be put in place for an individual with autism, the traditional schedules or routines are primarily adult facilitated and directed and accept minimal to no input from the impaired individual, other than compliance. Thus, traditional schedules or routines do not employ "give and take" formats or otherwise collaborative processes, such as collaborative selection of options by the impaired individual or caregiver.

Embodiments of the present invention differ from the guesswork approach just described because the embodiments may be designed to (a) help change, modify, or replace dysfunctional behaviors, (b) enhance desirable behaviors, and (c) correct inaccurate perceptions of situations and self by involving the impaired individual in the process. These are higher order processes that have not been addressed previously, but are addressed via use of embodiments of the present invention. The embodiments provide a dynamic meaningful approach that may lead the impaired individual to a greater understanding of self. It takes the whole child into account by teaching social skills that can be generalized in a variety of settings. Due to the number of children that have been classified as visual learners in today's society, there is a need for visual types of learning products. Such learning products can be used to benefit neurologically impaired children or adults in a manner not previously recognized.

Embodiments of the present invention allow impaired individuals and caregivers to collaborate and solve problems, thereby changing outcomes of situations. By offering the element of choice to affect actual outcomes, children feel empowered. These choices may be a behavior (ex. getting help or taking a break), a physical need, (ex. hungry or thirsty), an activity (ex. go for a walk or play a video game) or a response (ex. be alone or have a hug). Children may not have the ability to think of choice under stressful/frustrating situations. By supplying choices, children are enabled to become part of the process. If they do not participate in outcomes, learned helplessness may develop, which can ultimately lead to depression. Everyone likes to feel that their opinion matters and they are not being forced to do something against their will.

Some embodiments of the present invention allow the parent or caregiver to show only a single behavior indicator or emotion state indicator and no more than two choice indicators at any given time, thus eliminating unnecessary visual distractions and allowing the child to focus on the specific desired visuals selected by the caregiver and/or child. In other embodiments, more than two choice indicators may be presented. Some embodiments are thus a child-centered or impaired individual-centered approach with minimal adult or caregiver direction. Because children or impaired individuals can benefit from use of various embodiments of the present invention, the terms "child", "impaired individuals," "person" or other similar terms, are used interchangeably herein unless specifically stated otherwise.

Various embodiments of the present invention may combine or incorporate several techniques of working with children or adults having learning or mental impairment. A first technique is a visual communications technique. "Visuals" are often used by people skilled in the art of working with children with autism. A second technique is Behaviorism. Behaviorism relies on observable behavior and is often used by caregivers to reward or punish behaviors. Behaviorism is not concerned with the mind or consciousness. A third technique is Cognitive Therapy. Cognitive therapists believe that thoughts cause people's feelings and behaviors, not external influences, and that people's thoughts can change the way they think, feel, or act, even if a situation does not change. A fourth technique is the use of time. It has been shown that time is a tremendous motivator for children in completing tasks. It also is very effective in teaching specific behaviors that require waiting. When a child understands and realizes or, in some cases, visually sees there is an endpoint, anxiety is reduced, and enthusiasm for the task or behavior is increased.

According to Merriam-Webster's Collegiate Dictionary, Eleventh Edition, the definition of "behavior" is "1a: the manner of conducting oneself" and "c: the response of an individual, group or species to its environment." A "task" is defined as "1a: usu. an assigned piece of work often to be finished within a certain time." In some cases of working with children, a parent, caregiver, or teacher may have to address both behavior issues and task issues, and embodiments of the present invention may be used for such purposes.

As used herein, the term "mental state" is understood to encompass "emotional state" and, in some cases, as used herein, behavioral state is a manifestation of mental state.

Various embodiments of the present invention use visual behavior and mental state indicators and methods prompting a child's attention to and guiding a child's response to the visual behavior or mental state indicators. The visual behavior indicators help the child understand what response or behavior is being requested of him or her, and the mental state indicator helps the child identify his or her feelings.

From a physical science viewpoint, it is believed that the frontal lobe region of the brain is in charge of executive functions. New research has also determined that this area of the brain is underdeveloped in children with developmental delays, including Autism and Aspergers Syndrome. See MRI Research Center for Autism Research; http://www.courchesneautismlab.org/fmri.html, Oct. 6, 2006. "The frontal lobe is a higher-order cognitive area that regulates complex behaviors that are abnormal in autism, such as source memory, social behavior, attention and language." Id. Many researchers also believe that this area of the brain is not fully developed until the person reaches their mid to late teens.

In Applied Behavioral Analysis, therapy is primarily adult directed and initiated. "Many behavioral therapies to treat autism stress rote learning." See "Autistic Brain Recalls Letters of the Alphabet in Brain Areas Dealing with Shapes", Autism News; http://www.medicalnewstoday.com/medicalnews.php?newsid=17022, November 2004. Rote learning does not teach children how to generalize in novel situations and, in addition, it creates "robot like," adult compliant responses. It does not address executive function skills or emotions as it uses procedures, such as ignoring the person, to extinguish or alter behavior.

Embodiments of the present invention augment a person's (e.g., a child's) impaired or developing frontal lobe as it supports higher order thought processes by mapping dynamic sequences necessary to increase executive function skills, such as task completion, cognitive set shifting (i.e., the ability to shift from one frame of mind to another relatively smoothly), sequencing, organization and planning, working memory, and emotional-regulation during meaningful real-life situations with several multiple-choice options from which the person can choose. If the person's executive function skills were working correctly or are fully developed, these options or steps would not need to be broken down into small concrete parts. However, due to a lack of frontal lobe function in the person, embodiments of the invention's visual choice indicators act as an "artificial" frontal lobe in order to enhance the executive function process. The visual choice indicators allow the person to come up with, and concretely hold onto, possible multiple responses in novel situations and select an appropriate response to execute. In other words, the visual choice options act as a person's working memory, and the person can select from several appropriate solutions to support the desired behavior and aid in his or her own development. This approach not only allows the person to access and process the options he or she has, but, also, the solution becomes a collaborative solution, versus an adult directed solution, by providing a person with some of the control.

As used herein, the term "adult" is synonymous with the term caregiver unless otherwise specified.

Some embodiments of the present invention are particularly useful to help higher functioning children, including children with high functioning Autism Spectrum Disorder to children that are typical in developing. Severely cognitively impaired children may not be able to understand the element of choice, but are dramatically assisted with and learn to develop through certain embodiments of the present invention.

One embodiment of the present invention includes one or more (e.g., three) visual support pages, such as a "schedule" page, "cooperation" page, "behavior improvement" page, or "feelings" page. These pages may include or be supplemented with an emotions indicator, supporting storybook, or parent's guide. Yet other embodiments may include supporting pictures, timer, magnetic dry erase board, dry erase pen, pen clip, or combination thereof.

Adults and children who use some embodiments of the present invention may use the pages to identify and label a child's feelings. In this way, the pages can contribute to a process of the child's developing self-control. Children using an embodiment of the present invention may be supplied with information, such as behavior considered to be positive or negative behaviors, and how to act within their environment. Consistency and clarity between caregiver and child may be improved through use of embodiments of the invention, and consistency among multiple caregivers in communicating with the child may also be improved.

FIGS. 1-12 illustrate example environments of use, embodiments, and configurations of the present invention. FIGS. 13-19 illustrate additional example environments of use. FIGS. 20-28 illustrate additional example embodiments and mechanical diagrams of the present invention. FIGS. 29A-29D illustrate example companion books that provide simplified instructions for using embodiments of the present invention. FIGS. 30-33 illustrate example time indicator devices ("timers") that may be used with embodiments of the present invention. FIGS. 34-37 illustrate yet other embodiments of the present invention to operate without a fixed frame.

FIG. 1 is a diagram illustrating a caregiver 105 working with a child 110 with the apparatus 100 that uses an embodiment of the present invention. The apparatus 100 may teach the child 110 how to perform a task by following a schedule, cooperate with others, improve behavior, or understand and learn how to cope with feelings. In the scenario of FIG. 1, the caregiver 105 is working in a one-on-one situation with the child 110.

Figure 2:
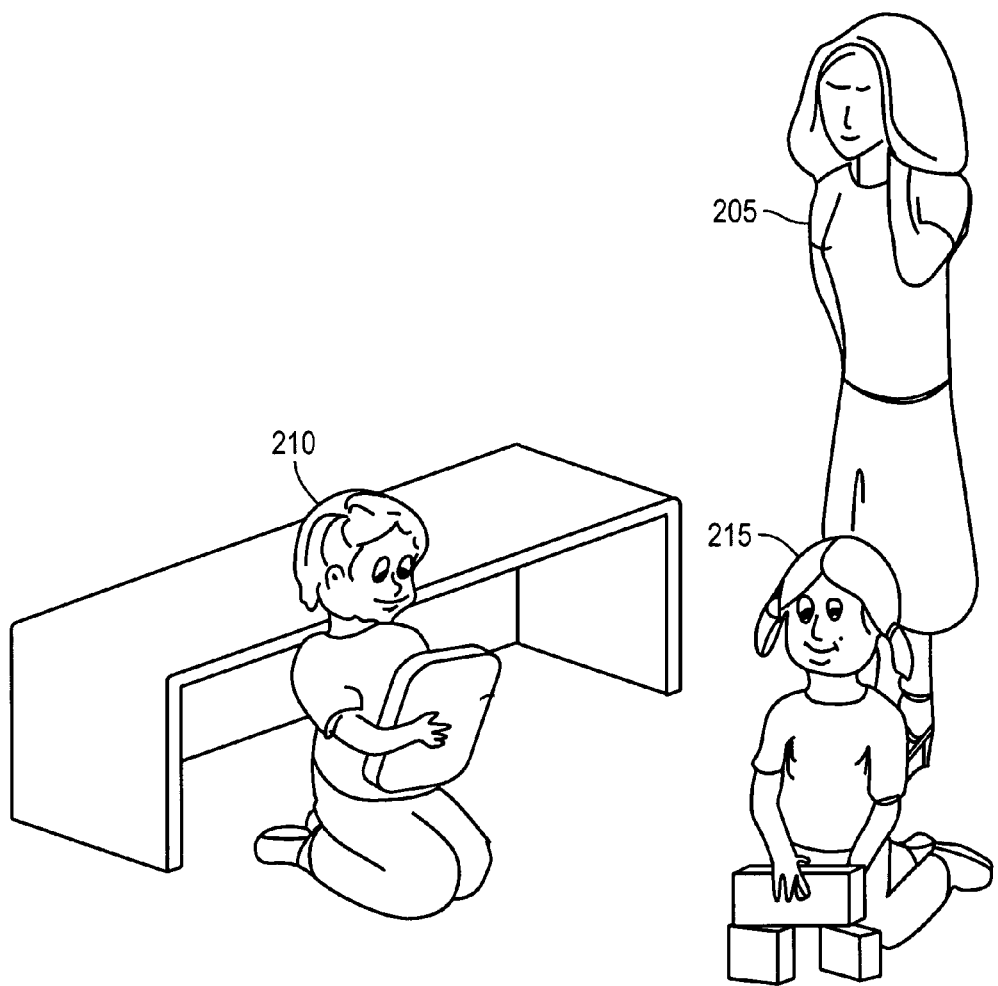
FIG. 2 is an illustration of a caregiver monitoring two children, including the child of FIG. 1, using an embodiment the present invention.

FIG. 2 is a diagram in which a caregiver 205 is monitoring two children 210, 215. In this scenario, one of the children 210 is using an apparatus 200 that employs some aspects of the present invention. In this case, a first child 210 with the apparatus 200 may have Asperger's syndrome, and the second child 215 may not. In other situations, both children 210, 215 may have similar neuro-atypical profiles. Through use of the apparatus 200, the child 210 may learn how to better cooperate with another child 215. Further, the child 210 with the apparatus 200 may also develop other types of behaviors, as briefly mentioned above in reference to FIG. 1.

FIGS. 3-6 illustrate embodiments of pages used to develop behavior.

Figure 3:
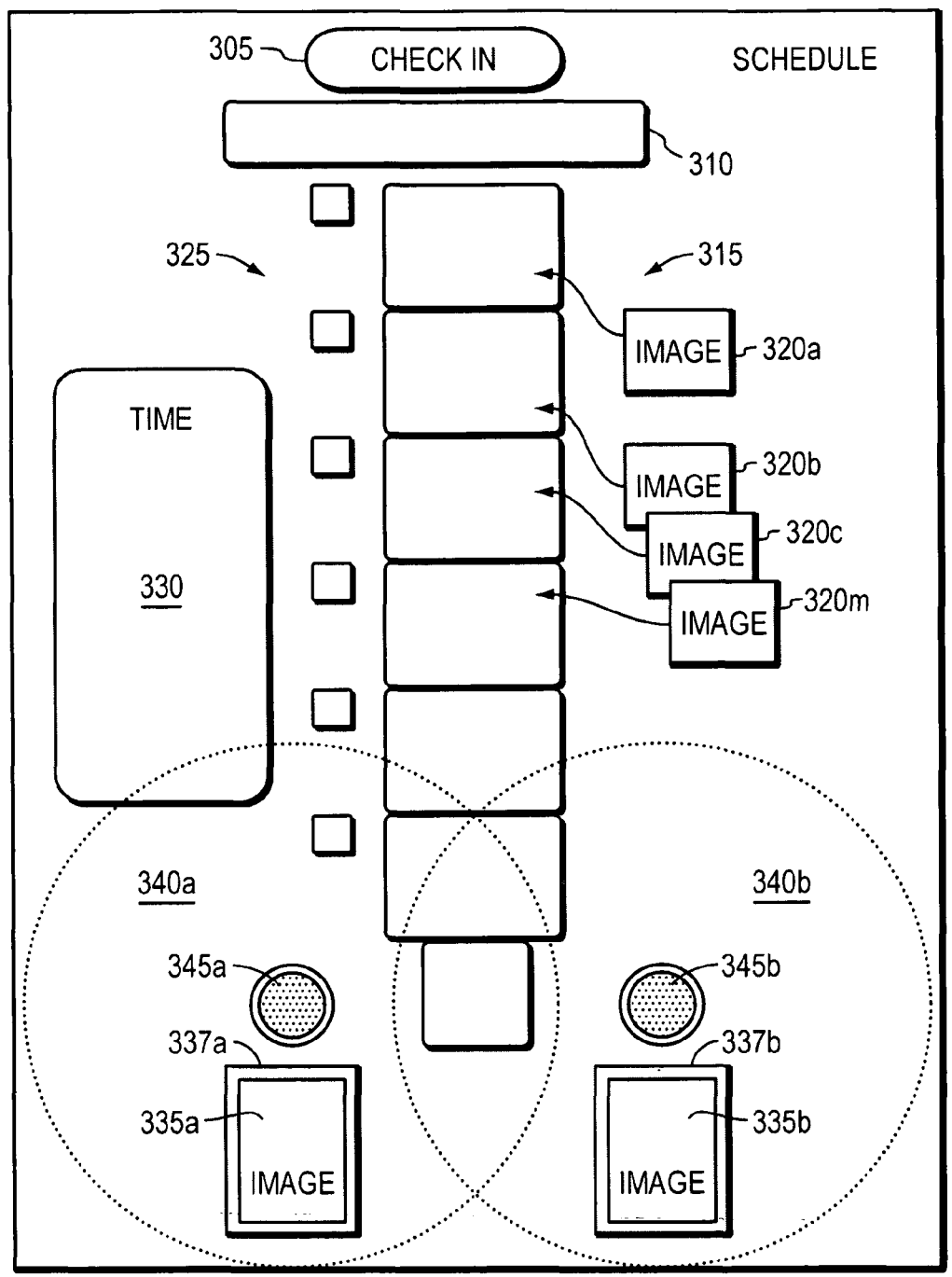
FIG. 3 is a diagram of a schedule page according to an embodiment of the present invention.

FIG. 3 is a diagram of a schedule page 300. The schedule page 300 may be used to help a child complete individual or multiple tasks in a timely manner. The schedule page 300 may be organized in a way that provides information in a structured, sequential format. A separate story book or guide may be provided to assist in a child or caregiver in understanding how to use the schedule page 300.

The schedule page 300 may be a thin rectangular page that is rigid or semi-rigid and may have at least one surface of a dry erase material. The schedule page 300 may include an emotional status reminder 305 that displays words, such as "Check In" to remind the parent or caregiver to start usage of the schedule page by assessing the emotional state of the child, either visually or verbally. A blank field 310 may be provided for a supervisor (e.g., parent, teacher, or counselor) to write, place, attach, or so forth, a title of task(s) to be completed (e.g., "Get ready for School"). In this particular embodiment, below the emotional status reminder 105 may be a series of visual task receiver rectangles 315, optionally arranged in a vertical format, where visual behavior task indicators 320*a*-*n* are placed.

Also in this particular embodiment, directly to the left of the locations (i.e., visual task receiver rectangles 315), specified for receiving the visual behavior task indicators 320*a*-*n*, is a series of squares 325. A check mark or other indicia can be placed in the series of squares 325 or the visual task indicators 320a-n can be moved to another vertical "all done" column (not shown) as they are completed by the child to indicate that the task(s) represented on the visual behavior task indicators 320a-n have been completed. The visual behavior task indicators 320a-n may be on a magnetic or other self-adhering backing. Alternatively, the indicators 320a-n may connect to or insert into the rectangles 315 in some other manner. Other alternative embodiments may include cloth with printed, embroidered, or otherwise supporting visual indicators, and a material or mechanism that grips the cloth may be employed to hold the cloth in a location visible to a child.

Further in this embodiment, to the left of the series of squares 325 is a time display 330 with the word "Time" at the top. This space may be provided for the supervisor to write an amount of time the child has to complete all of the tasks or individual tasks or a timer may be attached so the child always knows the remaining time they have complete all the tasks.

At the bottom of the schedule page 300 in this embodiment are two "choice indicators" 335a, 335b, which may be presented through choice indicator windows 337a, 337b. The choice indicators 335a, 335b may each be one of multiple (e.g., six) choices (e.g., play with my toys, watch TV, etc.) on respective circular disks 340a, 140b, which can be turned through use of respective knobs 345a, 345b, which may be disposed between front and back layers (not shown) of the schedule page 300. Through use of the knobs 345a, 345b, each of the choice indicator disks 340a, 340b can be rotated until desired choice indicators appear through the choice indicator windows 337a, 337b. It should be understood that caregiver and child may collaborate to select the choices that are displayed.

Figure 4:
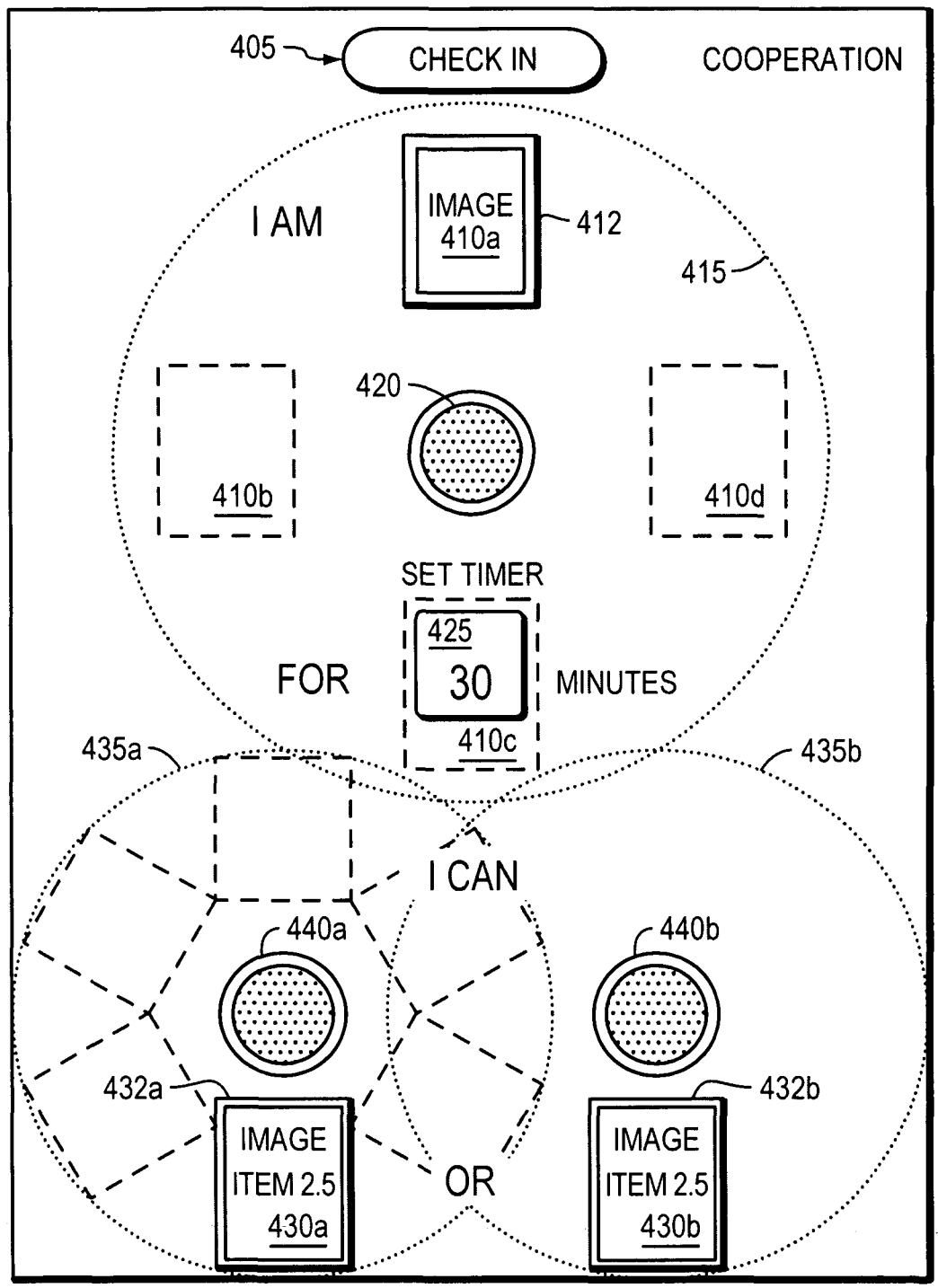
FIG. 4 is a diagram of a cooperation page according to another embodiment of the present invention.

FIG. 4 is a block diagram of the cooperation page 400. The cooperation page 400 may be used to assist in developing a child's ability and desire to cooperate. A separate story book may be used to help a child understand how to use the cooperation page 400.

The cooperation page 400 may be a thin rectangular page, which may be rigid, semi-rigid, or soft and flexible, and at least a portion of surface may include a dry erase material. The cooperation page 400 may include an emotional status reminder 405, which may include the words "Check In" as a reminder used as described above. A cooperation indicator 410 may be presented through a square opening 412, where one of five visual cooperating behaviors (e.g., Taking Turns, Not Interrupting, Not Interrupting phone, Quiet Time, Waiting Responsibilities) on a circular disk 415 can be turned with a knob 420 to display a selected one of the cooperation indicators 410. In this embodiment, directly to the left of the cooperation indicator 210a are the words "I am."

In the embodiment of FIG. 4, a white rectangle 425 is in the middle of the cooperation page 400, where an amount of time (e.g., 30 minutes) is communicated by writing the amount of time (e.g., using a visual time indicator or using a non-visual timer) a child is to perform the cooperation behavior (e.g., taking turns) visible through the square opening 412. In this embodiment, directly to the left of the white rectangle 425 is the word "for," and directly to the right is the word "minutes." This embodiment may also include other words; for example, directly above the white rectangle may be the words "Set Visual Timer."

At the bottom of the cooperation page 400 are two choice indicators 430a and 430b, which are viewable through respective square openings 432a and 432b, where one of multiple (e.g., six) choices (e.g., Play with my toys, Watch TV, etc.) on respective circular disks 435a, 435b can be turned with respective knobs 440a, 440b. The choice indicators 430a, 430b being presented may be the words "I can," and in-between the choice indicators 430a, 430b may be the word "or."

It should be understood that the words written on the page (e.g., "I can," "for," and so forth) may be different in other embodiments. Further, the words may be selectable, such as by magnetically interchangeable labels or dry erase regions, and a guidebook may offer suggestions for what the words might be. Although seemingly unimportant, children may react differently to different words connecting the indicators together. Alternatively, visual indicators may be applied instead of the example words in other embodiments.

In some embodiments, the emotional status reminder 405 may display word(s) or visual indicator(s) selectable via a circular disk, optionally similar to one of the circular disks 415 described above, to allow the child to indicate his emotional status to a caregiver in a manner with which the child is familiar. It should be understood that a separate emotion status reminder wheel may be provided with the embodiment of FIG. 4 or other embodiments. With a separate emotion status reminder wheel, the words "Check In" may direct a caregiver to the separate wheel as a reminder to perform the "check in" step. Similarly, the other circular disks 415, 435a, and 435b may be separately provided and connected to the knob(s) 440a, 440b on an as-needed or as-desired basis by a caregiver, child, or collaboration of the two.

Figure 5:
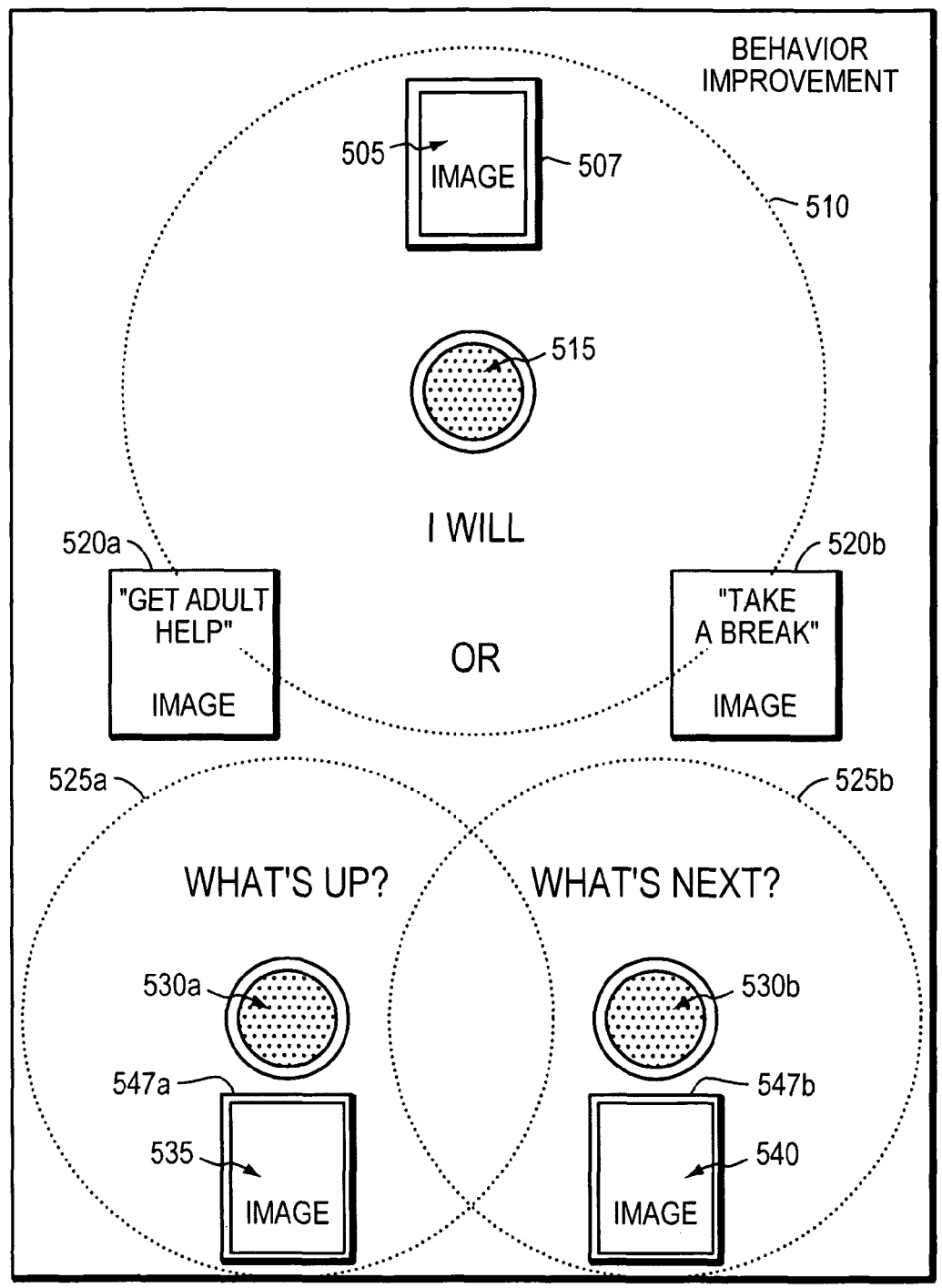
FIG. 5 is a diagram of a behavior improvement page according to yet another embodiment of the present invention.

FIG. 5 is a diagram of a behavior page 500. The behavior page 500, when presented to a child and utilized in accordance with a preferred method, alters or improves a child's behavior due to a visual presentation of clear expectations, structure, and options provided for the child.

The behavior page 500 may be a thin rectangular page that is rigid or semi-rigid. The behavior page 500 may include a behavior indicator 505 presented through a square or other shaped opening 507, where one of multiple (e.g., five) visual behaviors (e.g., No Hitting, No Pushing, No Throwing Things, No Biting, and No Kicking) on a circular disk 510 can be selected for presentation by turning a knob 515 connected to the circular disk 510. Below the knob 515 may be words such as "I Will," where the child identifies and selects one of two desired visual behaviors (e.g., Get Adult Help or Take a Break) as an alternative to the undesired behavior shown in the behavior indicator 505. Below the left desired visual behavior indicator 520a may be the phrases "What's Up?", and to the right may be the words "What's Next?". The meaning and usage of these phrases are explained through an example presented below.

At the bottom left of the behavior page 500 may be a "feeling" indicator 535 which is used to answer the question "What's Up?". The feeling indicator 540 may be presented through a square opening 547a, where one of multiple (e.g., six) feelings (Sad, Mad, Frustrated, Hungry/Tired, Confused, and Scared), represented in the form of visual indicators on a circular or other shaped disk 525a, for example, can be turned with a knob 530a to show the selected feeling indicator 535. At the bottom right of the behavior page 500 is a next step indicator 540, which is used to answer the question "What's Next?". The next step indicator 540 may be presented through a square or other shaped opening, where one of multiple (e.g., six) visual next steps (e.g., Go Home, Hug, Go for a walk, Want to be alone, ask playmate "Are you okay?", and, optionally, a blank square to be used as a specific option) is represented as a visual next step indicator 540 on a circular or other shaped disk 525b. The child or caregiver can turn the circular disk 525b through use of a knob 530b to show the selected Next Step Indicator 540.

Figure 6:
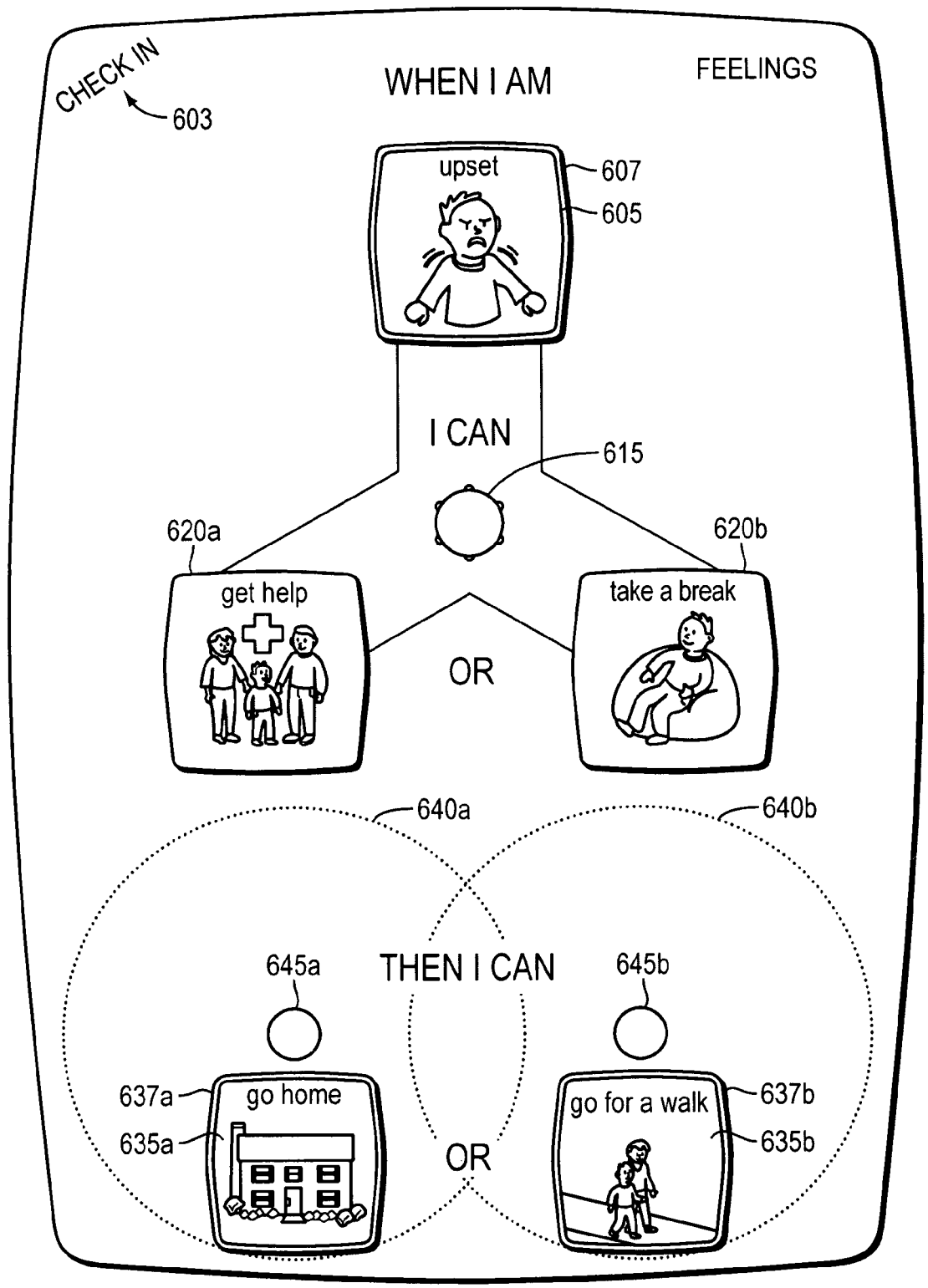
FIG. 6 is a diagram of a feelings page according to still another embodiment of the present invention.

FIG. 6 is a diagram of a "feelings" page 600. The feelings page 600, when presented to a child and utilized in accordance with a preferred method, alters or improves a child's ability to regulate his or her emotional state when "upset" due to a visual presentation of clear expectations, structure, and options.

The feelings page 600 may be a thin rectangular page that is rigid or semi-rigid. The feelings page 600 may include an emotional visual state indicator 605 (e.g., "upset") presented as a fixed square visual indicator or other shaped visual indicator, or it could be presented as one of several emotional visual state indicators 605 through a square or other shaped opening 607, where one of multiple visual emotions states (e.g., Sad, Mad, Confused, Frustrated, tired, etc.) can be selected for presentation. Above the emotional state indicator 605 may be words such as "When I am."

Below the emotional state indicator 605 may be the words "I can" near where the child identifies and selects one of two desired behaviors (e.g., Get Help or Take a Break), illustrated as visual behavior indicators 620a, 620b, as a coping strategy to the emotional state shown in the emotional state indicator 605. The visual indicators 605, 620a, 620b may be printed on a wheel, disposed behind or in the feelings page 600, that can be rotated by a knob 615, for example. Alternatively, the emotional state visual indicator 605 may be separately selectable from the visual behavior indicators 620a, 620b, or all three visual indicators 605, 620a, 620b may be independently selectable.

At the top left of the feelings page 600 may an emotional state reminder 603 that displays words such as "Check In" to remind the parent or caregiver to continue usage of the feelings page 600 by assessing the emotional state of the child, either visually or verbally, and to provide the child with choices on what to do next. Below the desired visual behavior indicator 620a and 620b may be phrases, such as "Then I can." The meaning and usage of such phrases are explained through an example presented below.

At the bottom of the feelings page 600 are two "choice" indicators 635a, 635b, which may be presented through choice indicator windows 637a, 637b, respectively. The choice indicators 635a, 635b may each be one of multiple (e.g., six) choices (e.g., Go Home, Hug, Go for a walk, Want to be Alone, etc.) on respective circular disks 640a, 640b, which can be turned through use of respective knobs 645a, 645b that may be disposed between front and back layers (not shown) of the feelings page 600. Through use of the knobs 645a, 645b, each of the choice indicator disks 640a, 640b can be rotated until desired choice indicators 635a, 635b appear through the choice indicator windows 637a, 637b. It should be understood that caregiver and child may collaborate to select the choices that are displayed.

Figure 7:
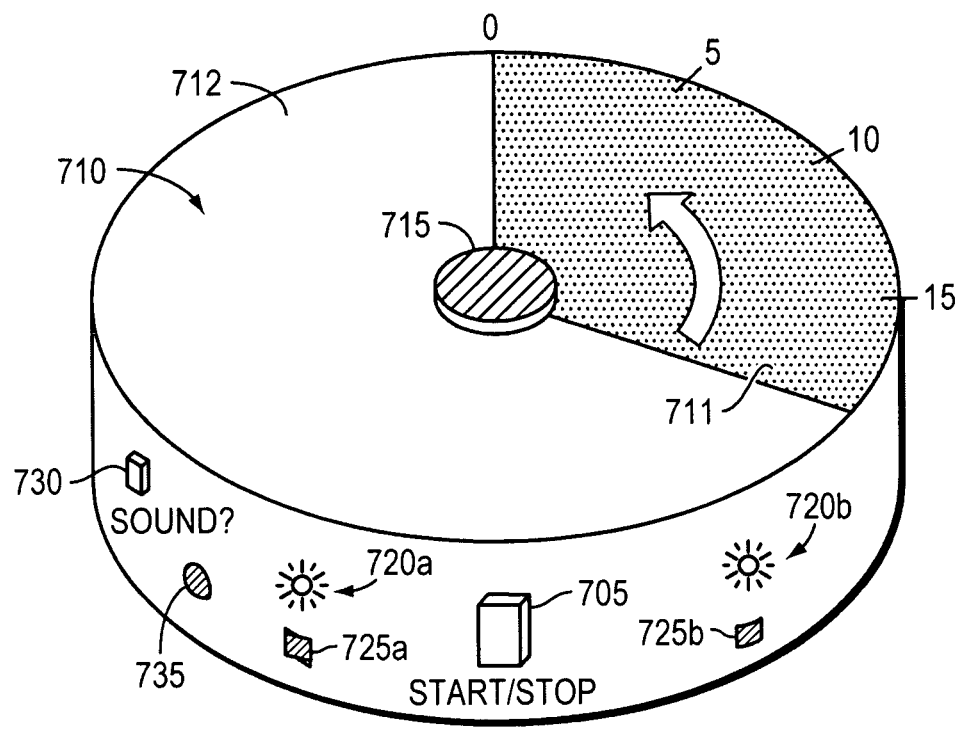
FIG. 7 is a diagram of an example clock optionally used with the pages of FIGS. 3-6.

FIG. 7 is a diagram of a time indicator device ("timer") 700. When the timer 700 is presented to a child and utilized in accordance with an example method, the timer 700 tends to improve the child's understanding and willingness to achieve an intended outcome (e.g., taking turns, waiting, sharing, or a desired or undesired activity). The timer 700 may include at least one control (e.g., start/stop button/switch) 705. The timer may include a visual timer face 710, which shows the amount of time remaining, where a white portion 711 may be a cover or other means for indicating time elapsed and a shaded portion 712 indicates remaining time, or vice-versa. It should be understood that other forms, such as a column or grid, may be used to illustrated remaining or elapsed time.

In one embodiment, included on the timer face 710 is a time set knob 715 that slides around the timer face 710 circumference to a desired remaining time (e.g., shaded portion 712). The time set knob 715 automatically resets to the last set time by pressing the stop/start button 705 after the time has fully elapsed. In some embodiments, the amount of time can be manually adjusted at anytime if desired by the user or users. The timer 700 may include turn/task indicator lights 720a and 720b or other forms of director elements on both the left and right sides of the timer 700 that visually or audibly presents to whom (e.g., "Billy" or "Timmy") or what (e.g., "homework" or "video games") the remaining time is directed.

In the embodiment of FIG. 7, only one of the two indicator lights 720a and 720b is on at any one time to indicate which person, group of people, or task is currently being timed. In this embodiment, the persons or tasks being timed may be identified by placing magnet(s) 725a, 725b directly below the indicator lights 720a and 720b. These magnets 725a and 725b may visually represent the persons using the timer 700 or tasks to be completed by the user of the timer 700. The timer 700 may include a sound optional switch 730 and a speaker 735. The timer 700 may also include electronics (not shown) that can support recording or downloading sounds meaningful to the person(s) using the timer 700. The sounds can, for example, audibly indicate "time's up," "30 seconds left," or other sounds, such as "please turn off the video game and prepare for bed."

In one embodiment, many or all surfaces on the feelings page 600, or other pages 300, 400, 500 may be formed of a dry erase material for use by the caregiver or child to communicate information, such as instructions or feelings.

EXEMPLIFICATION

An example of how to use the schedule page 300, cooperation page 400, behavior page 500, and feelings page 600 is presented below. It should be understood that use of these pages preferably takes temperament and developmental ability of the child into consideration.

At least one of the pages 300, 400, 500, 600 is preferably within child's view and access at all times. A caregiver may choose to begin with the schedule page 300 to introduce child to the pages 300, 400, 500, 600 and method(s) used with the pages, and to give the child immediate positive reinforcement and positive association with a preferred method of using the schedule page 300 or other pages 400, 500, 600.

When using the schedule page 300, a caregiver may perform the following steps:
1. Check in (i.e., make a visual or verbal inspection) with the child in order to get a sense of the child's emotional state, as shown on the Emotions Indicator 305, to determine if the child is able to proceed.
2. Place an easy visual behavior task indicator (e.g., indicator 320a) on the schedule page 300 in the topmost visual behavior receiver rectangle 315. Assist the child with the task, if necessary.
3. Check-off the completed item with the child.
4. Increase the number of visual behavior tasks 320a-n on the schedule page 300 to two or three.
5. Have the child select a choice or two from the choice indicators 335a, 335b.
6. Set a timer, e.g., timer 700 illustrated in FIG. 7, for an exaggerated (preferably) amount of time the child is expected to need to complete the task(s).
7. With remaining time on the timer, allow the child to get his or her choice that he or she previously selected, optionally in a collaborative manner with the caregiver, in step 6.

Positive reinforcement is provided on three levels for the child for accomplishing behavioral tasks. First, the child gets a feeling of satisfaction in checking off the competed tasks; second, the child beat the timer; and third, the child gets to do the chosen activity.

Which page 400, 500, 600 next? If the child has an undesirable behavior, such as hitting, one may preferably proceed to the behavior page 500 next or 600 if the child is often upset; otherwise, one may proceed to the cooperation page 400. It may be useful to uncover reasons underlying the behavior and to determine what the child is trying to communicate before proceeding to the cooperation page 400. The child may need an adult caregiver to help do this more effectively.

One method of use with the behavior page 500 is first to review companion book(s) or other aid(s) associated with the behavior page 500 with the child. The companion book(s) offer visual examples as to what a child may be trying to communicate with his undesirable behavior.

1. A clear Rule is provided for child (e.g., No Hitting).
2. The child is able to identify and understand what undesirable behavior(s) is/are (e.g., Hitting, kicking, pushing, biting, etc.).
3. Clear alternatives are provided as expectations for child (e.g., "Take a Break" or "Get Adult Help").
4. Options are provided to explore the child's feelings (e.g., "What's up?").
5. Options are provided to collaborate on what action to take next (e.g., "What's next?").

One method of use with the feelings page 600 is to first review the companion book(s) or other aid(s), described below in reference to FIGS. 29A-29D, associated with the feelings page 600 with the child. The companion book(s) offer visual examples as to what a child may be trying to communicate with his feelings and what may have caused the child to be upset.

1. When the child is upset, a clear visual representation is presented corresponding to the emotional state "upset."
2. The child is able to understand that this is the current emotion they are experiencing.
3. Clear alternatives are provided as expectations for the child (e.g., "Take a Break" or "Get Help").
4. Once the child is in a more calm emotional state, the child and caregiver/parent can discuss why the child is upset and whether he or she is feeling better. If appropriate, the caregiver can review the companion book(s) with the child to help the child better communicate why he or she is upset.
5. Options are provided to collaborate on what action to take next (e.g., "Then I can").

When using the cooperation page 400, one technique may be as follows:

1. Check-in with the child in order to get a sense of the child's emotional state, as shown on the emotions status reminder 405, to determine if the child is able to proceed.
2. Introduce behavior requests to the child one at a time. For example, begin with "not interrupting." Read the accompanying book to the child, which may illustrate (i) an importance of not talking while other people are talking, (ii) a proper way of interrupting in emergency situations, and (iii) how the cooperation page 400 gives the child a selection of options (e.g., 430a, 430b) to choose from while waiting patiently. The caregiver may prepare the selected activities that the child has chosen and may set the visual timer for an amount of time she expects to be on the phone. The caregiver may write the amount of time (e.g., 30 minutes) on the white rectangle 425 (FIG. 4) on the cooperation page 400, as well. The caregiver is thereafter free to make a phone call without interruptions, at least for the amount of time written on the white rectangle 425.

The result of using the cooperation page is that the child has a feeling of increased self-worth because the caretaker took the time to collaborate with the child and to prepare an activity or two for the child prior to the caregiver's talking on the phone. The caregiver has also agreed to be on the phone for an allotted time period, and the child can "see" that there is an end to the caregiver's phone call. The more consistent the adult is in adhering to the structured activity provided through use of the pages 300, 400, 500, 600 described herein, the more likely the child is likely to succeed.

Figure 8:
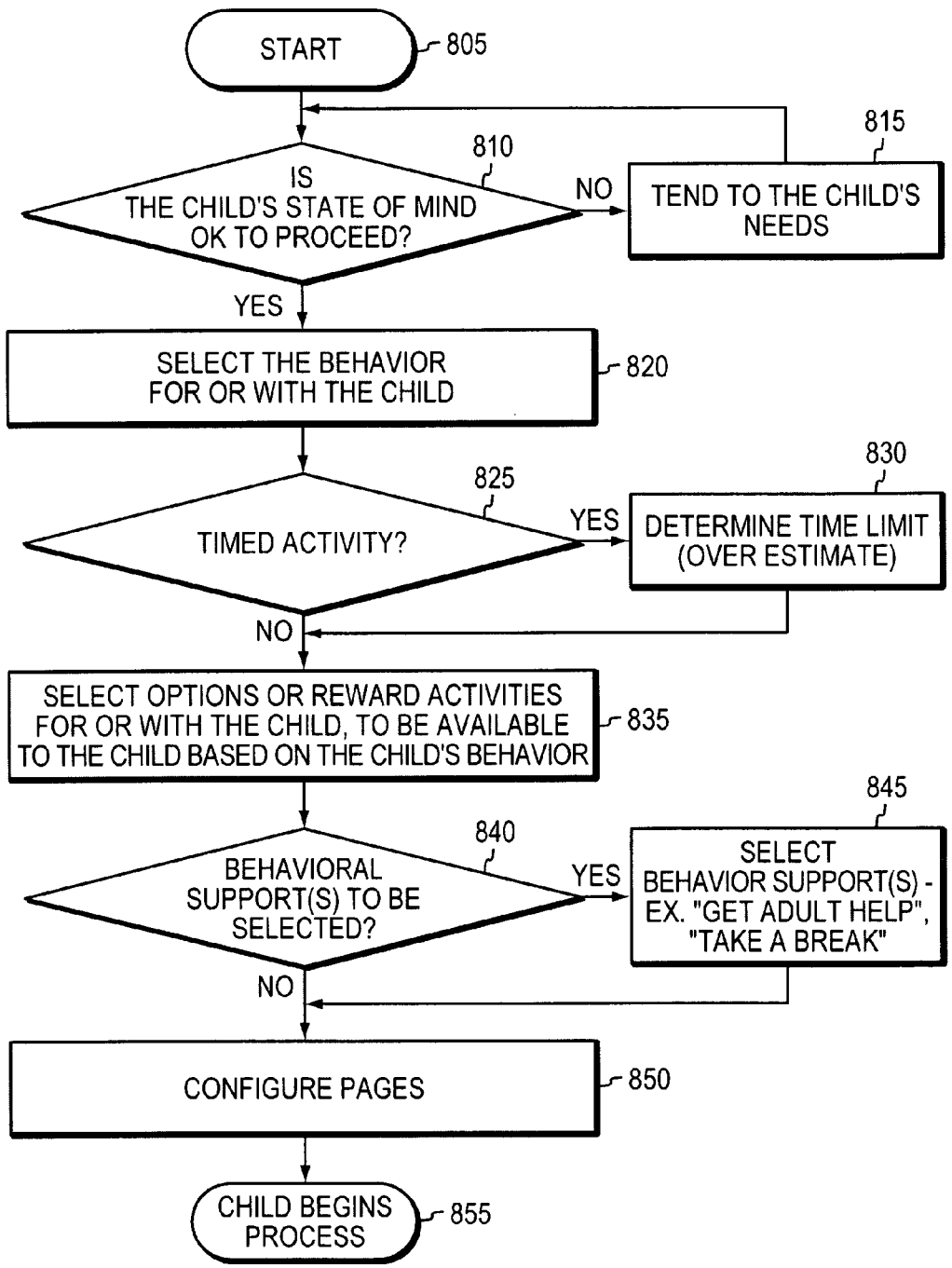
FIG. 8 is a flow diagram of an example process for a caregiver to use in working with the child of FIG. 1.

FIG. 8 is a flow diagram 800 illustrating an example embodiment of a process for use in one of the pages of FIGS. 3-6 described above. The flow diagram 800 begins (805) by a caregiver providing a child with the apparatus. A caregiver preferably first checks to see that the child's state of mind is okay to proceed (810). If not, the caregiver tends to the child's needs (815). If the childs's state of mind is okay to proceed (810), the caregiver selects the behavior for or with the child (820). If the activity is a timed activity (825), the caregiver determines a time limit for the activity, preferably by overestimating the amount of time it should take the child to perform the activity so as to allow the child to successfully complete the activity before the time expires (830). Next, the caregiver selects actions or reward activities for or with the child to be available to the child based on the child's behavior (835). If there are behavioral support(s) to be selected (840), the caregiver selects behavior support(s), such as "get adult help," "take a break," and so forth (845). The caregiver configures the pages (850), and the child begins the process of using the configured pages (855).

Figure 9:
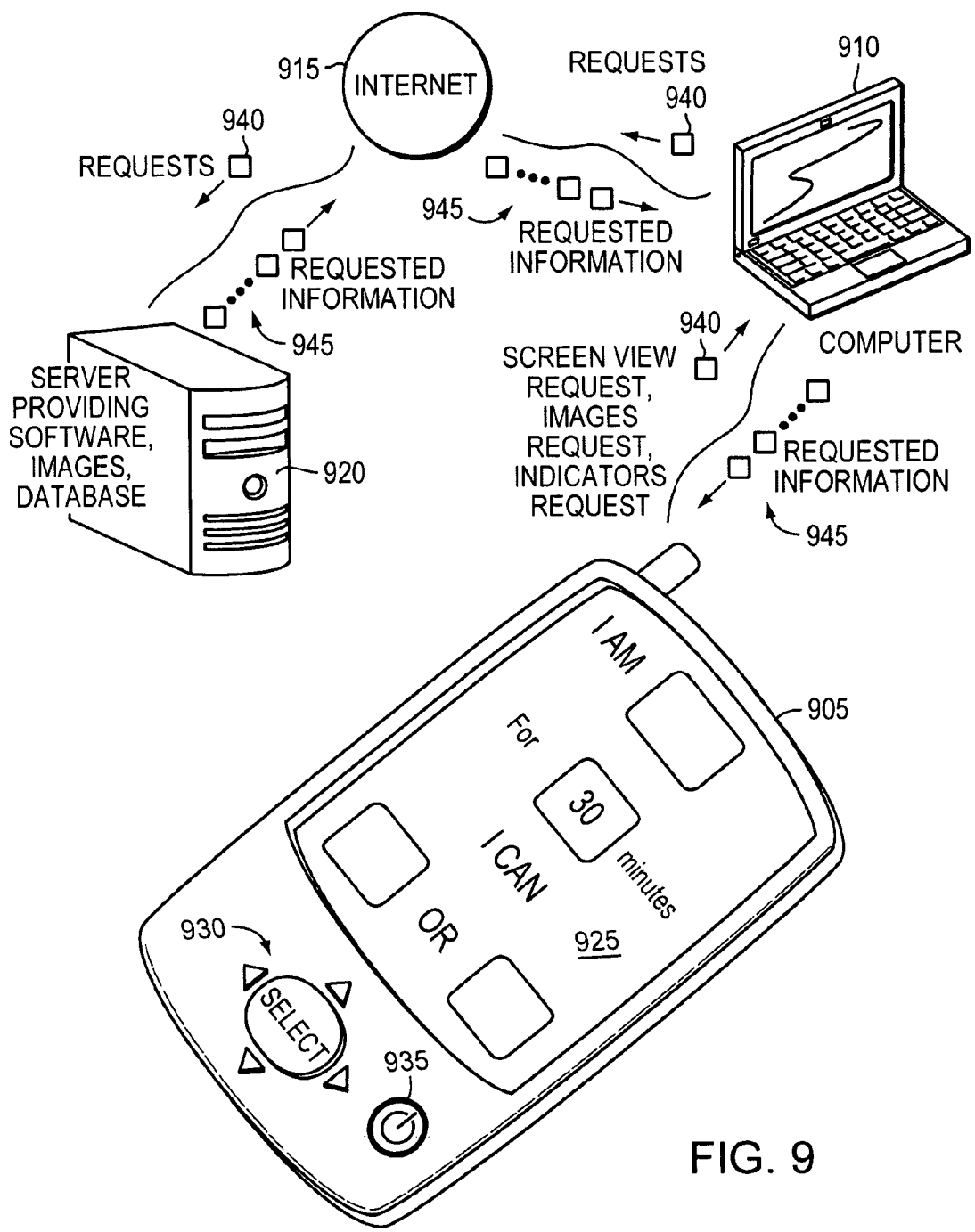
FIG. 9 is a network diagram in which an electronic device (e.g., Personal Digital Assistant (PDA)) executes software designed in a manner allowing the child or caregiver of FIG. 1 to interact with an electronic version of the pages of FIGS. 3-6.

FIG. 9 is a network diagram 900 in which an electronic apparatus 905, such as a personal digital assistant (PDA), executes software that forms a screen view 925 that can be controlled via a set of controls 930. The electronic apparatus 905 can be powered up and down through an on/off switch 935. A screen view 925 may be a digital video display representation of any of the pages of FIGS. 3-6, or other forms of pages according to other embodiment of the present invention. In addition to the control 930 used to navigate the screen view 925, other forms of electronic apparatus 905 may support a "touch screen" interface by a user, such as a child or caregiver.

The network 900 may also include a computer 910, Internet 915, and server 920. The electronic apparatus 905 may communicate wirelessly via Bluetooth® or other wireless or wired protocol with the computer 910 and issue a screen view request, images request, and/or indicators request 940. These requests may be made in a single or separate packet or series of packets 940. Other forms of electronic communications, which are not packets per say, may be employed depending on the technology used to implement the wired or wireless communications. In turn, the computer 910 may forward the requests 940 to the server 920 via the Internet 915. The requests 940 are forwarded from the computer 910 to the server 920 as understood in the art, the implementation of which is not essential to the present invention.

The server 920 may provide software, images, and store a database of some or all of the information needed by the electronic apparatus 905. The server 920, responsive to the requests 940, sends one or more packets 945 with the requested information in a reverse direction to the electronic apparatus 905 via the Internet 915 and computer 910. Other network paths may also be used to send the requested information 945 to the electronic apparatus 905, such as a typical base station (not shown) using a data channel, pager channel, or other communications channel that can support transmission of the requested information 945.

It should be understood that the electronic apparatus 905 may be a generic electronic device having wireless or wired communications capability that can download a software program from the server 920 via any form of network communications paths. The server 920 may learn the type of electronic device 905 to which it needs to provide operating software so as to download a program that can be loaded and executed by a processor (not shown) in the electronic apparatus 905. Moreover, the software may be generic software that can load images from a database at the server 920 to populate various regions of the screen view 925 in a manner known in the software arts.

Figure 10:
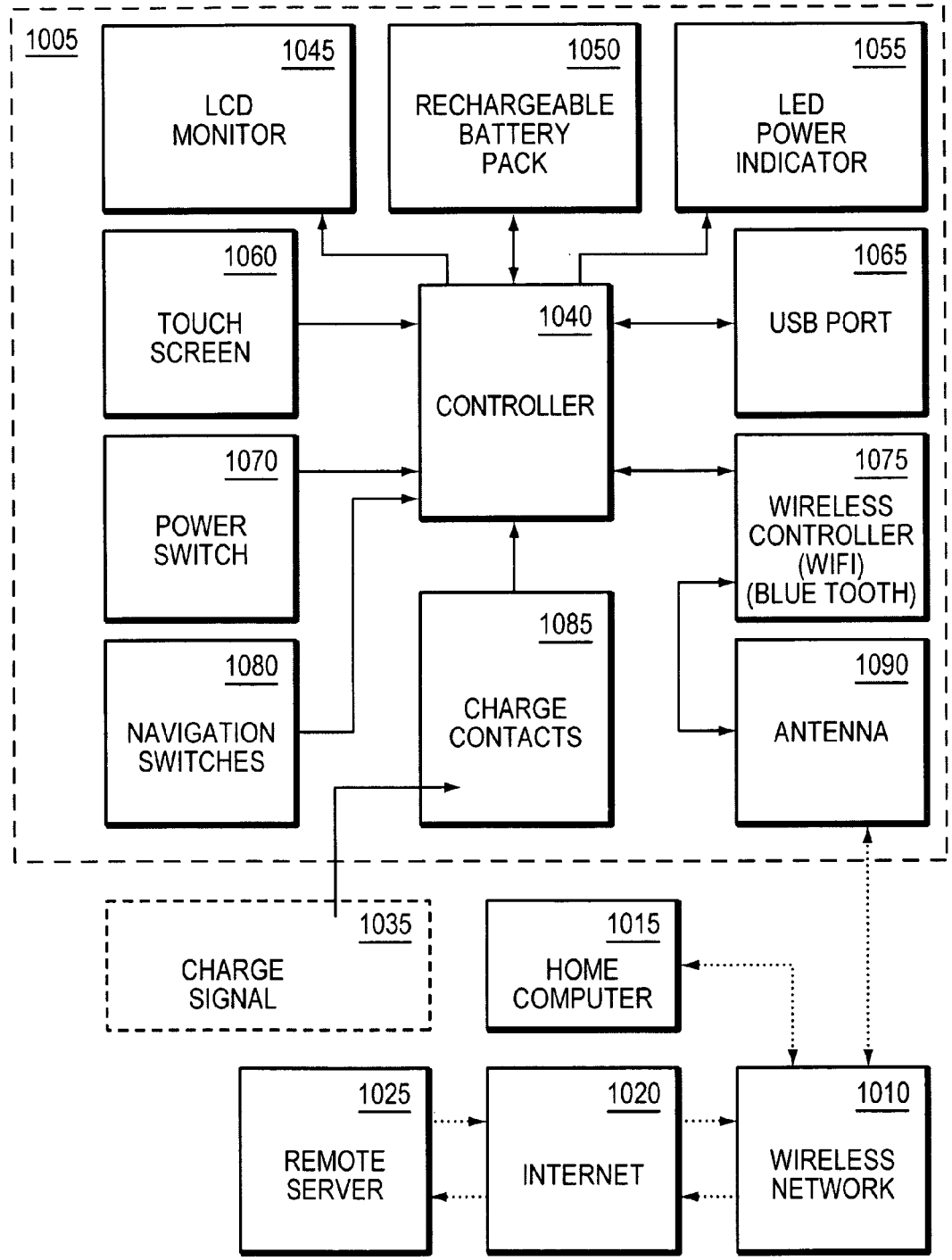
FIG. 10 is a block diagram of a network similar to that of FIG. 9, with detailed blocks corresponding to the electronic device of FIG. 9.

FIG. 10 is a block diagram of a network 1000 that has an electronic apparatus 1005, wireless network 1010, home computer 1015, Internet 1020, and remote server 1025. Communications between or among the different electronic apparatus 1005 and systems 1010, 1015, 1020, and 1025 may be similar to those described in reference to FIG. 9 or other forms of communications, as understood in the communications arts.

The electronic apparatus 1005 includes several components that are used to generate a screen view (e.g., screen view 925) and interact with a user. Specifically, a controller 1040 executes software and interacts with all of the other components in the electronic apparatus, in this embodiment. The controller 1040 provides data to a liquid crystal display (LCD) monitor 1045 to display the screen view. The controller 1040 may receive power from a rechargeable battery pack 1050, in one embodiment. The controller 1040 also communicates with a Light Emitting Diode (LED) power indicator 1055 to inform the user(s) of the power level remaining in their rechargeable battery pack 1050, if applicable.

The controller 1040 may send data and receive data via a Universal Serial Bus (USB) port 1065. The controller 1040 may communicate with a wireless network controller via a wireless controller 1075, such as a wide fidelity (WIFI) communications protocol or Bluetooth® communications protocol, and antenna 1090.

The controller 1040 may also receive power through charge contacts 1085, which may include a power converter that plugs into a wall socket to receive a charge signal 1035 from a 12 Volt DC converter plugged into a wall power outlet.

The controller 1040 may also receive information from a touch screen 1060 with which the user interfaces in order to interact with the electronic apparatus 1005. The controller 1040 may also be sensitive to a state of a power switch 1070 to power up and power down the electronic apparatus 1005. The controller 1040 may also be sensitive to navigation switches 1080 that a user uses to navigate the screen view, such as the screen view 925 illustrated in FIG. 9.

It should be understood that the electronic apparatus 1005 may be non-handheld forms of equipment, such as a desktop computer or video game connected to a television set.

Figure 11:
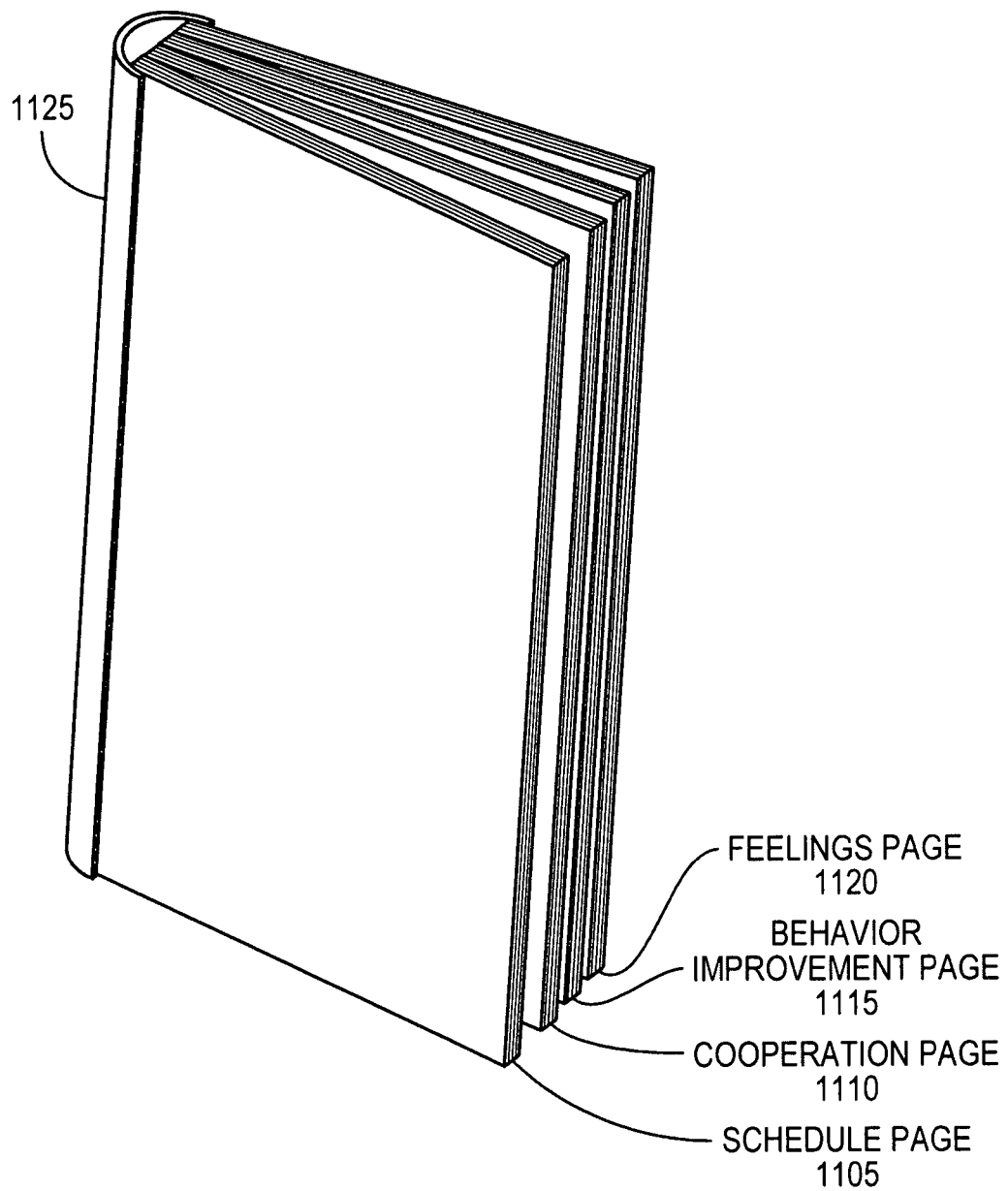
FIG. 11 is an example embodiment in which multiple pages of FIGS. 3-6 are bound together to form a book.

FIG. 11 is an example of a non-technology based embodiment in which a schedule page 1105, cooperation page 1110, behavior improvement page 1115, and feelings page 1120 are organized in the form of a book 1100. The pages 1105-1120 may be held together with a binding 1125 or other element that can be used to securely or loosely connect the pages 1105-1120 together to allow a caregiver or child to carry all of the pages together in a convenient manner.

Figure 12:
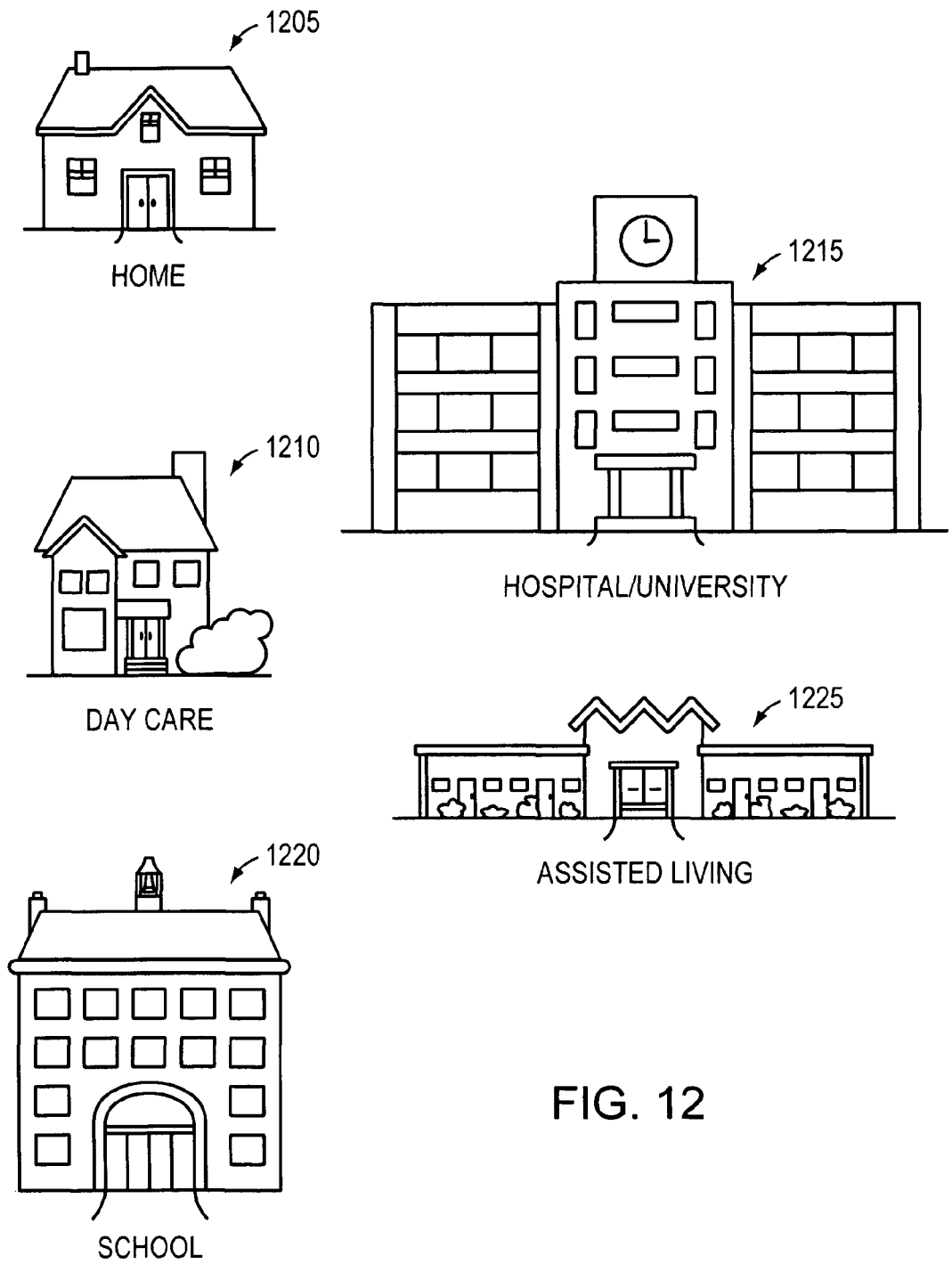
FIG. 12 is a diagram of example environments in which an embodiment of the present invention may be employed to provide consistency among caregivers found in those environments.

FIG. 12 is a diagram including multiple environments 1200 in which a method and apparatus for developing a person's behavior may be used. The example environments 1200 include a home 1205, day care 1210, hospital/university 1215, school 1220, and assisted living 1225. It should be understood that the environments 1200 presented in FIG. 12 are not intended to be restrictive, but are merely presented for illustrative purposes.

Example usage scenarios, environments, pages, and forms (e.g., mechanical or electronic) have been presented in FIGS. 1-12. FIGS. 13-19 are described below and illustrate other example scenarios in which embodiments of the present invention may be employed. FIGS. 20-28 illustrate detailed apparatus embodiments that may be used to form a mechanical apparatus similar to those of FIGS. 3-6.

Figure 13:
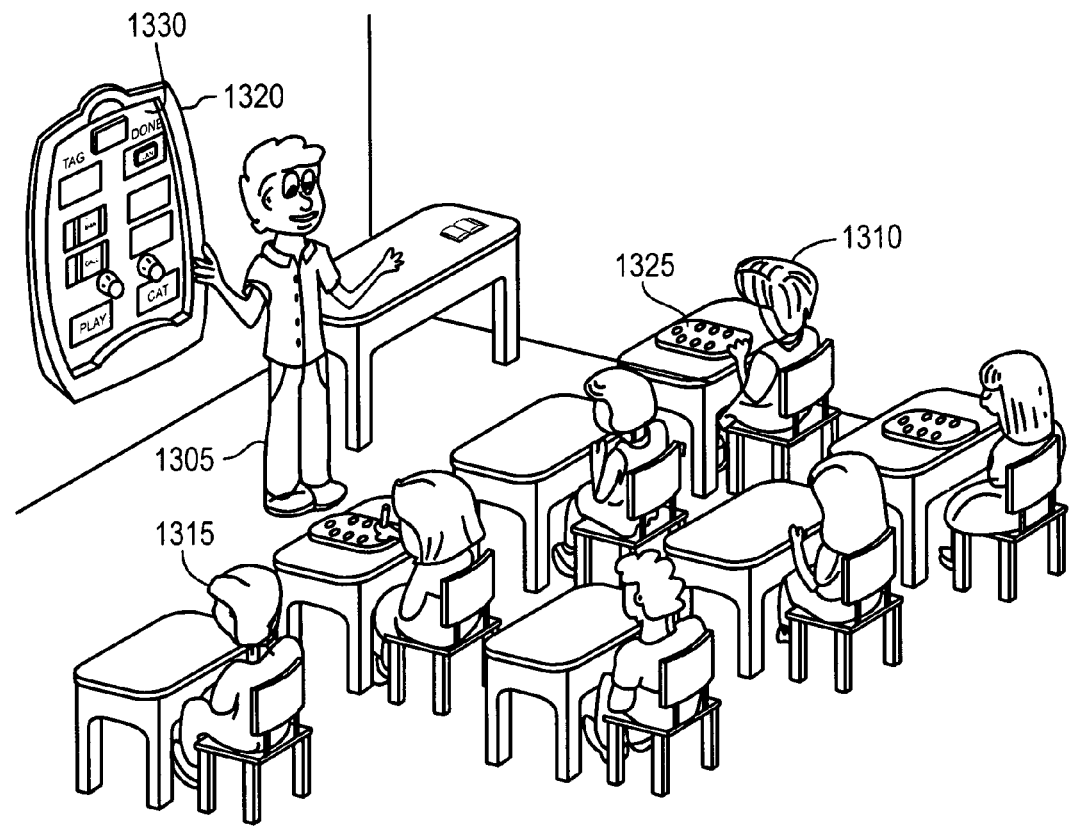
FIGS. 13-19 are diagrams illustrating other environments in which embodiments of the present invention may be employed.

FIG. 13 is a classroom scenario 1300 in which a caregiver, in this case a teacher 1305, is working with children 1310 and 1315 who have and do not have an apparatus 1325, respectively, to use in the classroom. The teacher 1305 has a very large example apparatus 1320 that he can use to present how to use the apparatus 1325 the students 1310, 1320 use. In one scenario, the teacher 1305 configures the apparatus 1320 with a schedule page 1330 and asks that the students 1310 with personal versions of the apparatus 1325 to follow along with him. In this way, the teacher 1305 can teach the usage of the apparatus to allow the students 1310 to select a task and/or schedule for completing a task.

Figure 14:
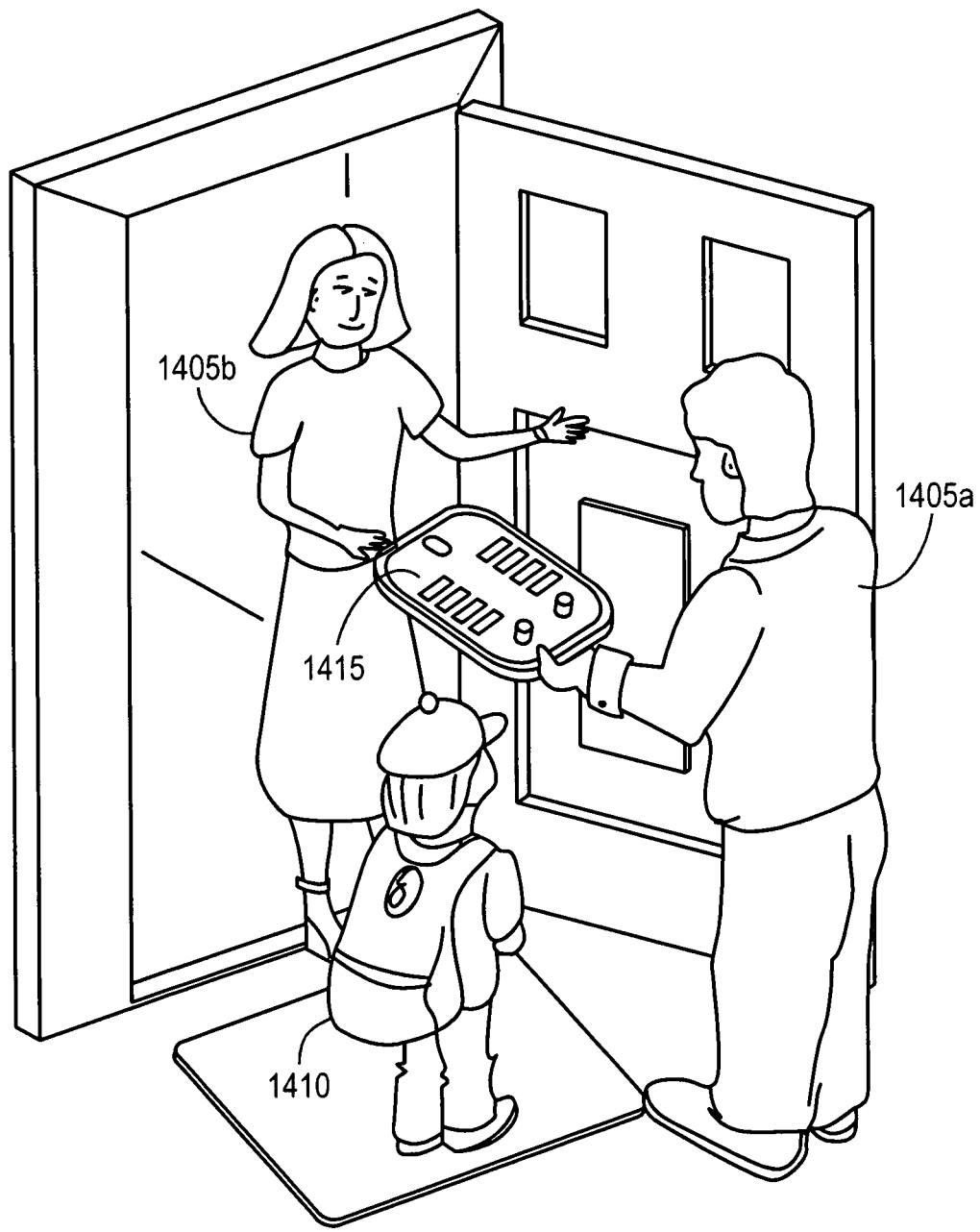

FIG. 14 is another scenario 1400 which a first caregiver 1405a can hand-off an apparatus 1415 to a second caregiver 1405b so that the child 1410 can use the same apparatus 1415 he used while with the first caregiver 1405a. For example, the first caregiver 1405a may be a parent, and the second caregiver 1405b may be a teacher or babysitter. In this way, the child 1410 can feel secure in using the same apparatus 1415 while being cared for by his parent, teacher, or babysitter, for example. Thus, by having the apparatus 1415 be a handheld mechanical or electronic device, a child 1410 can have it available everywhere he or she goes to maintain a consistent behavioral learning process.

Moreover, the first caregiver 1405a can configure the apparatus 1415 with or without the child 1410 prior to giving it to the second caregiver 1405b to either save time while the child 1410 is in the care of the second caregiver 1405b or to allow the first caregiver 1405a to be the person responsible for or participating in the child's 1410 behavioral learning process.

Figure 15:
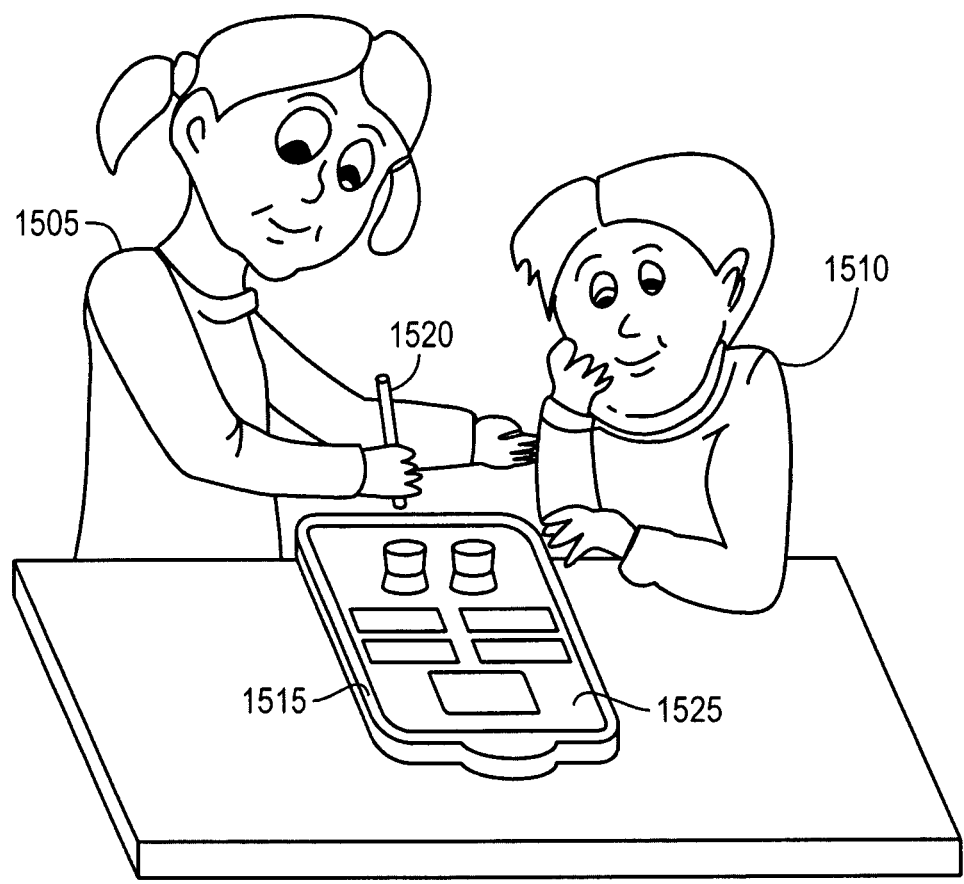

FIG. 15 is another scenario 1500 in which a babysitter 1505 works with the child 1510 and uses a behavioral learning apparatus 1515. In this scenario 1500, the babysitter 1505 uses a dry erase marker 1520 to write on dry erase portions of a page 1525 configured on the apparatus 1515. Thus, the child 1510 can maintain continuity from parent to babysitter 1505 and have security of having his behavioral learning apparatus 1515 available with both the parent and babysitter.

Figure 16:
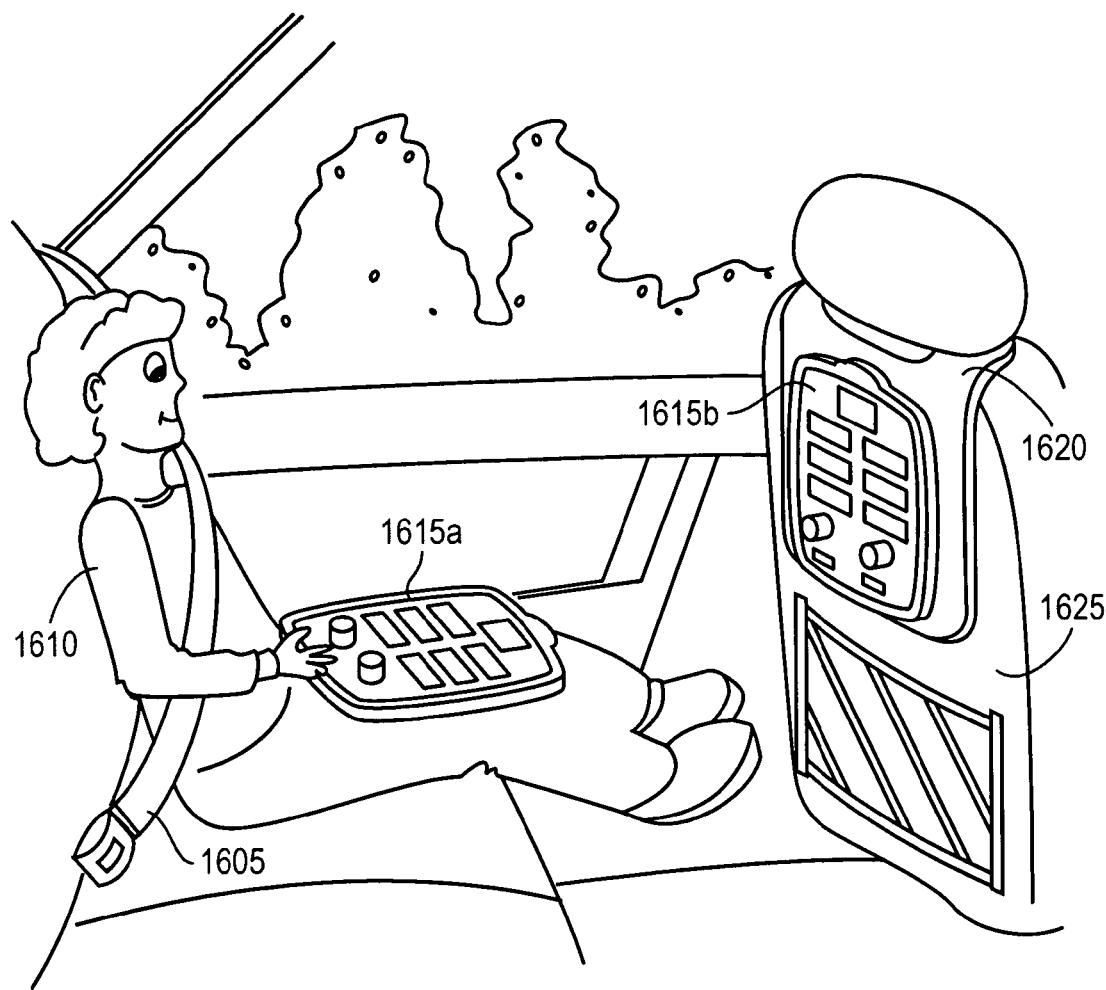

FIG. 16 illustrates another scenario 1600 which a child 1610, wearing a seatbelt 1605, has a behavioral learning apparatus 1615a, either in his lap or suspended off a front car seat 1625 by a support 1620. The support 1620 may secure a second behavioral learning apparatus 1615b or, alternatively, can simply store the behavioral learning apparatus 1615a that the child 1610 currently has in his lap. In this way, the child 1610 can continue behavioral learning while traveling and in a car.

There may be several tasks that the child 1610 may need or want to learn while riding in a car, such as how to buckle his seatbelt 1605, read road signs, or read maps. It should be understood that any other tasks or behavioral learning activities may also be presented to the child 1610 while riding in the car, such as how to remain calm while riding in the car during high traffic conditions or rainstorms.

Figure 17:
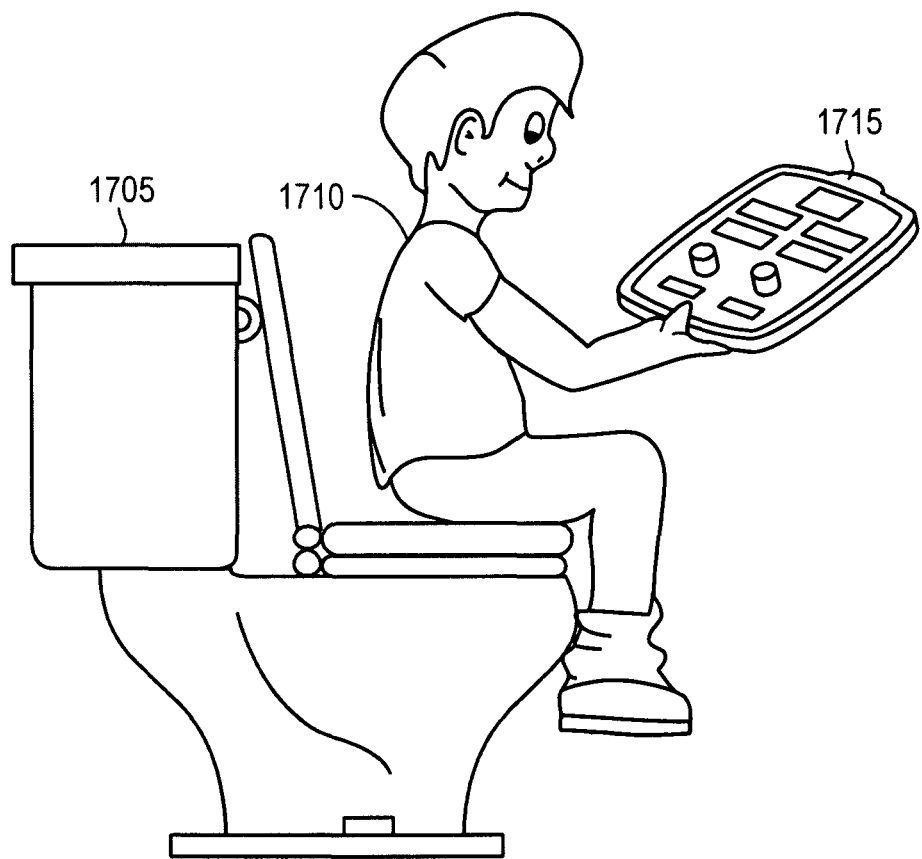

FIG. 17 is another scenario 1700 in which a child 1710 may use a behavioral learning apparatus 1715. In this scenario 1700, the child 1710 is sitting on a toilet and uses the behavioral learning apparatus 1715. The behavioral learning apparatus 1715 may be configured with tasks associated with personal hygiene associated with going to the bathroom, such as using toilet paper, flushing the toilet, putting down a toilet seat after use, and washing hands after going to the bathroom.

Figure 18:
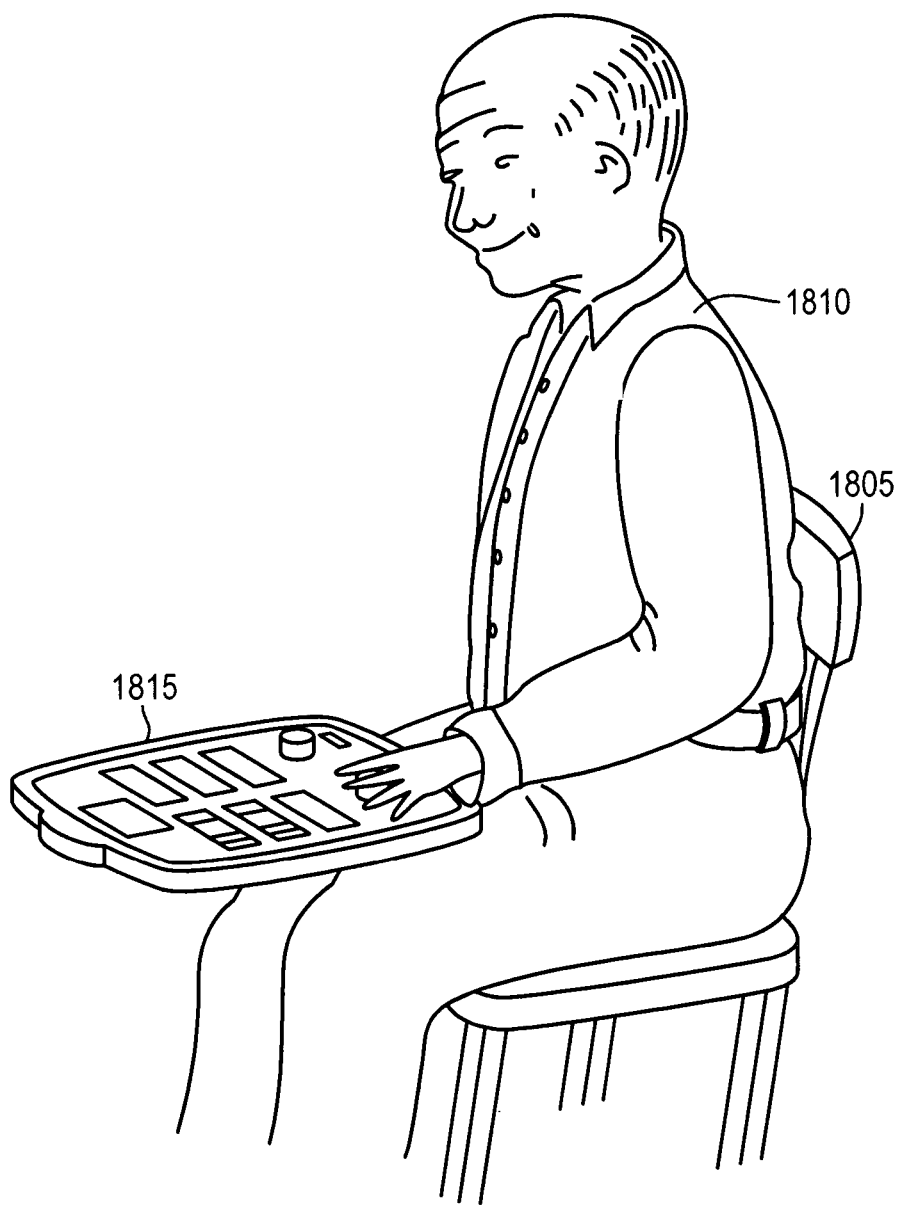

FIG. 18 is a scenario 1800 in which an elderly person 1810 is sitting on a chair 1805 and using a behavioral learning or schedule apparatus 1815. In this case, the elderly person 1810 may have a form of neuro-degenerative disease, such as Alzheimer's, and an embodiment of the apparatus 1815 may be configured with a page or multiple pages to provide the type of support that the elderly person 1810 needs at his stage of life. Because the apparatus 1815 is transportable, the elderly person 1810 can carry the apparatus 1815 with him to an elderly persons' center, home, hospital, and so forth.

Figure 19:
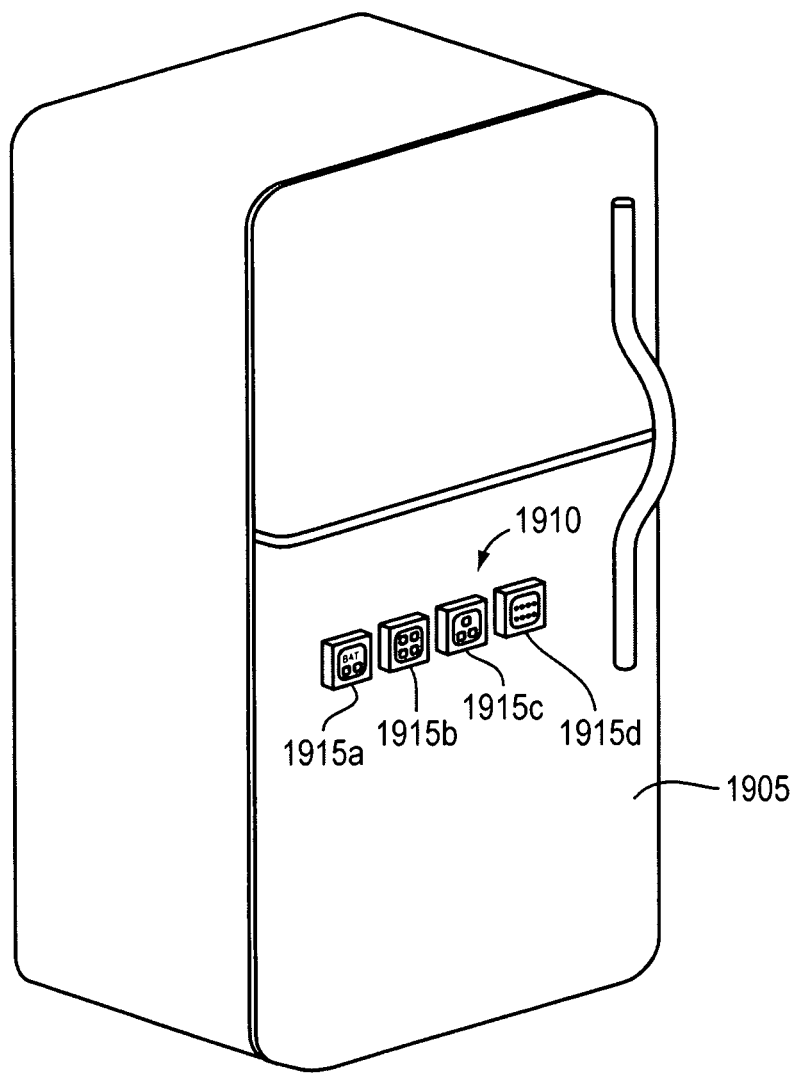

FIG. 19 is another scenario 1900 in which an embodiment of the present invention may be employed. In this scenario 1900, a refrigerator 1905 made of metal has the area 1910 which tiles 1950a-d are connected to the refrigerator 1905 by way of respective magnets (not shown). The tiles 1915a-d can be arranged in any order, such as in the form of a schedule, as illustrated FIG. 3. Similarly, the tiles 1915 a-d can be arranged in the form of another page, such as a cooperation page 400 (FIG. 4), behavior improvement page 500 (FIG. 5), or feelings page 600 (FIG. 6). Moreover, although not shown, it should be understood that any of the foregoing or other forms of pages can be supplied in the form of a large, flexible, low-profile, refrigerator magnet, and tiles 1915a-d can be applied to those magnets in a typical magnetic manner. It should also be understood that the tiles 1915a-d can alternatively be connected to the refrigerator 1905 by way of suction cup, temporary adhesive, Velcro®, or other material.

FIGS. 20-28 illustrate other example embodiments according to the principles of the present invention. In particular, these figures illustrate various mechanical designs in which the present invention can be implemented.

Figure 20:
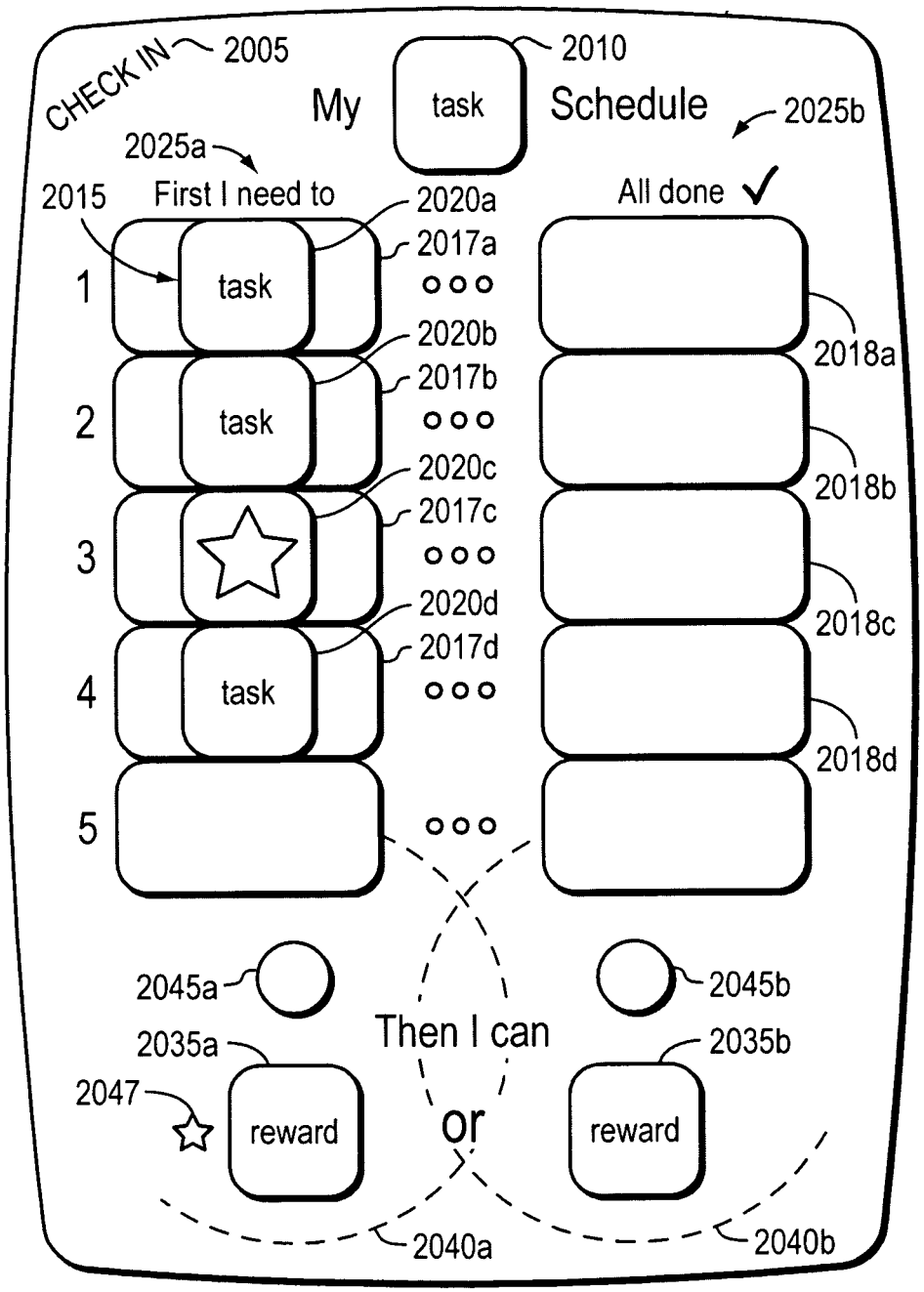
FIGS. 20-22 are diagrams illustrating other embodiments of the scheduled page of FIG. 3.

FIG. 20 is a schematic diagram of a schedule page 2000. The schedule page 2000 includes a "check in" indicator 2005 to remind the caregiver to check on a mental status of the child. A task indicator 2010 is located at the top of the page 2000. It should be understood that the task indicator 2010 can be selectively set or permanently set depending on the embodiment. Preferably, so as to be useful for many different schedules, the task indicator 2010 is interchangeable. The schedule page 2000 includes a subtask column 2025a and an "all done" column 2025b. In the subtask column 2025a, a series of subtask indicators 2020a-d are attached to openings or magnetic strips 2017a-d, where an interface 2015 between the subtask indicators 2020a-d and the openings or magnetic strips 2017a-d are metallic or magnetic. When a subtask is complete, the child may take the task indicators 2020a-d and move them sequentially to the "all done" column 2025a-d or areas 2018a-d located horizontally across from their initial positions in the subtask column 2025a.

The schedule page 2000 may include knobs 2045a, 2045b connected to wheels 2040a, 2040b, which reside behind the physical page 2000 or in-between layers composing the physical schedule page 2000 that support reward indicators 2035a, 2035b from which a child can choose after completing all of the subtasks. In this example embodiment, a star 2047 indicates that a corresponding reward 2035a can be selected by completing the third subtask 2020c or if completing the third subtask 2020c within a timely manner, for example. This provides the child with extra encouragement to complete the third subtask 2020c.

Figure 21:
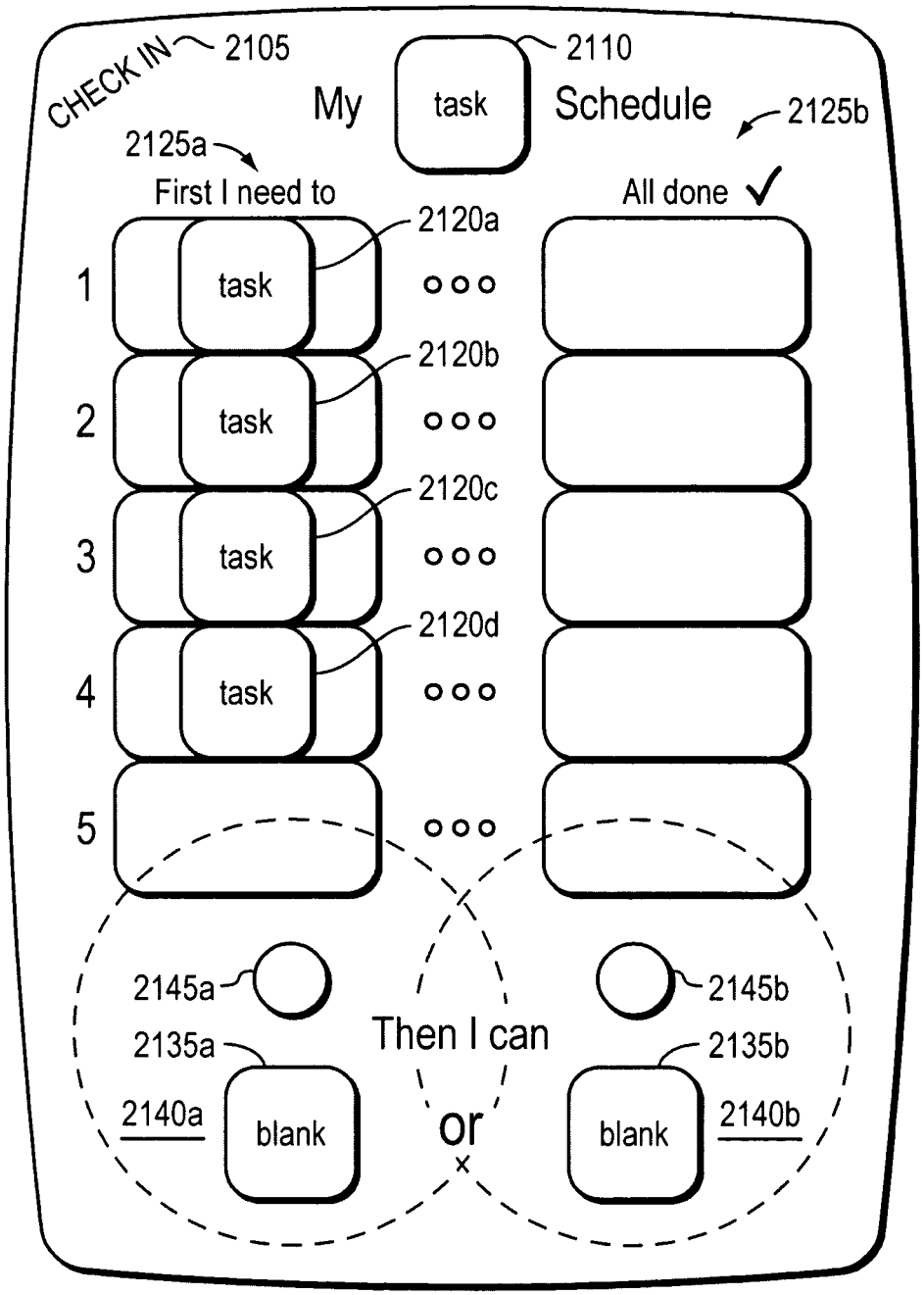

FIG. 21 is another example schedule page 2100. This schedule page 2100 differs from the schedule page 2000 of FIG. 20 in that it includes "blanks" 2135a, 2135b rather than rewards. These blanks can be non-reward indicators that a caregiver can use when a reward per se is less applicable than some other choices after completing a series of subtasks 2120a-d to complete an overall task indicated by the task indicator 2110. Similar to the schedule page of FIG. 20, the schedule page of FIG. 21 includes any mental state reminder 2105, subtask column 2125a, "all done" column 2125b, and choice selection dials 2145a, 2145b connected to wheels 2140a-2140b.

Figure 22:
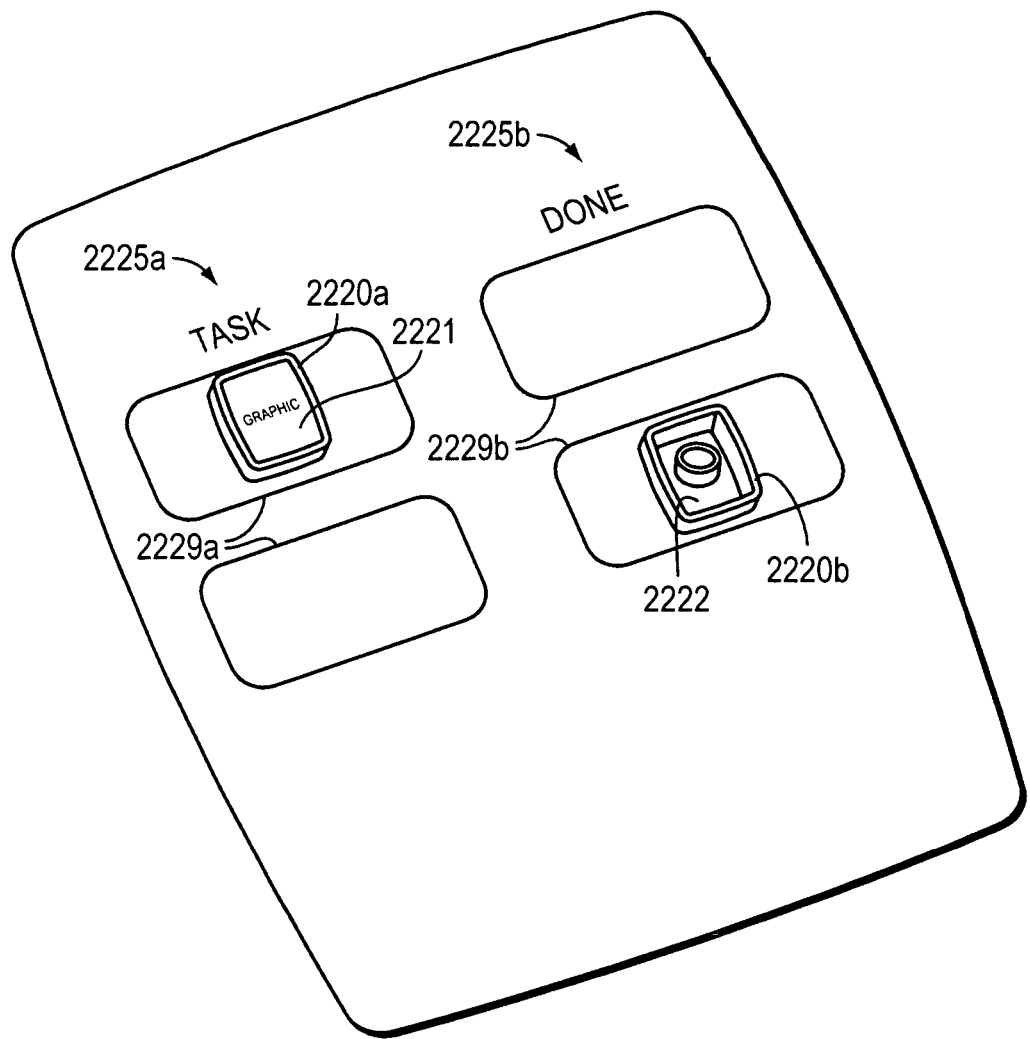

FIG. 22 is a diagram of a schedule page 2200 having a subtask column 2225a and a completion column 2225b. In this embodiment, a task indicator tile 2220a is positioned with a graphic 2221 presented to a user when in the subtask column 2225a, and the graphic faces away from the user in the completion column 2225b. This may be implemented by having magnetic pads 2229a in the subtask column 2225a arranged so that the magnet 2222 associated with the subtask indicator tile 2220a only connects to the pads 2229a in a first direction, and pads 2229b in the completion column 2225b only allows the magnet 2222 in the subtask indicator tile 2220b to adhere while the graphic 2221 is facing the task page 2200. In other words, the pads 2229a may have (i) a magnetic north pole projecting outward from the page 2200 to allow a south pole of the magnet 2222 projecting away from the graphic 2221 of the subtask tile 2220a to be attracted, and (ii) a magnetic south pole projecting outward from the page 2200 so that the graphic 2221 has to face the page 2220 to be attracted to the pads 2229b in the task completion column 2225b.

FIG. 23A is a front view of an example behavior improvement apparatus 2300. The apparatus 2300 includes a frame 2305 that supports a page 2310 as described above in reference to FIGS. 3-6, 20, or other example pages. The page 2310 includes control knobs 2345a, 2345b that can be used to position choice indicators (not shown) through windows 2337a-2337b, as previously described. The frame 2305 includes rubber feet 2355 to grip onto a surface. Other forms of feet may be used, such as suction cups. In this embodiment, the frame 2305 also has a clasp 2350 clasps onto the page 2310 in a manner securing it to the frame 2305. To release a page, the clasp 2350 is, in one embodiment, pressed toward the back of the frame 2305.

FIG. 23B is a side view of the example apparatus 2300. The frame 2305 has a given thickness that may be changed depending on the circumstances and strength of materials being used to form the frame and has the knobs 2345b projecting towards the left, as expected in this side view of the right side of the frame 2305.

Figure 23C:
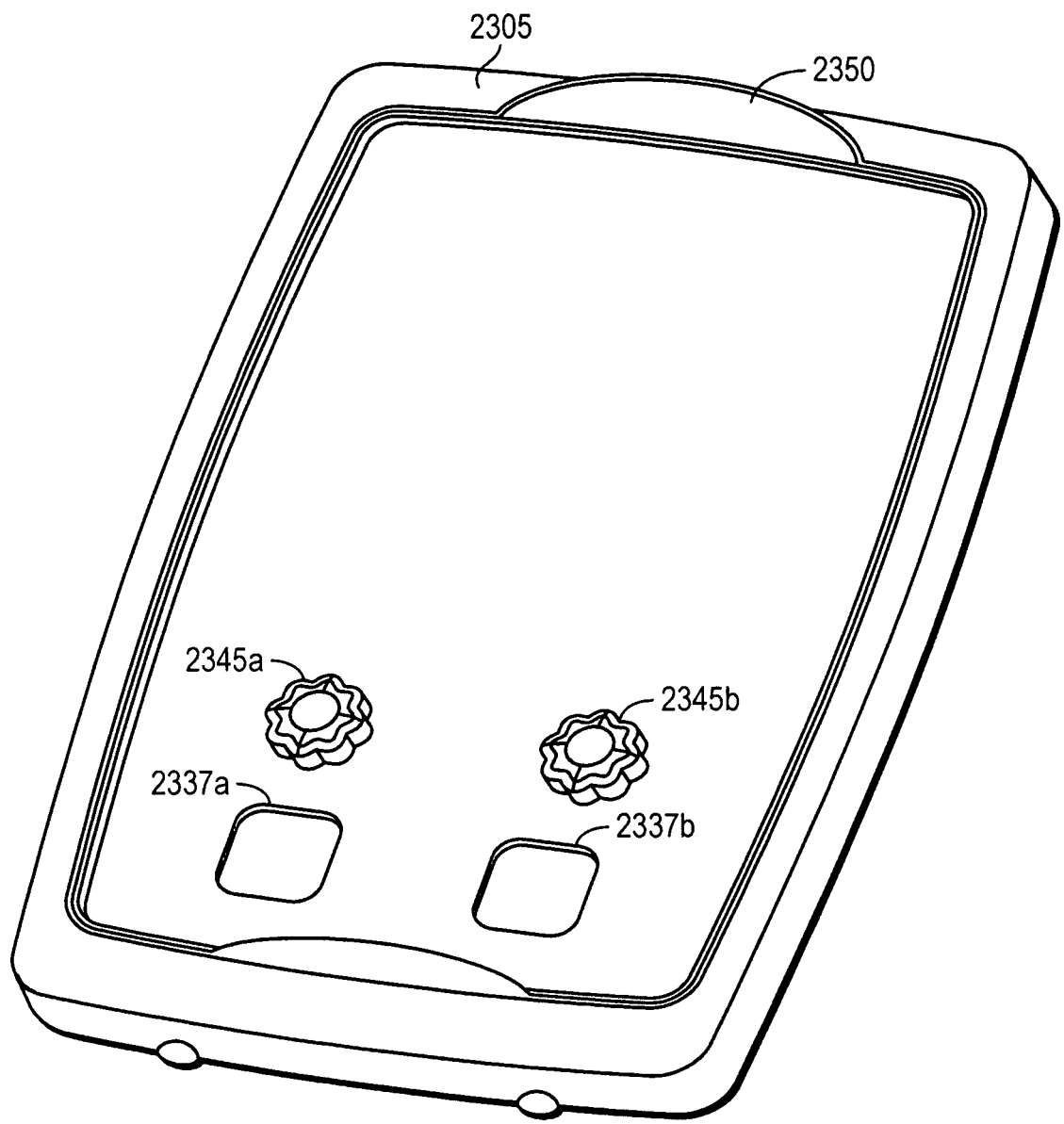

FIG. 23C is an offset view of a behavior improvement apparatus 2300. In this view, a depth of the windows 2337a, 2337b through which choice indicators appear can be seen.

Figure 24A:
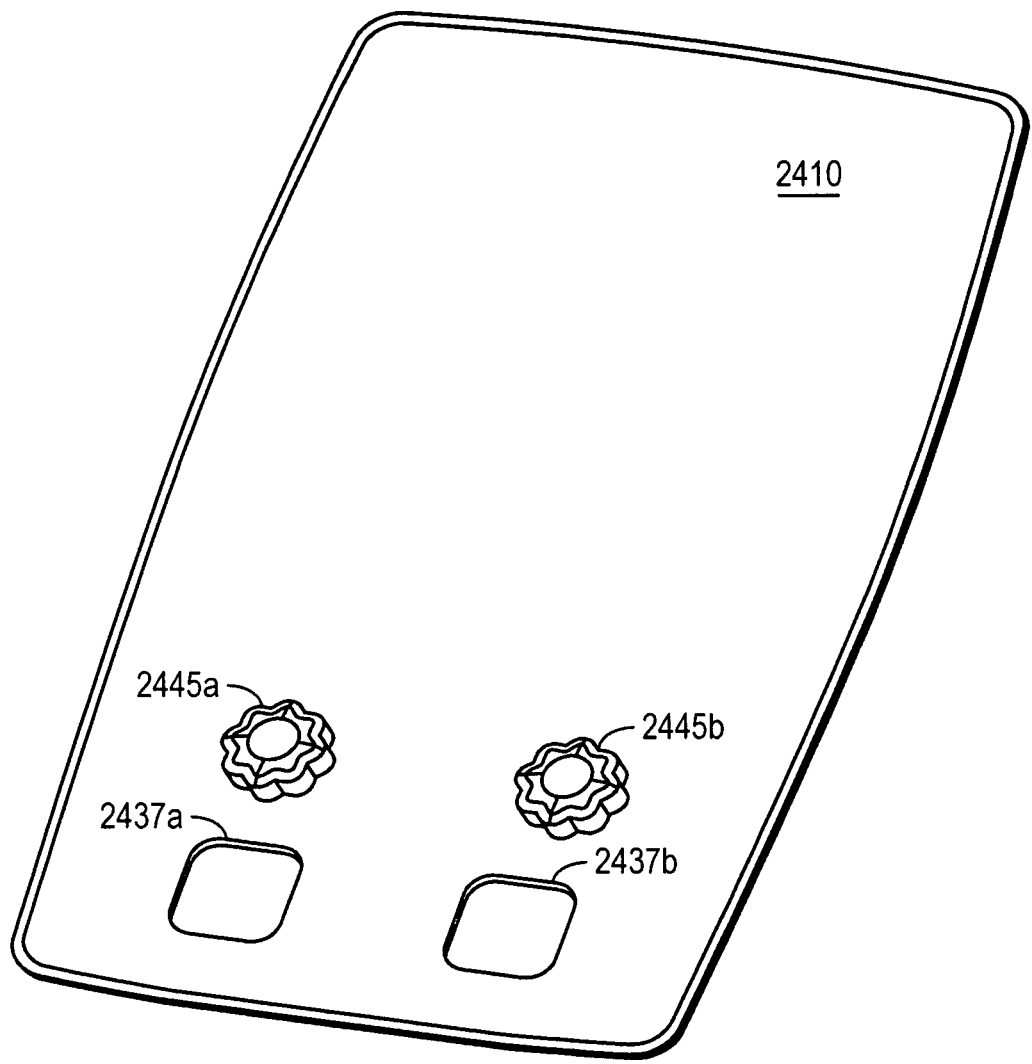
FIG. 24A-B are front and rear views of an embodiment of a page similar to those of FIGS. 3-6.

FIG. 24A is a front view of a page 2410 that is detached from the frame of the behavioral learning apparatus 2300 (FIG. 23A). As illustrated, the control knobs 2445a, 2445b stay with the page 2410 in this embodiment, and the choice windows 2437a, 2437b also move with the page 2410, as expected. Although not shown, a pair of choice wheels corresponding to the choice control knobs 2445a, 2445b may also stay with the page 2410. In other embodiments, the choice control knobs 2445a, 2445b may insert into wheels that are maintained or interchangeably maintained with the frame 2305 rather than being permanently connected to the page 2410.

Figure 24B:
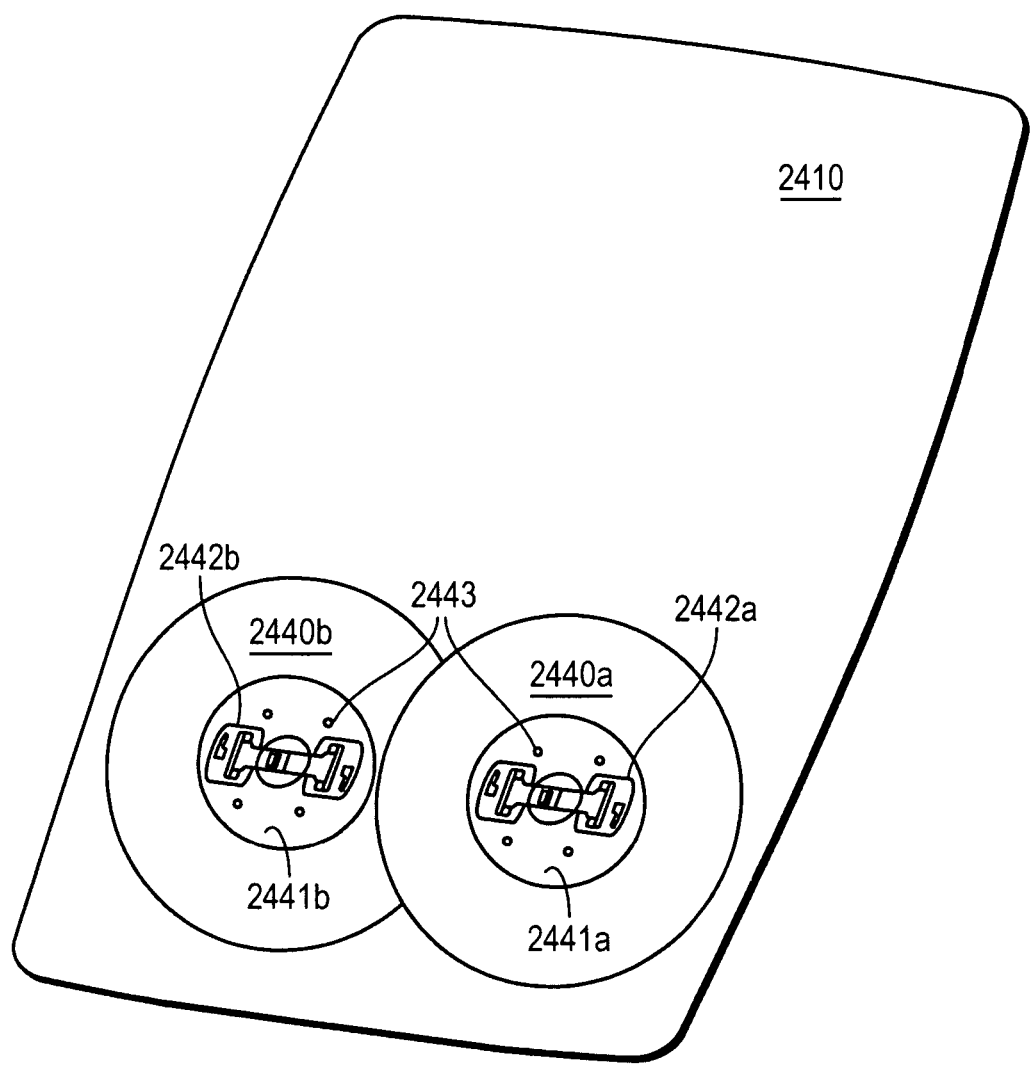

FIG. 24B is a rear view of the page 2410. In this embodiment, the choice wheels 2440a, 2440b are permanently connected to the page 2410 by way of respective small circular disks 2441a, 2441b physically attached to the wheels 2440a, 2440b and connected to the choice control knobs 2445a, 2445b (FIG. 24A) by way of a pair of respective couplings 2442a, 2442b. It should be understood that any other forms of couplings between the control knobs 2445a, 2445b and the choice selection wheels 2440a, 2440b may also be employed. In this particular example, the small wheels 2441a, 2441b may have some grips or detents 2443 that connect them to the choice wheels 2440a, 2440b.

Figure 25A:
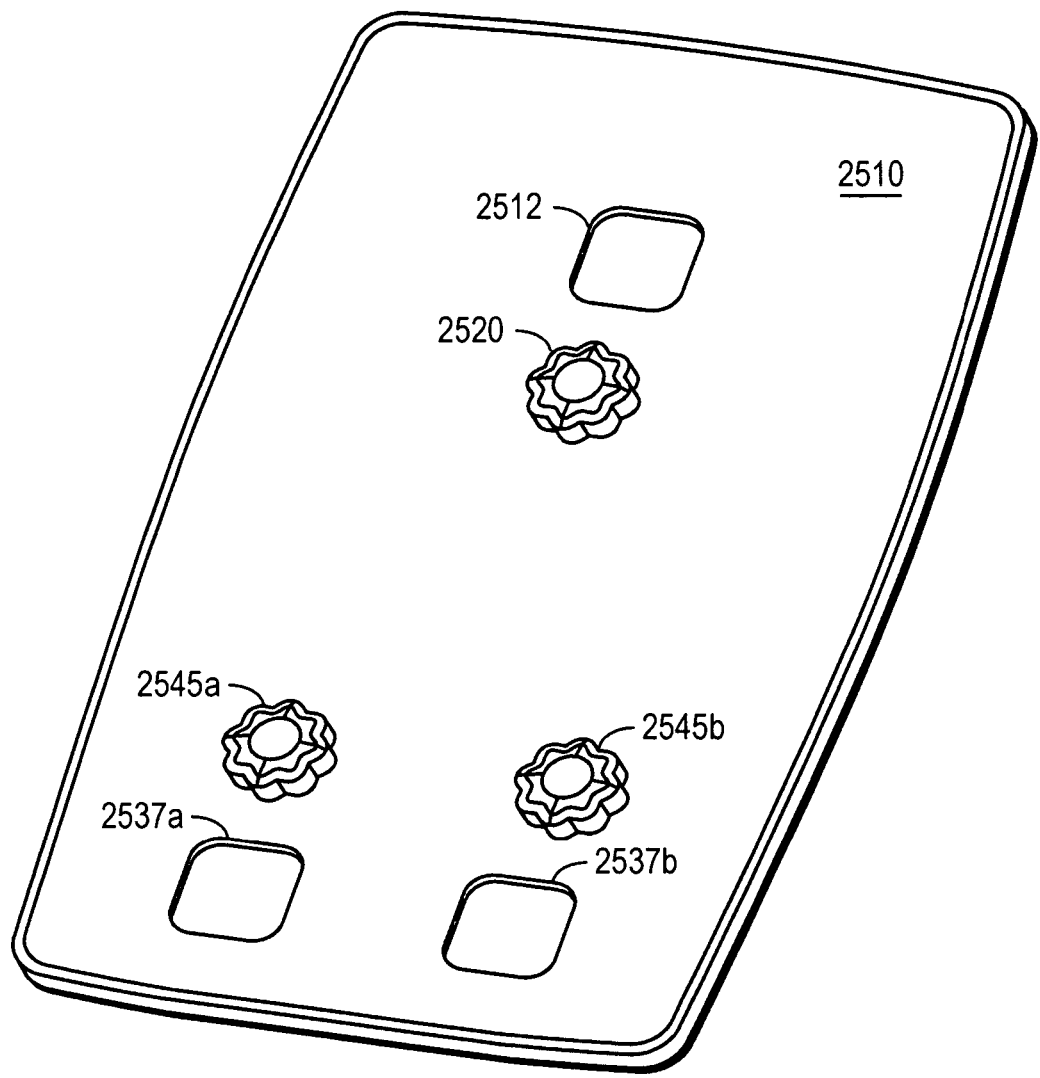
FIGS. 25A-B are mechanical diagrams illustrating an alternative embodiment of the page of FIGS. 24A-D.

FIG. 25A is a front view of a page 2510 that has a task selection knob 2520 to allow a task indicator (not shown) to appear through a task window 2512. It should be understood that the indicator to appear through the task window 2512 may be a behavior, feeling, emotion, mental state, or other indicator, as described herein.

Figure 25B:
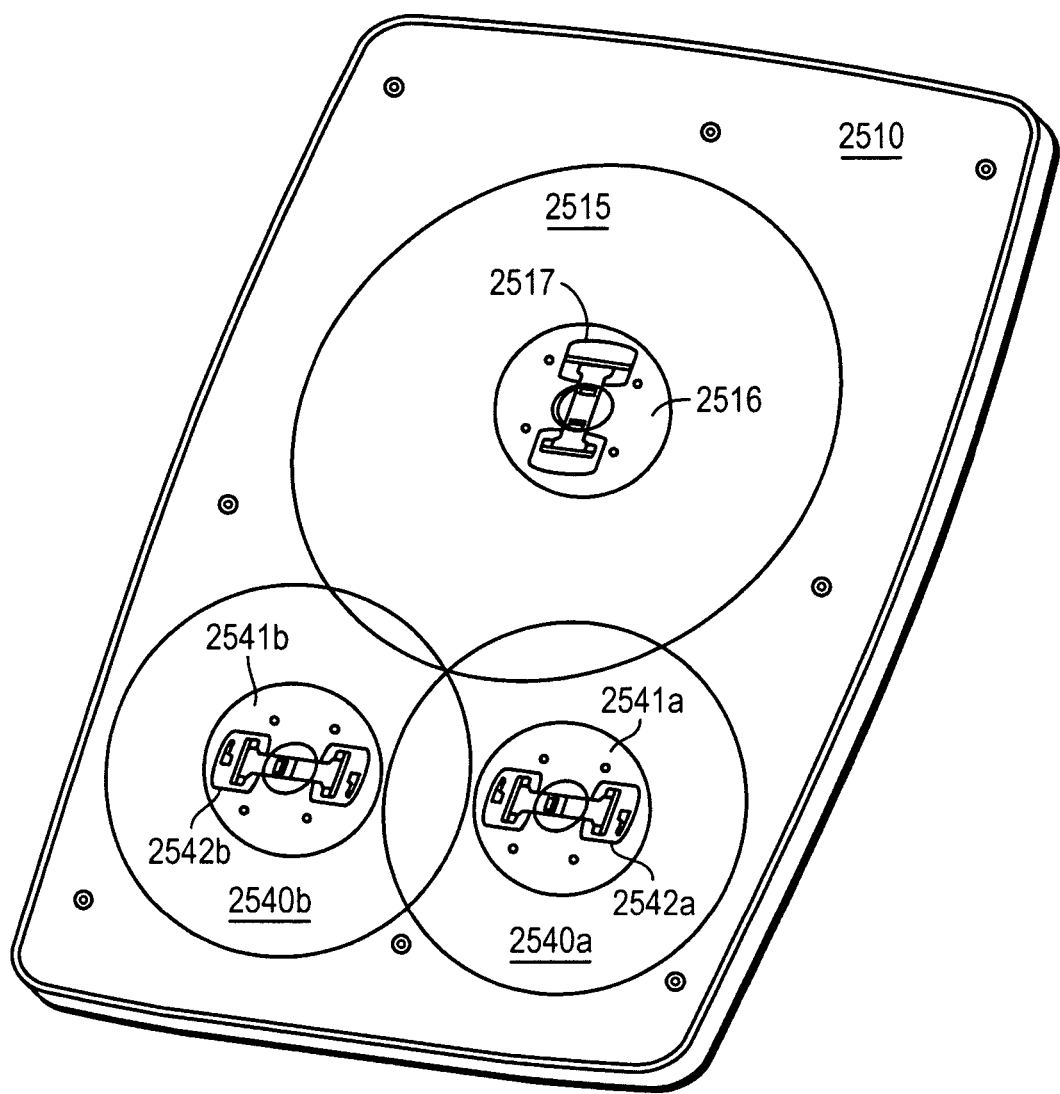

FIG. 25B is a rear view of the page 2510 that illustrates a third wheel 2515 that includes the task, feeling, emotion, mental state, or other indicator (not shown) on the wheel. Couplings 2516, 2517 may be similar to those described above in reference to FIG. 24B. The same forms of wheels and couplings 2540a, 2540b, 2541a, 2541b, 2542a, 2542b, as described above in reference to FIG. 24B may be used in the embodiment of FIG. 25B.

Figure 26:
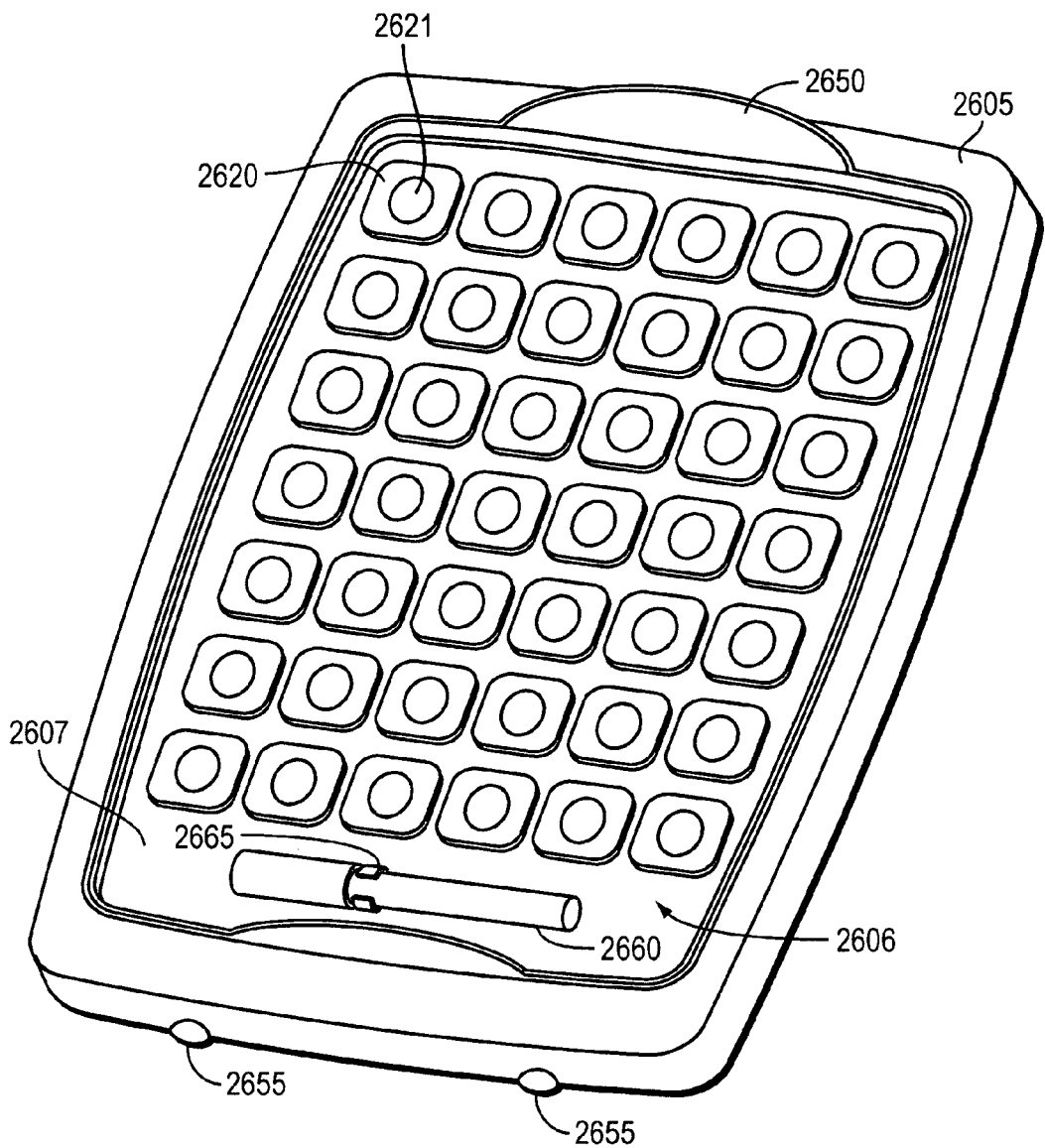
FIG. 26 is a front view of an apparatus similar to FIGS. 23A-C having a series of tiles supporting visual indicators in a cavity between a page and a back plate of the apparatus.

FIG. 26 is a diagram of an example embodiment of an apparatus 2600 without a page connected to it. In this embodiment, a frame 2605 has an interior cavity 2606 exposed that is normally covered by a page. The cavity has a base plate 2607 that may be metallic or magnetic to allow magnets 2621 that are inserted into tiles 2620 to remain substantially positionally fixed on the base 2607. The cavity 2606 may also be deep enough to allow a dry erase marker 2660 to be kept in the cavity 2606 beneath the page (not shown). In this embodiment, a clasp 2665 may be provided to hold the dry erase marker 2660 substantially positionally fixed. The frame 2605 may also include a clasp 2650 that holds a page (not shown) in place over the cavity 2606. Further, in this embodiment, a pair of feet 2655 are connected to a bottom edge of the frame 2605 so as to allow it to stand upright on a surface without sliding.

Figure 27A:
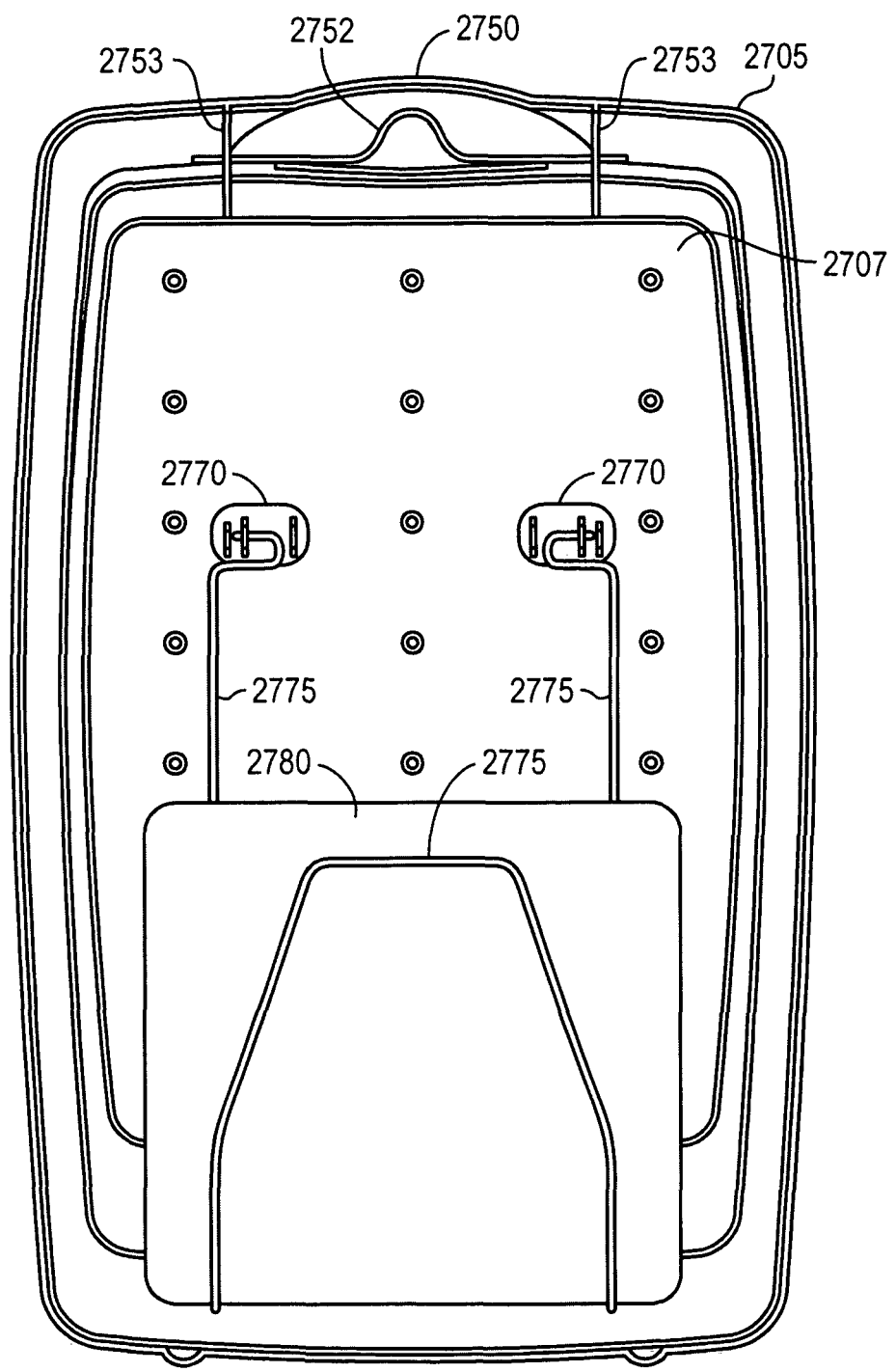
FIGS. 27A-B are mechanical diagrams illustrating a kickstand design to prop the apparatus in a near vertical position that may also be used to store at least one companion book.

FIG. 27A is a rear view of an example embodiment of a behavioral learning apparatus 2700. A frame 2705 has a base plate 2707 that may be metallic, magnetic, or, for example, plastic. A base plate has a pair of surface mount interconnects 2770 to which a wire frame 2775 is connected to the base plate 2707. Similarly, a wire spring 2752 is interconnected to the frame 2705 via a pair of support ribs 2753. The wire spring 2752 provides restoration force to a page clamp 2750 to maintain a positive force on the page to keep it in the frame 2705, as described in reference to FIG. 23A.

In this embodiment, the wire frame 2775 is designed to hold a companion book 2780 or other pamphlet that the caregiver or child may use in understanding how to use the pages, such as a schedule page or behavior improvement page. In other embodiments, the base plate 2707 may be equipped with a pouch or other structure to hold companion books 2780 or other items that may be used with the behavior improvement apparatus 2700.

Figure 27B:
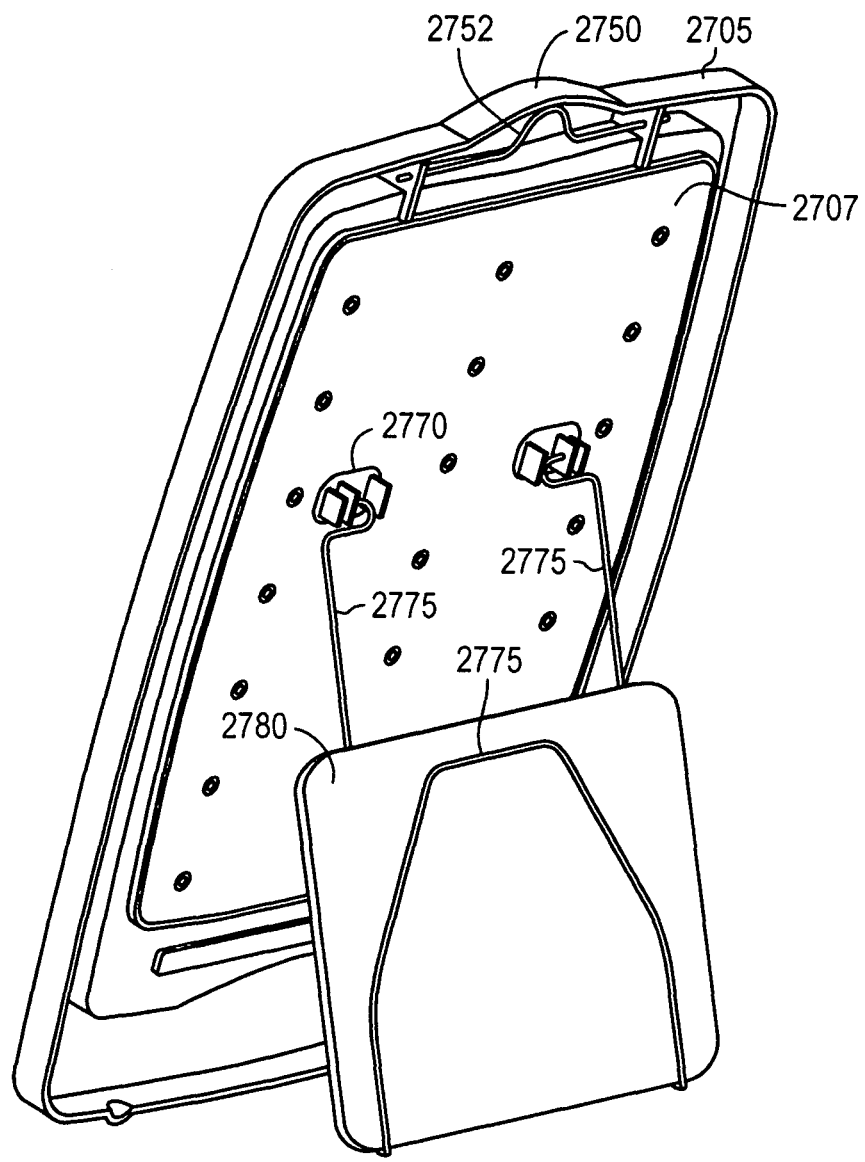

FIG. 27B is an isometric rear view of the behavior improvement apparatus 2700 illustrated in FIG. 27A. As illustrated, the wire frame 2775 acts as a "kick stand" to keep the frame 2705 standing in an upright position to allow the child or caregiver to easily view a page positioned on the front of the frame, as previously described.

Figure 28:
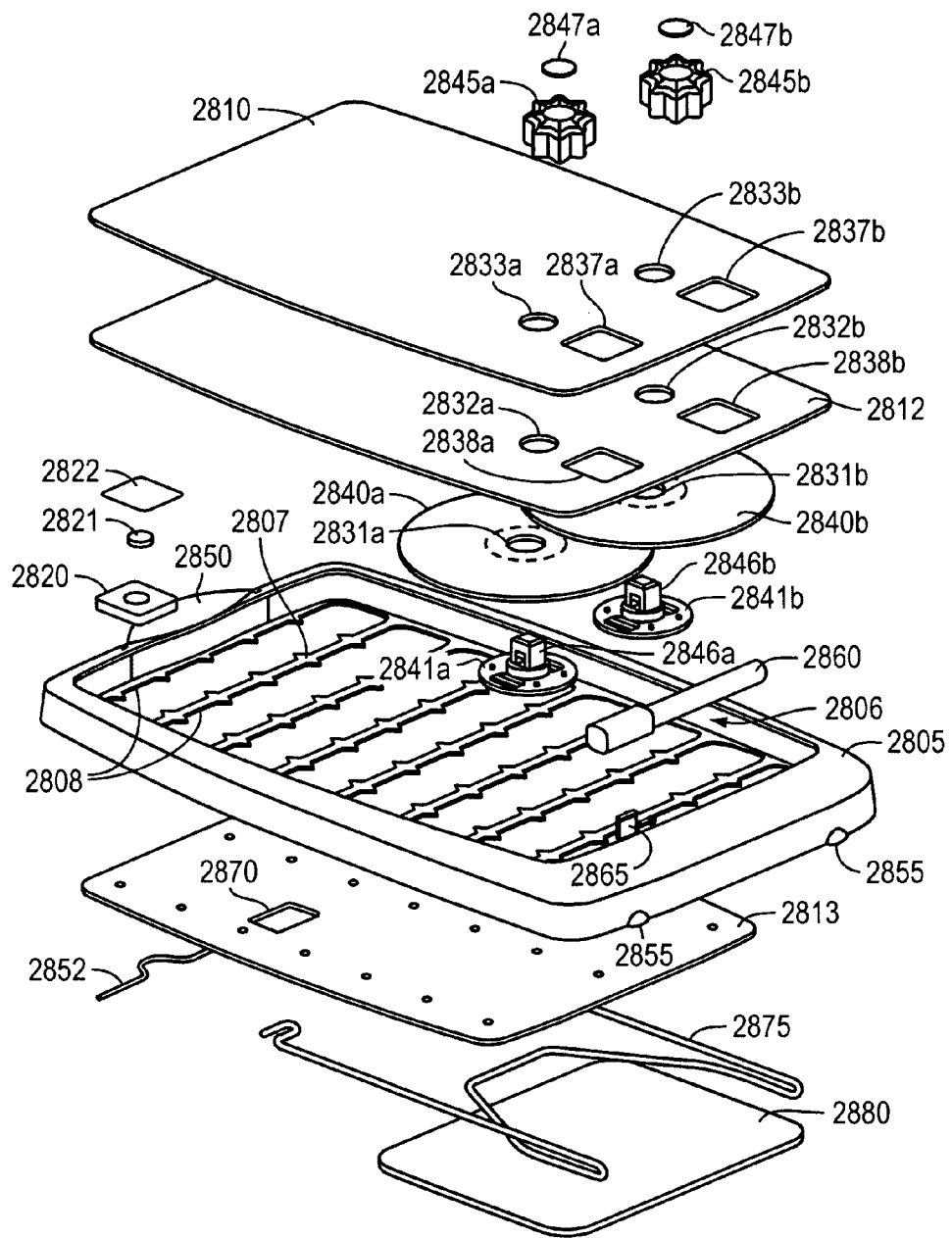
FIG. 28 is an exploded view of an embodiment of an apparatus illustrated in FIGS. 20-27B.

FIG. 28 is an exploded view of an assembly of an example behavior improvement apparatus 2800. Starting at a frame 2805 of the apparatus 2800, indentations 2808 define locations where indicator chips 2820 with magnets 2821 and magnet retention plates 2822, which may have an image printed or adhered thereto, reside. The indentations 2808 are defined in a floor 2807 of the frame 2805 above a base plate 2813 that is connected via rivets, screws or other mechanism well understood in the art of mechanical assembly technology. Also found within the cavity 2806 is a dry erase marker 2860 that may be held in place by a dry erase marker retention frame 2865.

A pair of knob back plates 2841a, 2841b is connected to respective knob extenders 2846a, 2846b. The knob extenders extend through feedthrough holes 2831a, 2831b at centers of respective choice wheels 2840a, 2840b, which, in final assembly, have choice indicators (not shown) depicted thereon. A front panel 2812 and page panel 2810 have respective feedthrough holes 2832a, 2832b, 2833a, 2833b to allow the knob extenders 2846a, 2846b to extend therethrough such that knobs 2845a, 2845b can be connected for use by a user to turn the choice indicator wheels 2840a, 2840b. A pair of cover plates 2847a, 2847b are "snapped" into place after the knobs 2845a, 2845b have been connected to the knob extenders 2846a, 2846b.

The front panel 2812 and page panel 2810 have windows 2838a and 2838b, 2837a, 2837b that align with each other and with indicators on the indicator wheels 2840a, 2840b to allow a user to view the choice indicators (not shown). On a back panel 2813, an interconnect 2870 allows for a wire frame 2875 to attach to the rear plate 2813. A wire spring 2852 is connected to the frame 2805 in a manner to allow a frame release button 2850 to function in a manner allowing the user to have the page panel 2810 to stay positively attached to the frame 2805 while in use and allow for disconnection of the page panel 2810 from the frame 2805 by pressing on the page release button 2850. A pair of rubber feet 2855 may also be provided with the frame 2805. A user guide 2880 may also be provided and be available for storage in the wire frame 2875 while not be used by a caregiver or user.

Figure 29A:
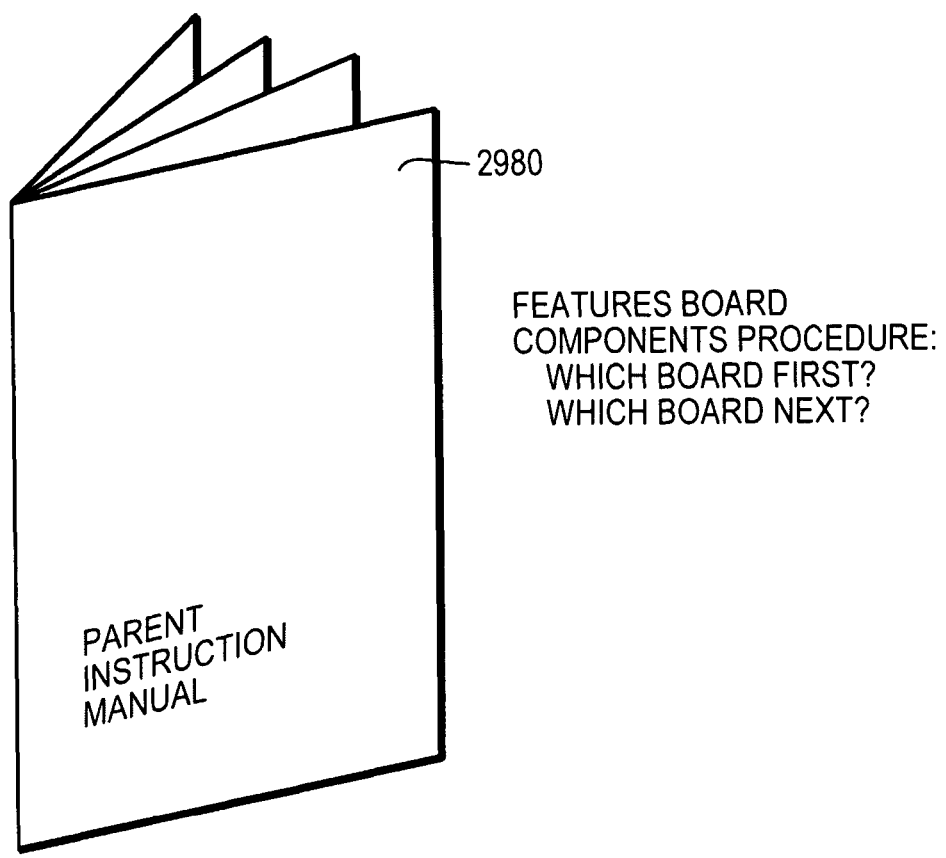
FIGS. 29A-D are diagrams of example companion books optionally used with the apparatus of FIG. 28.

FIG. 29A is a diagram illustrating a companion book in the form of a parent instruction manual 2980 that may be provided with the behavioral improvement apparatus illustrated in previous figures. In particular, the companion book 2980 may teach a caregiver, such as a parent, how to use the product. For example, the companion book 2980 may describe features that are provided with the behavior improvement apparatus, highlight certain components, such as the "check-in" feature to remind the caregiver to perform a mental state status check-in with the child and provide guidance with procedures that can be used with the behavioral improvement apparatus, such as which page (e.g., schedule page, behavior improvement page, and so forth) to use first. In another example procedure, the companion book 2980 may provide a caregiver with guidance as to which page should be used next.

The following text illustrates example information that can be provided to a parent or other caregiver in the example companion book 2980:

Product Features:
Companion Books
  The companion books complement and explain the individual Boards to your child. We suggest that you read each book to your child before introducing the boards. The books will help your child understand many of the reasons why he or she needs to do what we as adults ask.

In the beginning you may want to read the companion books several times throughout the day in addition to every time you use a board.

Timer

Time is a great motivator for completing tasks and extremely beneficial in teaching your child waiting skills. The timer turns ordinary tasks into a game, making them more acceptable and enjoyable, and by teaching your child how to wait; the timer reinforces and shows him that he won't have to wait forever.

Magnets

The Universal Storage Easel is designed to store 42 magnets. The magnets provide your child with a clear understanding of the tasks he needs to do or places he needs to go. When your child is able to see what he will be doing, he will be more able to complete the required tasks. In addition, his anxiety will be reduced as he is able to anticipate what comes next and clearly understand what is expected of him. The visual magnets allow your child to prepare for the transition from task to task.

Magnetic Dry-Erase Pen

The dry-erase pen can be used for checking off tasks as they are completed or drawing a picture of a task you may not have. Remember a stick figure drawing can be as effective as a perfectly drawn picture, so don't worry about being a great artist. The pen can be stored inside the Universal Storage Easel or simply attached to the schedule board with the magnet.

What's Check-In?

The purpose of the Check-In is to ensure your child is ready to complete the task or behaviors you are about to work on. Ask your child if he is O.K. before you begin using the Schedule or Waiting Boards. If your child is hungry, tired, scared, mad . . . resolve those issues before using the boards, otherwise, he will not be able to perform to his potential and be successful.

On the Feelings Board, you will want to check in with your child before moving on to the next activity. Teaching children emotions is challenging. The check-in feature identifies several different feelings such as, happy, sad, mad and frustrated. The first step in learning feelings is being able to label them. Ideally, if you can get a child to label feelings in the context of what is happening, the child will begin to have a greater understanding of his feelings. We suggest showing your child the check-in page at the back of this manual with each board at different times throughout the day. For example, you can pull the Schedule board out and ask your child to identify how he is feeling after he did something he enjoyed.

Recommended Procedure:

Which Board First?

We recommend beginning with the Schedule Board. This is the easiest of the three boards for a child to learn and offers a reward component that sets your child up for success After checking in with your child, begin with one or two easy tasks and then let your child select an option from the choice wheels. For example, place the "eat breakfast" and "brush teeth" magnets on the schedule board and after your child completes both tasks, let your child select a reward from the choice wheels. This will provide instant reinforcement for completing a task. You can gradually increase the number of tasks (magnets) as your child achieves success.

The Schedule Board involves placing the magnetic pictures vertically in the order you would like the child to complete each task. This follows the "First I need to . . . " cue that you say to your child: "First you need to eat your breakfast, brush your teeth, and get dressed."

As your child's schedule gets more advanced, and he is able to view more than 5 tasks, you can place two magnets next to each other in each row. This will allow you to use up to 10 tasks. We recommend limiting the number of tasks to 5, as it can be visually overwhelming.

Warning! Don't use too many tasks too fast! You will overwhelm your child.

You or your child can slide the magnet over to the All Done column or check off items as they are completed. This will act as a visual reinforcer, showing your child how many tasks he has completed. The action of sliding the magnet over or checking the All Done box is also rewarding to a child and keeps the child's place as he completes the tasks.

Let your child choose the method he prefers—whether sliding the magnet over or checking off items.

If possible, work together with your child in making the schedule. The child is more likely to participate in the activities if he is part of the process.

The "Then" cue directs the child to select a choice on the wheels as a reward for completing his schedule. The choice option can also be used as a motivator in the middle of the schedule to keep the child going. For example, if your child is scheduled to do tasks that are less preferable or more difficult for him, use the star magnet as an indicator that your child now gets a choice from the wheels.

Time can also be a fantastic motivator. Have your child race against the clock in the morning to get ready for school or in the evening to get ready for bed. Remember always to allow enough time for your child to complete the schedule. Example: If it takes your child 30 minutes to complete her schedule, set the timer for an hour. That way she will have 30 minutes to do an activity that she selects and still be ready on time.

Tip: You can also set a timer for how long your child can do the chosen activity. For example, if it is in the middle of the day and your child selects to play a video game, you can set a timer for 30 minutes after which the video game gets turned off.

Which Board Next?

If your child is responding in a physical manner to situations (such as hitting or kicking), we suggest you use the Feelings Board next.

The Feelings Board will assist the distressed child by providing him with concrete coping mechanisms. "When you are upset you can get help or take a break." The goal is to enable the child to respond to the emotion of being upset by either getting help or taking a break. It is important to note that breaks are not a punishment and should never be treated as such. This is a break to help your child process his or her feelings.

Which Board Next?

If your child is responding in a physical manner to situations (such as hitting or kicking), we suggest you use the Feelings Board next.

The Feelings Board will assist the distressed child by providing him with concrete coping mechanisms. "When you are upset you can get help or take a break." The goal is to enable the child to respond to the emotion of being upset by either getting help or taking a break. It is important to note that breaks are not a punishment and should never be treated as such. This is a break to help your child process his or her feelings.

Using the Feelings Board

When using the Feelings Board, we feel it is imperative to read the companion book to your child prior to showing him the board. The biggest challenge is getting a child to understand when he is getting upset, before he is upset. The companion book goes through the emotions in a clear and direct manner for your child. You will also have to play detective and recognize the clues that make your child upset. Once you see your child beginning to get upset, ask him if he would like some help or if he needs a break and point to the Feelings Board as a visual reinforcer.

If your child chooses to take a break, the purpose is to calm down, cool off and self-regulate. Each time your child takes a break and gets positively reinforced for his efforts, his breaks will become more self-imposed and, therefore, effective. Again this should never be used as a punishment and the breaks should not take place in the location where punishments are delivered. In other words, if you send your child to his room for behaving inappropriately, do not send his to his room when he needs a break.

After your child has taken a break or has come to you for help and the problem seems to be resolved, you can use the Check-In feature. This is a good way to make sure your child is O.K. before deciding what to do next. It may also help to stimulate conversation by finding out what caused the negative reaction

*Please keep in mind, your child may be refreshed after his break and may just want to move on to the next step.

Once your have determined that your child is O.K., help him choose what he would like to do next. This is a good opportunity for you and your child to collaborate. By using the choice wheels, together you can decide what comes next. For example, your child may want to go home or play something different:

Remember, sometimes some of the choices are not feasible options. For example, if you are on vacation, going home might not be reasonable and this should be communicated to your child. (You can do this by placing an X over the picture with the dry-erase marker.)

Learning How to Wait

Learning how to wait is difficult for most children and adults, but especially so for children with autism spectrum disorders. For them, it is an abstract concept that needs to be directly taught.

There are several ways to make it easier for children to wait.

By using the Waiting Board with a corresponding companion book we can concretely show children that everyone has to wait sometimes. Further, when it is indicated via a timer how long children have to wait and you adhere to the time limit, trust is established and waiting has a true end.

Using the Waiting Board

As always, we recommend reading the companion book to your child before using the board. The first step is to "check in" with your child to make sure she is not hungry, thirsty, mad, etc. Once you determine your child is O.K., set the top picture to indicate the reason why your child will be waiting. Using the scenario on the preceding page, you need to make a phone call and want your child not to interrupt you while you are on the phone. Set the wheel to Not Interrupting (phone). Show your child that you are going to be on the phone and tell her for how long. Now both you and your child can select an activity from the bottom wheels for your child to do while you are on the phone. Help your child arrange for the chosen activity, and then set the timer to let the child know how long you will be on the phone. This will give your child clear expectations and set you and your child up for success.

**Note there will be times when your child may need to interrupt for emergency situations; for example, if she is hurt or sick. You may want to review these exceptions with your child.

Also, eventually the child will need to learn that things change and a phone call may take longer than expected, despite the best laid plans.

Our favorite one is the Taking Turns visual. We use it for video game controllers, trampoline time, new toy use . . . you name it. The kids set the timer themselves and follow it. No more fighting over whose turn it is. The timer will tell! (Picture of boys playing video games with only one controller. And the Waiting board set up for them.)

Having Quiet Time is meant to be a visual to stimulate time for relaxation. Our son likes to unwind from the day and this often involves being alone to think about things or simply do nothing. At some schools they have Quiet Time scheduled in to the days as a way to allow children to listen to their minds and bodies. It may involve only quiet activities to slow bodies down. It may even mean taking a nap or reading a book.

Figure 29B:
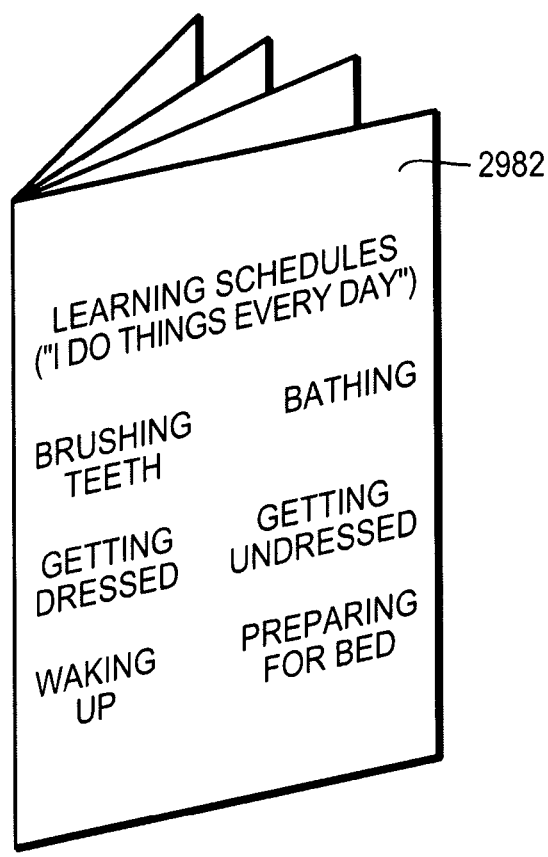

FIG. 29B is another example companion book that may be provided with the behavior improvement apparatus disclosed herein. This companion book 2982 is a learning schedule manual that provides information to the child or caregiver as to how to use a schedule page (e.g., FIG. 3). Examples of activities for which schedules may be provided include brushing teeth, bathing, getting dressed, getting undressed, waking up, and preparing for bed. The companion book 2982, like other companion books, may include both text and visual indicators so that caregiver and child can readily understand the schedules being illustrated and breakdown of subtasks that are part of the schedules. Further, examples of check-off boxes can be illustrated in the companion manual so that the child can understand how to use the check-off boxes that may be provided in example embodiments of a schedule page. Further, examples of how to use a timer in conjunction with the schedule page (or other page) may also be illustrated in the learning schedules companion book 2982.

Figure 29C:
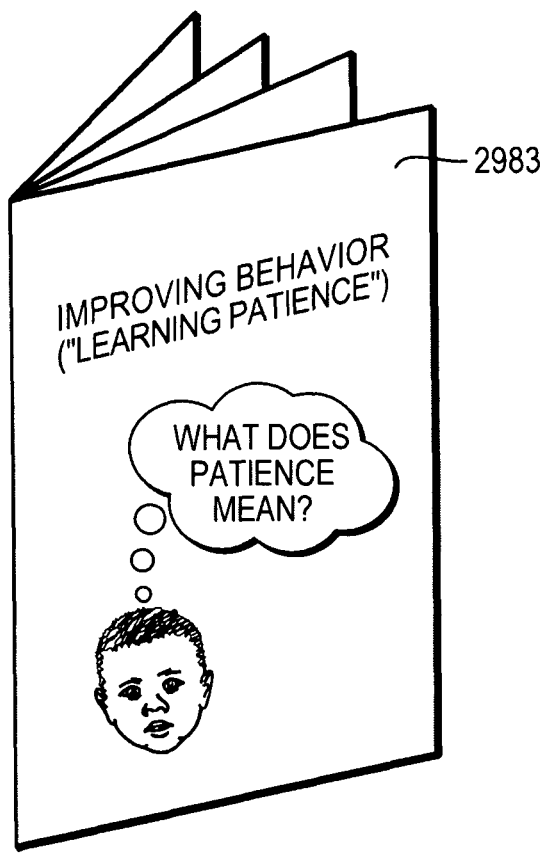

FIG. 29C is another example of a companion book 2983. This companion book 2983 is referred to as an open "improving behavior" companion book that can be, for example, used to teach a child how to learn patience. Some text and visual indicators can be provided to make learning the topic of the companion book 2983 simple for a child or caregiver. Additionally, illustrations that explain how a timer can be used with an improving behavior page, such as the one illustrated in FIG. 5, may be provided.

Figure 29D:
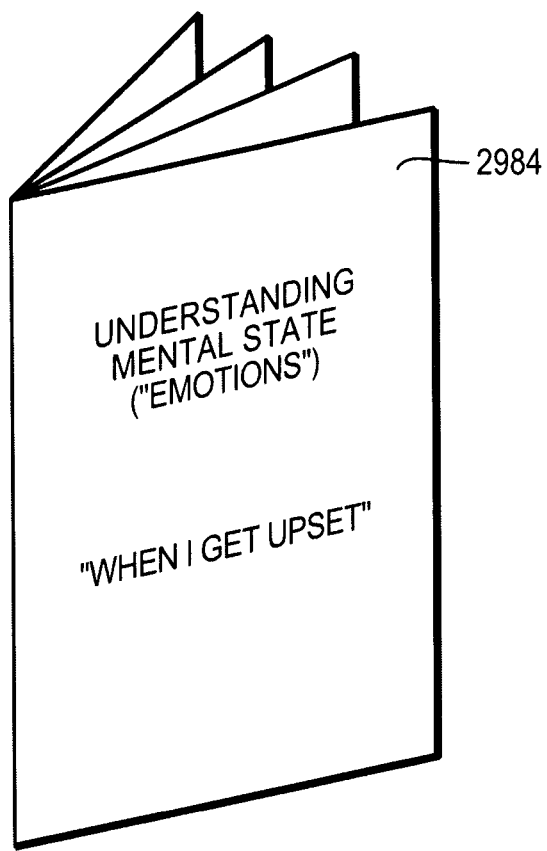

FIG. 29D is a diagram of yet another companion book 2984, which, in this case, is an example of understanding mental state, such as emotions. A title for the companion book 2984 may be, for example, "When I Get Upset." Many simple visual indicators and simple text may be provided so that a child or caregiver can understand how to handle situations in which the child is upset, for example, and choices that are available for handling such situations. Moreover, the companion book 2984 may be very much integrated with the corresponding page, such as the feelings page 600, illustrated in FIG. 6.

Figure 30:
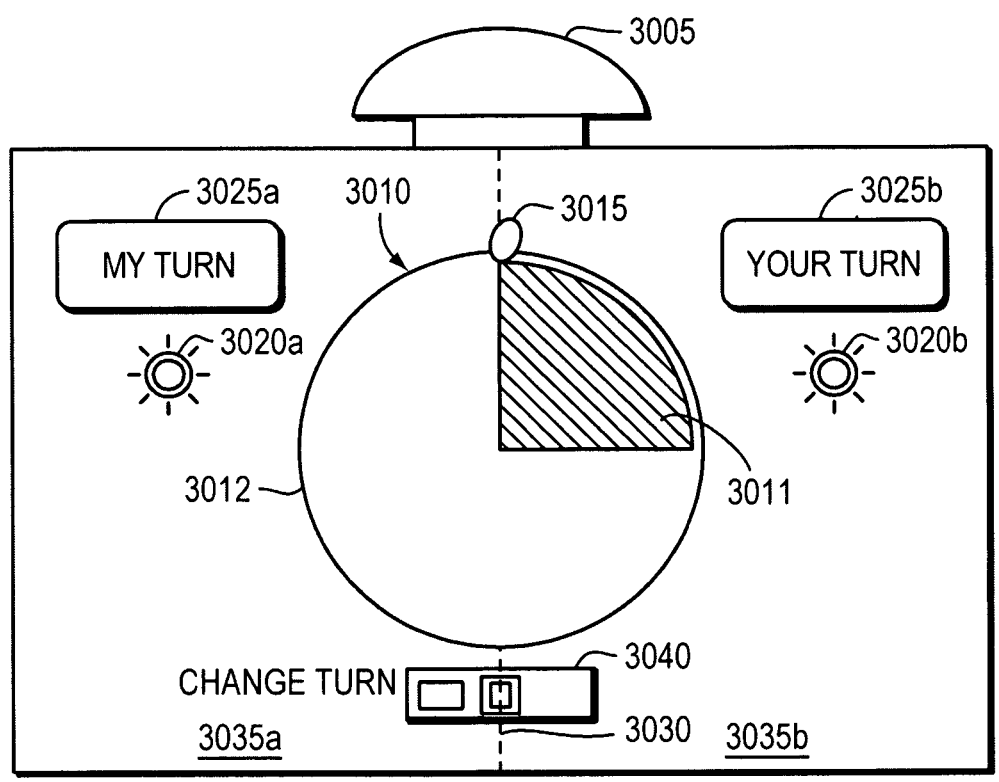
FIGS. 30-33 are diagrams of example time indicator devices (i.e., clocks) optionally used with the apparatus of FIG. 28.

FIG. 30 is a front view of a time indicator device ("timer") according to an embodiment of an aspect of the present invention. In this embodiment, the timer 3000 includes a start/stop button 3005, time indicator 3010, and timer set button 3015. The timer 3000 may also include a pair of indicator lamps or LEDs 3020*a*, 3020*b*, and labels 3025*a*, 3025*b* associated with the lamps 3020*a*, 3020*b*, respectively. The timer 3000 also includes a dashed line 3030 extending vertically in approximately the center of the timer 3000, and left and right portions of the front panel 3035*a*, 3035*b* on either side of the dashed line 3030 may have different colors or patterns to indicate user sides. As discussed in reference to the clock 700 of FIG. 7, the time indicator 3010 may have a shaded region 3011 and solid region 3012 to represent an amount of time remaining and amount of time elapsed, respectively, in this example embodiment.

In operation, a user can use the timer set button 3015 to set an amount of time that needs to be "counted down." To set the time, the user may slide the set button 3015 around the radius of the time indicator 3010. To initiate countdown, the user can press the start/stop button 3005. The user may also press the start/stop button 3005 to pause the countdown and press the start/stop button 3005 again to reactivate the countdown.

The signaling lamps 3020*a*, 3020*b* may change states when a terminal count is reached. For example, the signaling lamps 3020*a*, 3020*b* may blink, change color, illuminate, or turn off to indicate that the terminal count is reached. Additionally, sound from a speaker (not shown) may also be incorporated to indicate that the time indicated 3010 has reached a terminal count. Alternatively, the sound can be active when the time indicator 3010 is actively counting down.

Groups can be assigned to each side of the time indicator device 3000, as indicated through use of different colors or patterns on each side of the front face 3035*a*, 3035*b* of the timer device 3000. That allows many children to take turns with the timer device 3000 for use with the behavioral apparatus as described above in reference to several figures.

The unit may be freestanding, battery operated for portability, plugged into a wall socket directly or via a power adapter, and/or be entirely mechanical through a wind-up mechanism or other mechanical energy storage mechanism to allow the time indicator device 3000 to operate as disclosed above or with reasonable modifications made thereto based on mechanical power provisioning means.

It should be understood that any of the mechanisms associated with the timer device 3000 can be changed in form, provided on the timer device 3000 in a different location, changed in orientation, or provided separate from the timer device 3000. For example, the time indicator 3010 may be in the form of a number of light emitting diodes arranged in a column or row and change state as the time increases or decreases in representing a change of an amount of time remaining for an activity being timed to take place. The time indicator 3010 may also be in the form of a mechanical dial, graphical dial, such as on a liquid crystal display screen, or other form of time indicator known in the art. The labels 3025*a*, 3025*b* may be illuminated, non-illuminated, dry erase areas to receive a marking by a dry erase marker, or otherwise provisioned to indicate to people or groups on either side of the time indicated device 3000. A "change turn" button or slide switch 3040 may be provided to allow a user to activate one or both of the signaling lamps 3020*a*, 3020*b* to change states between active and non-active while the time indicator 3010 is counting down or has reached a terminal count, or vice-versa.

Figure 31:
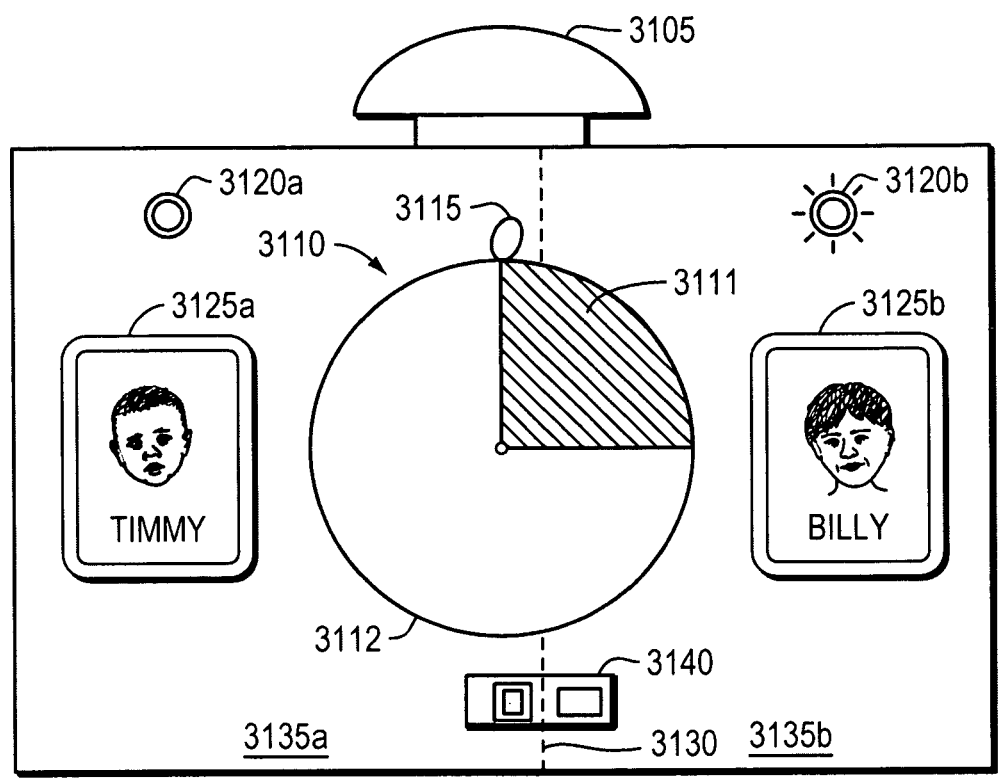

FIG. 31 illustrates a similar embodiment of a time indicator device 3100 having similar components thereon, as represented by similar reference numbers, which shall not be repeated in detail here for sake of brevity. However, a difference between the time indicator device 3000 of FIG. 30 and the time indicator device 3100 of FIG. 31 is in the labels 3125*a*, 3125*b*, where the time indicator device 3100 of FIG. 31 has images of a first user, "Timmy," and a second user, "Billy." The representations of Timmy and Billy can be provided by way of magnets, dry erase marker material and handwriting with a dry erase marker, photographs that can be printed and inserted into a sleeve or adhered to a tile, or other form of attachment that can be added to the regions on the front panels 3135*a*, 3135*b*, as illustrated, through the use of magnets, Velcro®, plastic feature, low adhesion adhesive, and so forth. Operation of the time indicator device 3100 is similar to usage of the time indicator device 3000, as presented above.

Figure 32:
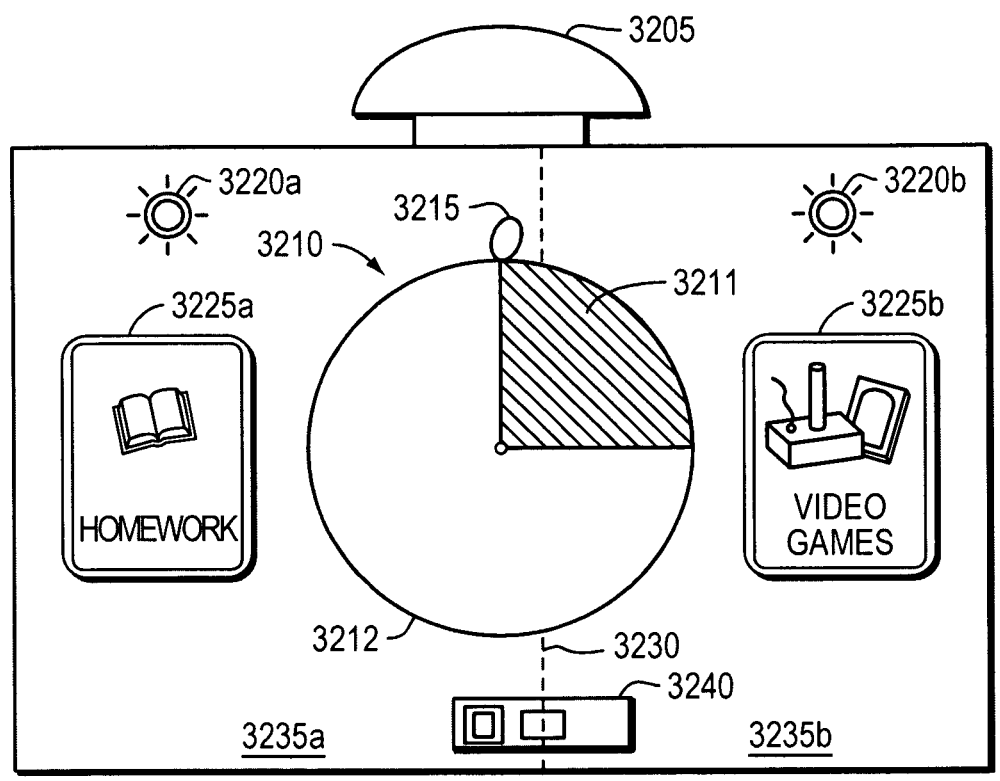

FIG. 32 is another embodiment of a time indicator device 3200 having similar features as the time indicator device 3000 of FIG. 30 and operates in a similar manner as presented above. A difference in the time indicator device 3200 of FIG. 32 is that, rather than indicating by way of indicia whose turn the time indicator 3210 represents, activity indicia 3225*a*, 3225*b* are represented, such as "homework" or "video games." For example, the time indicator 3210 can indicate an amount of time for the different indicia 3225*a*, 3225*b* representing activities to be performed by a user.

In an example usage, the time indicator device 3200 can provide a reward. For example, the user can do homework for 30 minutes and then play video games. Events can be attached using magnets or other method of attachment, as presented above in reference to FIGS. 30 and 31. Timing is based on actions and results of actions. Two events can also be timed simultaneously. For example, a user may play video games and play with toy trucks. After 15 minutes, the children switch who can play the video games and who can play with the toy trucks.

Figure 33:
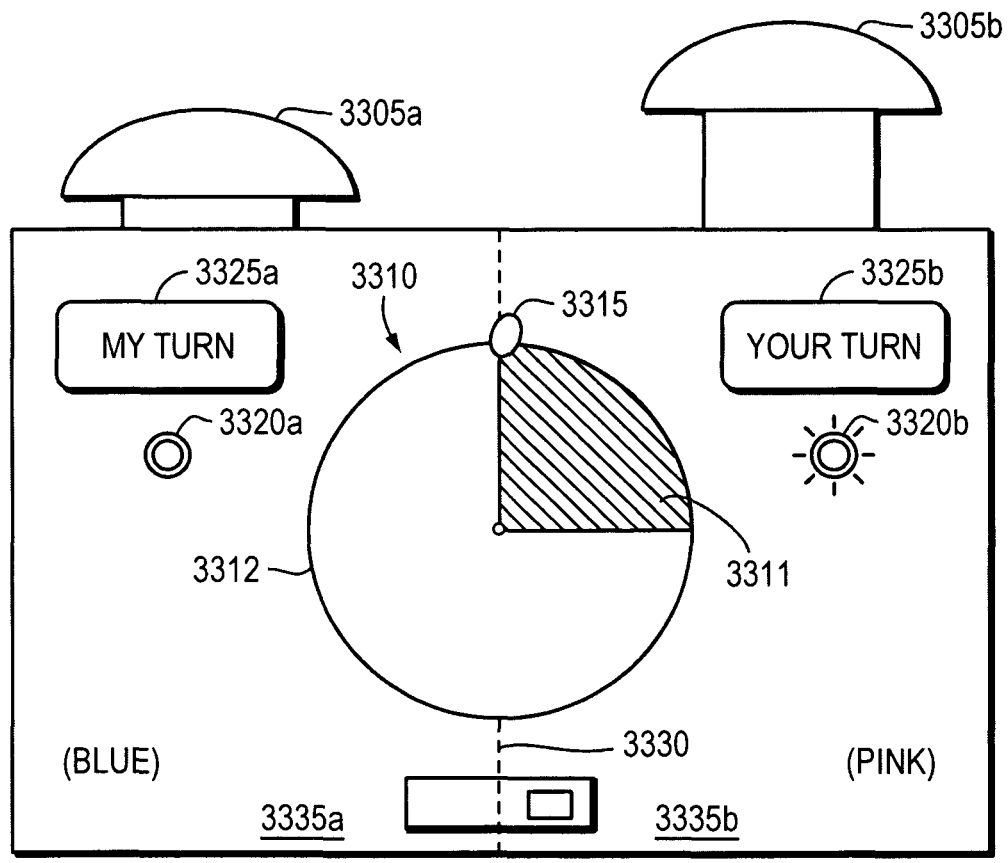

FIG. 33 is another example time indicator device 3300. In this embodiment, most of the controls and indicators are the same as provided in the timers of FIGS. 30-32. However, in this embodiment, two start/stop buttons 3305*a*, 3305*b* are provided. Additional features can also be provided, such as allowing a timer set button 3315 to set a countdown or count-up in five-minute intervals, such as 5, 10, 15, 20, 25, and so forth. Another additional timing feature may be to allow the time indicator 3310 to be split in half, giving two interaction points, one for each child, to allow children to share a responsibility of keeping time and taking turns. Another additional feature can be to allow the start/stop buttons 3305*a*, 3305*b* to "pop up" when a user's turn is over. Pushing down the start/stop buttons 3305*a*, 3305*b* may again restart the time indicator 3310 for the interval for which it was set.

Figure 34:
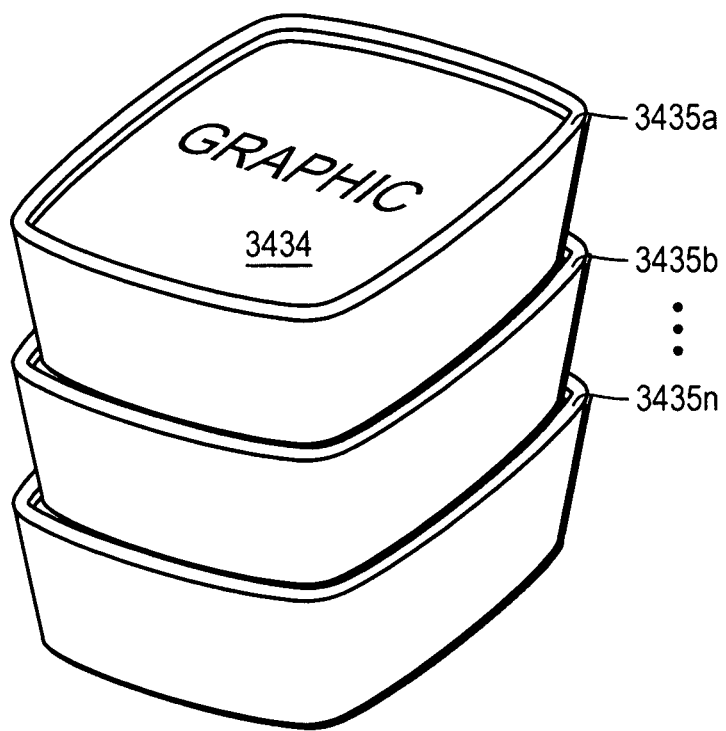
FIGS. 34-37 are diagrams of example graphic tiles that support visual indicators and may also be used either with the example apparatus of FIG. 28 or independent of an apparatus.

FIG. 34 is a diagram of tiles 3435*a*, 3435*b*, . . . , 3435*n*. These tiles 3435*a-n* may include visual indicators 3434 on at least one side and may be constructed such that they connect together in a vertical stack for ease of storage or for use by a child or caregiver in an embodiment of the present invention. The tiles 3435*a-n* may include any of the visual indicators described above in reference to FIGS. 3-6. Further, the tiles 3435*a-n* may also be configured to be stored in a manner described above in reference to FIG. 26. Additionally, the tiles 3435*a-n* may include a magnet, Velcro® component, or other mechanism for attaching or connecting it to a page as described above.

Figure 35:
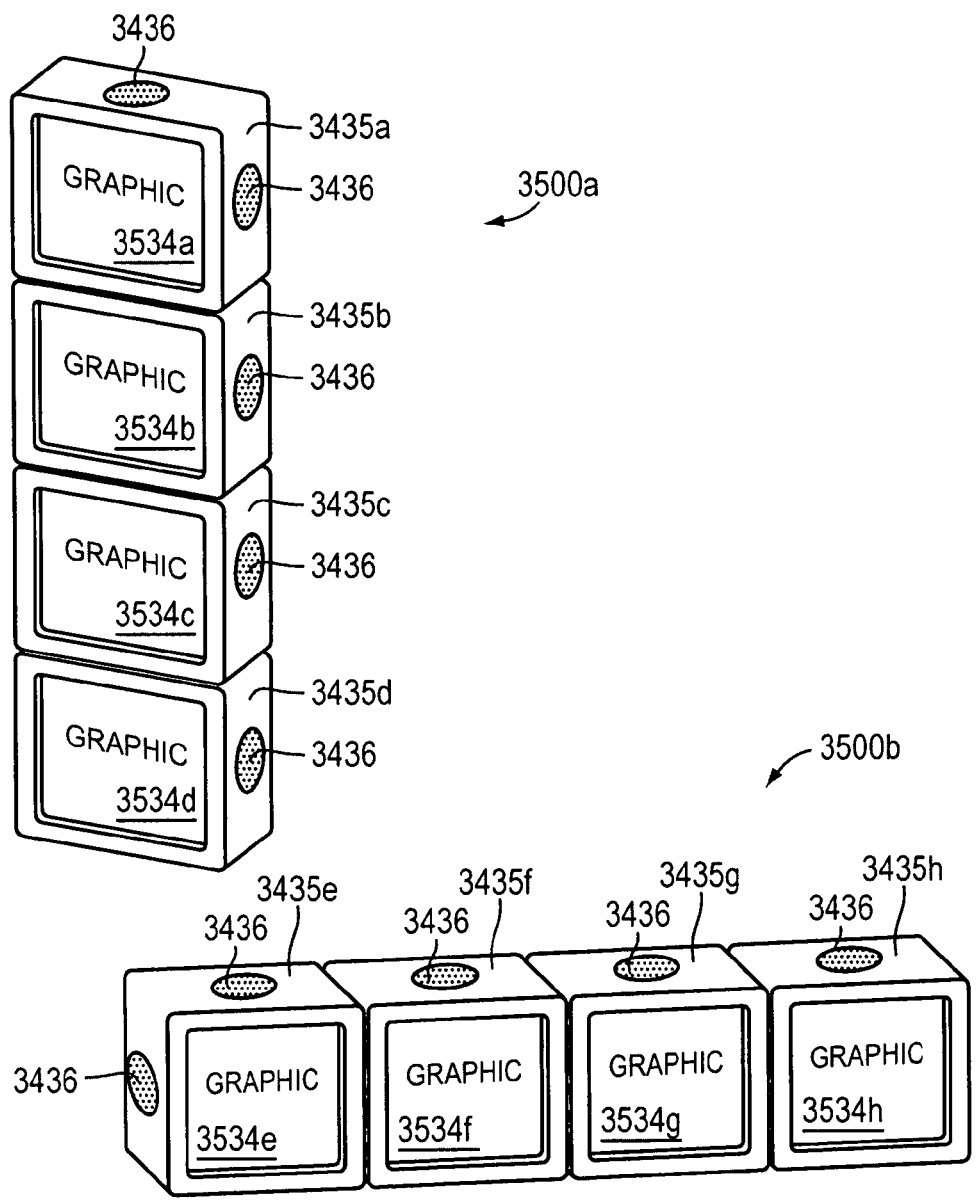

FIG. 35 illustrates yet other embodiments of tiles 3435*a-h*. In this example, the tiles 3435*a-h* can be interconnected via connector components 3436, which can be placed on 1, 2, 3, or 4 sides of the tiles 3435*a-h*. As illustrated, the tiles 3435*a-h* may be oriented in vertical arrangement 3500*a* or horizontal arrangement 3500*b*, depending on locations of the connector components 3436.

Figure 36A:
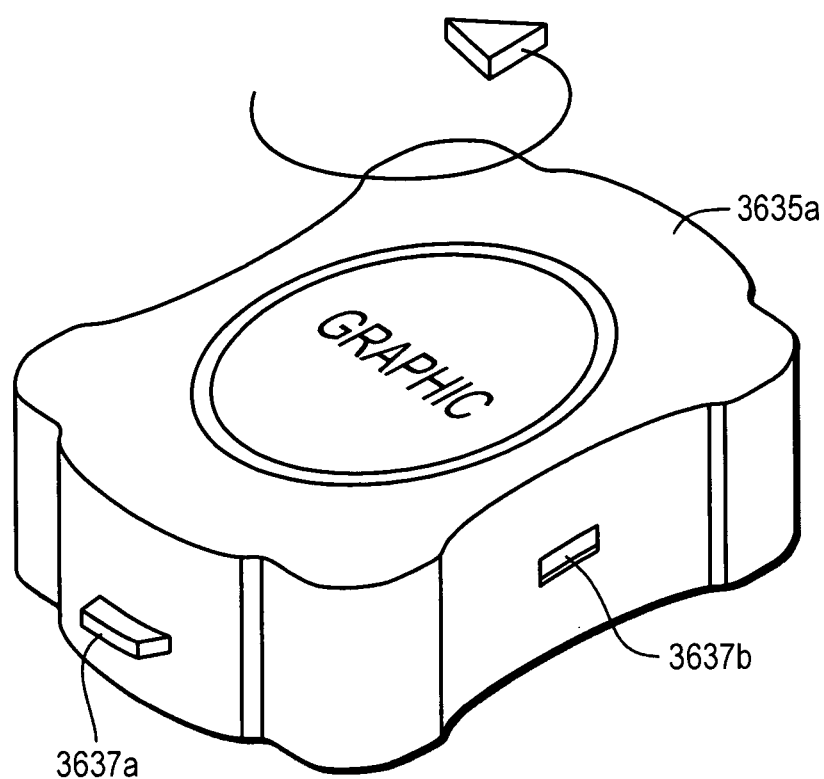

FIG. 36A is another example of a tile 3635*a* in which the tile has a unique shape to firmly interconnect with other similarly shaped tiles and has connector components 3637*a*, 3637*b* that can be interconnected by way of using force to insert mating components together.

Figure 36B:
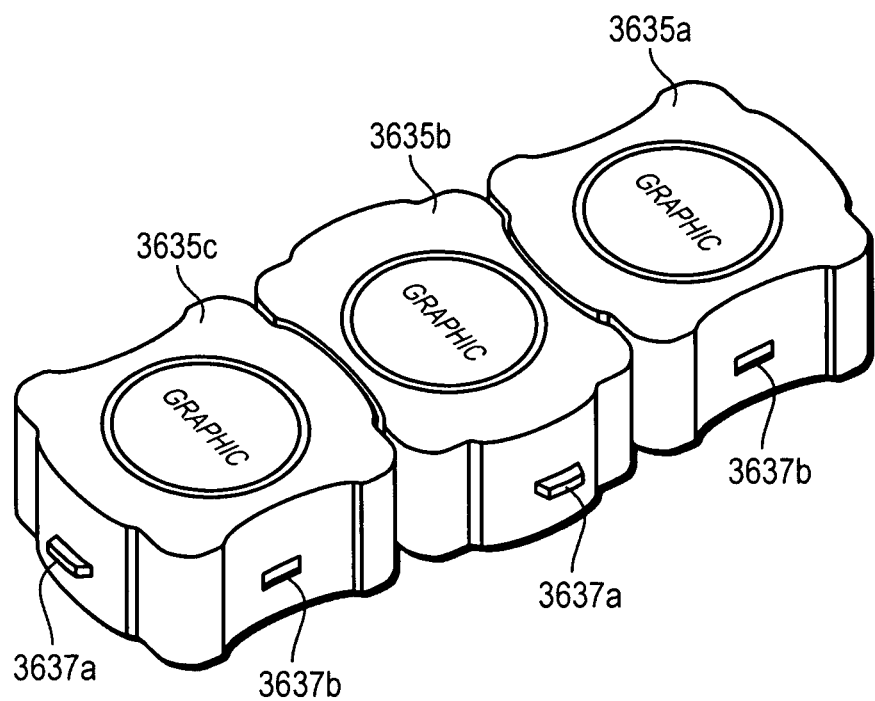

FIG. 36B is an illustration of the tiles 3635*a-c* interconnected in series configuration by way of the connector components 3637*a*, 3637*b*.

Figure 37:
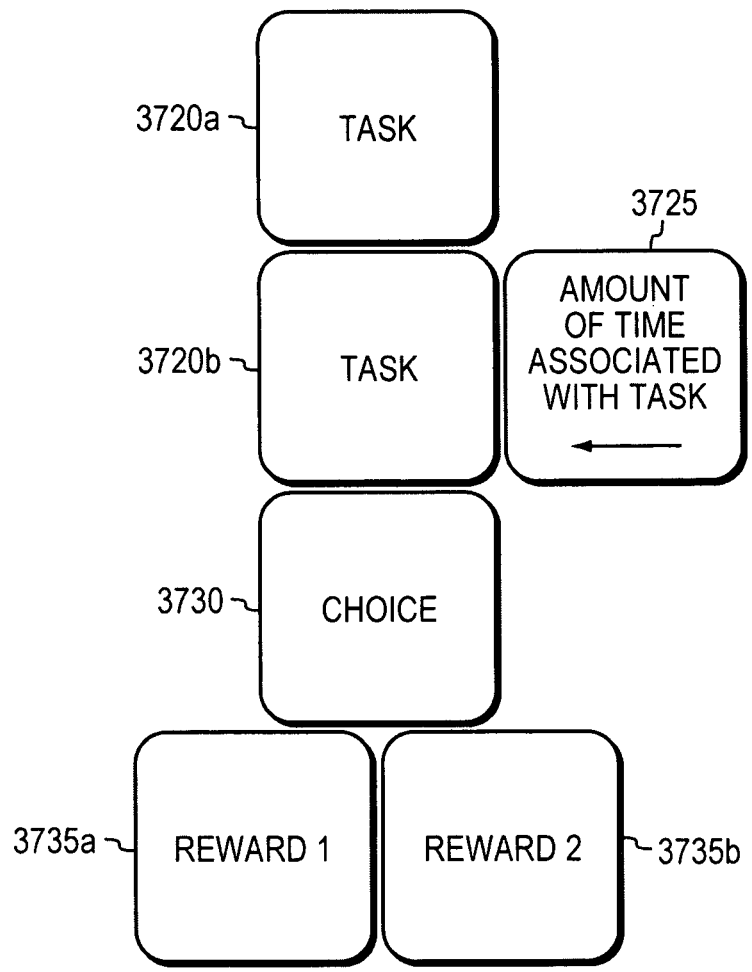

FIG. 37 is a diagram of an "unframed" schedule 3700 illustrated as a series of tasks 3720*a*, 3720*b*. A choice tile 3730 indicates choices to the child to select one of two rewards appearing as reward indicators 3735*a*, 3735*b* appearing on reward tiles 3735*a*, 3735*b*. Any of these tiles 3720*a-b*, 3725, 3730, 3735*a-b* can be interconnected without use of a page so that they can form an organized schedule 3700 for use by a caregiver or child.

While this invention has been particularly shown and described with references to example embodiments thereof, it will be understood by those skilled in the art that various changes in form and details may be made therein without departing from the scope of the invention encompassed by the appended claims.

For example, although many examples presented herein are directed to developing an person's behavior, it should be understood that the principles of the present invention are not limited to developing a person's behavior. Many other characteristics of a person can be developed, such as emotion or understanding feelings. Additionally, people who are not musically inclined may find benefit from other embodiments and visual indicators while using the example techniques disclosed herein or techniques more specifically directed to learning a musical instrument. Similarly, learning mathematics, science, or foreign language may also be advanced through other embodiments of the present invention. Such benefits can be gained due to the way in which regions of the brain can be engaged that might not normally be engaged in some individuals through use of the present invention.

Further, the following table illustrates visual indicators that may be used with or in place of the visual indicators described above.

| Table of Visual Pictures |
|---|
| Visual pictures used with this invention may include, but are not limited to the following |

| Time |
|---|
| 5 Minutes |
| 10 Minutes |
| 15 Minutes |
| 20 Minutes |
| 30 Minutes |
| 45 Minutes |
| 60 Minutes |
| Emotions |
| Mad |
| Hungry |
| Upset |
| Tired |
| Sad |
| Confused |
| Scared |
| Okay |
| Sick |

| Table of Visual Pictures |
|---|
| Morning |
| Wake Up |
| Go to bathroom |
| Brush teeth |
| Comb/Brush hair |
| Put on jacket |
| Eat breakfast |
| Get dressed |
| Blank |
| Get back pack |
| Get on bus |
| Go to school |
| Go to daycare |
| Make bed |
| Night |
| Put away toys |
| Take a bath |
| Put on pajamas |
| Put clothes in basket |
| Wash face |
| Pray |
| Get undressed |
| Other |
| Do homework |
| Read a book |
| Go to sleep |
| Get hair cut |
| Go to church |
| Go to store |
| Go to doctor |
| Take medicine |
| Go to dentist |
| Eat lunch |
| Eat dinner |
| Wash hands |
| Cut nails |
| Home |
| Speech Therapy |
| Occupational Therapy |
| Physical Therapy |
| Put on shoes |
| Glasses |
| Get in car |
| Have a snack |
| Change cloths |
| Feed pets |
| Take shower |
| Go to library |
| Baby sitter |
| Put away backpack |
| Hang up jacket |
| Birthday party |
| Go swimming |
| Other categories of visual pictures may include |
| Sports |
| Directions |
| Geographic locations |
| School subjects |
| Hygiene |
| Foods |
| Actions |
| Feelings |
| Tasks |
| Songs |
| Time (hrs, days, yrs) |
| Events |
| Games |
| Choirs |
| Activities |

What is claimed is:

1. An apparatus for developing a person's behavior, comprising:

a processor and one or more storage devices storing instructions that are operable, when executed by the processor, to generate a graphical user interface (GUI) configured to display:

at least one electronically adjustable template configured to be adjusted by a caregiver to display a given visual behavior indicator to a person at any one time, the given visual behavior indicator (i) selected from a plurality of visual behavior indicators retrievable from an electronic database communicatively coupled to or within the apparatus and (ii) representing a behavior desired of the person viewing the given visual behavior indicator; and at least two additional electronically adjustable templates, viewable with the given visual behavior indicator, the additional electronically adjustable templates configured to be adjusted by the person or the caregiver to display visual choice indicators from a plurality of visual choice indicators retrievable from the communicatively coupled electronic database and representing choices available to the person, the plurality of visual choice indicators enabled to be constrained by the caregiver as a function of respective visual behavior indicators, the adjustability of the templates to display the plurality of visual choice indicators assisting the person in developing the person's behavior by constraining the person to choose (i) an appropriately adaptive response supporting the selected desired behavior or (ii) an alternative behavior to behavior that is contrary to the desired behavior.

2. The apparatus according to claim 1 wherein the at least one electronically adjustable template is further configured to display at least one visual emotion indicator retrievable from the electronic database that represents an emotional state of the person viewing the at least one visual emotion indicator, and wherein the plurality of visual choice indicators further include representations of choices available to the person to assist in developing the person's emotions by assisting the person in choosing an appropriately adaptive response to the emotional state.

3. The apparatus according to claim 1 wherein the at least one electronically adjustable template is further configured to display at least one visual mental state indicator retrievable from the electronic database that represents a mental state of the person viewing the at least one visual mental state indicator, and wherein the plurality of visual choice indicators further include representations of choices available to the person to assist in developing the person's mental control by assisting the person in choosing an appropriately adaptive response to the mental state.

4. The apparatus according to claim 1 wherein the at least one electronically adjustable template is further configured to display at least one visual physical state indicator retrievable from the electronic database that represents a physical state of the person viewing the at least one visual physical state indicator, and wherein the plurality of visual choice indicators further include representations of choices available to the person to assist in developing the person's physical well-being by assisting the person in choosing an appropriately adaptive response to the physical state.

5. The apparatus according to claim 1 wherein the additional electronically adjustable templates limits the person to view only one respective visual choice indicator from at least two available visual choice indicators.

6. The apparatus according to claim 1 wherein the plurality of visual behavior indicators and the plurality of visual choice indicators are associated with positive behavior.

7. The only apparatus according to claim 1 wherein the plurality of visual behavior indicators and the plurality of visual choice indicators are associated with negative behavior.

8. The apparatus according to claim 1 wherein the at least one electronically adjustable template is further configured to display at least one visual mental state indicator retrievable from the electronic database and wherein the at least one visual mental state indicator and the plurality of visual choice indicators are associated with negative mental states.

9. The apparatus according to claim 1 wherein the at least one electronically adjustable template is further configured to display at least one visual mental state indicator retrievable from the electronic database and wherein the at least one visual mental state indicator and the plurality of visual choice indicators are associated with positive mental states.

10. The apparatus according to claim 1 wherein the GUI is further configured to display an emotional state reminder indicator viewable with the given visual behavior indicator and a respective subset of visual choice indicators.

11. The apparatus according to claim 1 wherein the GUI is further configured to display a time indicator device usable in conjunction with the plurality of visual behavior indicators and the plurality of visual choice indicators.

12. The apparatus according to claim 11 wherein the time indicator device includes a time indicator that visually presents time, elapsed time, or remaining time in a graphically representative format.

13. The apparatus according to claim 11 wherein the time indicator device further includes a director element that visually or audibly indicates to whom or what the time, elapsed time, or remaining time is directed.

14. The apparatus according to claim 11 wherein the time indicator device visually identifies to whom or what the time, elapsed time, or remaining time is directed.

15. The apparatus according to claim 1 wherein the GUI is configured to display multiple visual behavior indicators arranged in a selectable manner.

16. The apparatus according to claim 1 wherein the given visual behavior indicator and the plurality of visual choice indicators are viewable concurrently.

17. The apparatus according to claim 1 wherein at least one of the plurality of visual choice indicators is selected from a group consisting of: a behavior indicator, physical need indicator, activity indicator, and response indicator.

18. The apparatus according to claim 1 further including a writable and/or erasable touch-screen surface in operative association with the at least one electronically adjustable template including a plurality of visual behavior indicators, the at least two additional electronically adjustable templates including a plurality of visual choice indicators, or both.

19. The apparatus according to claim 1 wherein the GUI includes indicia of a schedule.

20. The apparatus according to claim 19 wherein the GUI is configured to display a time indicator device for use with the element with indicia of a schedule.

21. The apparatus according to claim 1 further including a coupling device or material to form a book including multiple pages with at least a subset of the multiple pages of the book including or configured to support the apparatus and GUI configured to display the at least one electronically adjustable template including a plurality of visual behavior indicators and the at least two additional electronically adjustable templates including a plurality of visual choice indicators.

22. The apparatus according to claim 1 further including a companion book with multiple pages, wherein the companion book describes how to use the at least one adjustable template including a plurality of visual behavior indicators with the at least two additional adjustable templates including a plurality of visual choice indicators.

23. The apparatus according to claim 1 wherein at least one of the visual behavior or choice indicators is physically selectable.

24. The apparatus according to claim 1 wherein at least one of the visual behavior or choice indicators is electronically selectable.

25. The apparatus according to claim 1 further including a visual guide explaining causes, meanings, or effects of human behavior, choices, mental states, physical states, or emotions.

26. The apparatus according to claim 1 wherein the additional adjustable templates limit the person to view only as many as four visual choice indicators from the plurality of visual choice indicators.

27. A method of developing a person's behavior through use of a processor and one or more storage devices configured to store instructions that are operable when executed by the processor to generate a graphical user interface (GUI), the method comprising:
presenting, via the GUI, a given visual behavior indicator selected by a caregiver, of at least one adjustable template, the at least one adjustable template including a plurality of visual behavior indicators, to a person viewing the template, the visual behavior indicators representing behaviors desired of the person; and
enabling, via the GUI, at least two additional adjustable templates to be adjustable by the person or the caregiver, the additional adjustable templates including a plurality of visual choice indicators that represent choices available to the person, the plurality of visual choice indicators enabled to be constrained by the caregiver as a function of respective visual behavior indicators, the person's or caregiver's adjustment of the templates to display particular visual choice indicators assisting in developing the person's behavior by (i) assisting the person in choosing an appropriately adaptive response supporting the selected desired behavior or (ii) by presenting an alternative behavior to behavior that is contrary to the desired behavior.

28. The method according to claim 27 further including presenting, via the GUI, at least one visual emotional state, mental state, or physical state indicator that represents at least one respective state of the person, and wherein the plurality of visual choice indicators further include representations of choices available to the person to assist in developing the person's emotional, mental, or physical well-being by assisting the person in choosing an appropriately adaptive response to the at least one respective state.

29. The method according to claim 27 wherein the person's or caregiver's adjustment of the templates to display particular visual choice indicators limits viewing to only two visual choice indicators from among the plurality of visual choice indicators.

30. The method according to claim 27 further including reminding, via the GUI, the caregiver to evaluate an emotional state of the person prior to or in connection with presenting the given visual behavior indicator and particular visual choice indicators.

31. The method according to claim 27 further comprising indicating, via the GUI, time, elapsed time, or remaining time for the person to participate in or receive a reward or activity corresponding to a selected one of the plurality of visual choice indicators.

32. The method according to claim 31 further including visually, via the GUI, or audibly indicating to whom or what the time, elapsed time, or remaining time is directed.

33. The method according to claim 27 further including, via the GUI, supporting visual task indicators in a schedule format.

34. The method according to claim 27 further comprising describing, via the GUI, how to use the at least one adjustable template which includes a plurality of visual behavior indicators with the at least two additional adjustable templates including a plurality of visual choice indicators.

35. The method according to claim 27 further comprising forming a screen view, via the GUI, including the given visual behavior indicator and the particular visual choice indicators.

36. The method according to claim 35 further comprising supporting interactive selection of the particular visual choice indicators by the person via the GUI.

37. The method according to claim 27 wherein the visual behavior indicators and the visual choice indicators are retrievable from a communicatively coupled electronic database.

38. The method according to claim 27 wherein the visual behavior indicators and the visual choice indicators are retrievable via a computer network environment.

\* \* \* \* \*